(12) United States Patent
Anzawa

(10) Patent No.: US 6,205,036 B1
(45) Date of Patent: Mar. 20, 2001

(54) ENERGY TRANSFER UNIT, CHARGE UNIT, AND POWER SUPPLY UNIT

(75) Inventor: Seiichi Anzawa, Nagano (JP)

(73) Assignee: Nagano Japan Radio Co., Ltd., Nagano (JP)

( * ) Notice: Subject to any disclaimer, the term of this patent is extended or adjusted under 35 U.S.C. 154(b) by 0 days.

(21) Appl. No.: 09/553,645

(22) Filed: Apr. 20, 2000

(30) Foreign Application Priority Data

| Apr. 21, 1999 | (JP) | 11-113235 |
| Sep. 8, 1999 | (JP) | 11-254043 |
| Oct. 28, 1999 | (JP) | 11-306244 |
| Dec. 22, 1999 | (JP) | 11-363730 |
| Apr. 4, 2000 | (JP) | 12-101669 |

(51) Int. Cl.[7] ............................................... H02M 3/335
(52) U.S. Cl. ................................................................ 363/20
(58) Field of Search .................................. 363/15, 16, 20, 363/21.01, 21.04, 21.06, 95, 97, 131

(56) References Cited

U.S. PATENT DOCUMENTS

| 4,809,151 | * | 2/1989 | Ota | 363/21 |
| 5,088,017 | * | 2/1992 | Yaginuma et al. | 363/21 |
| 5,377,090 | * | 12/1994 | Steigerwald | 363/20 |
| 5,448,465 | * | 9/1995 | Yoshida et al. | 363/15 |

* cited by examiner

*Primary Examiner*—Matthew Nguyen
(74) *Attorney, Agent, or Firm*—Rosenthal & Osha L.L.P.

(57) ABSTRACT

An energy transfer unit constructed such that a plurality of series-connected circuits which are formed by series-connecting at least windings $3a$ to $3d$ and switching means Sa to Sd are provided and that the plurality of series-connected circuits are parallel-connected to a plurality of energy storage means Ca to Cd respectively, the plurality of windings $3a$ to $3d$ are magnetically coupled to each other respectively, and the plurality of switching means Sa to Sd are switching-controlled in synchronous with each other respectively.

42 Claims, 20 Drawing Sheets

FIG. 19
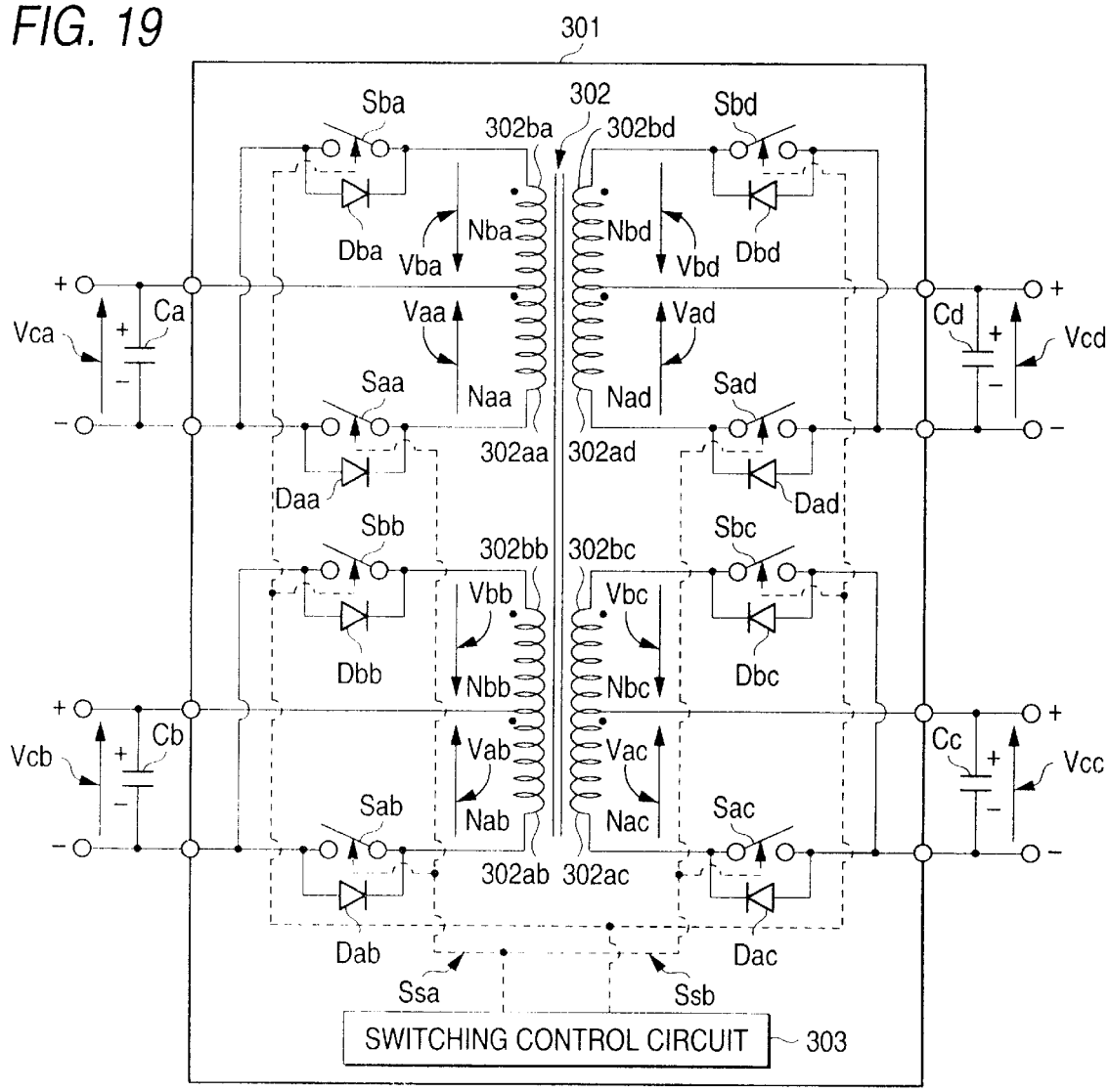
FIG. 20A
FIG. 20B
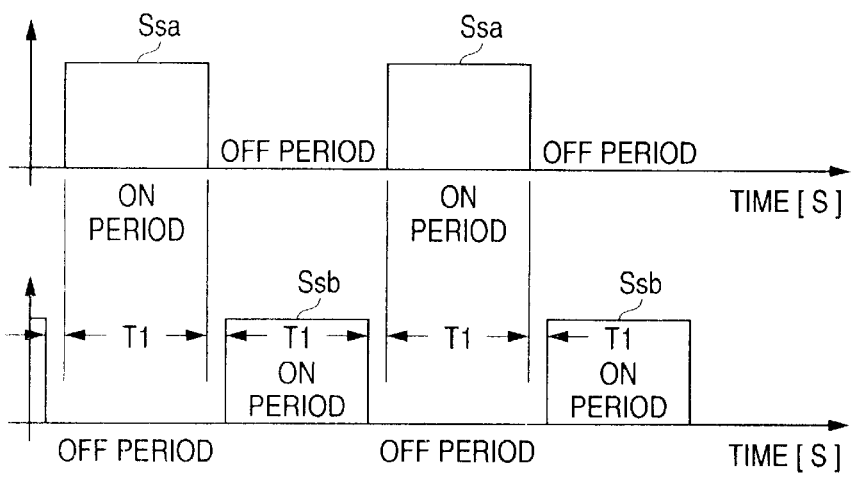

ENERGY TRANSFER UNIT, CHARGE UNIT, AND POWER SUPPLY UNIT

BACKGROUND OF THE INVENTION

1. Field of the Invention

The present invention relates to an energy transfer unit which is connected to a plurality of energy storage means to transfer the energy among the energy storage means mutually, and a charge unit and, more particularly, an energy transfer unit which is suitable for uniforming respective inter-terminal voltages of a plurality of energy storage means, and a charge unit and a power supply unit employing the energy transfer unit.

2. Description of the Related Art

As an energy transfer unit of this type, for example, the transfer unit 1061 disclosed in unexamined Japanese Patent Publication (KOKAI) Hei 7-322516 has been known in the conventional art. As shown in FIG. 30, a transfer unit 1061 is constructed to uniform storage energy of a plurality of capacitors C1 to C4 by transferring the storage energy in any one of the capacitors C1 to C4 to other capacitors. More particularly, the transfer unit 1061 comprises a series circuit of a choke coil L1 and a switch SW1 connected in parallel with a capacitor C1, a switch SW21 connected to a capacitor C2 via the choke coil L1, a series circuit of a choke coil L2 and a switch SW22 connected in parallel with the capacitor C2, a series circuit of a choke coil L3 and a switch SW31 connected in parallel with a capacitor C3, a switch SW32 connected to the capacitor C3 via the choke coil L2, and a switch SW4 connected to the capacitor C4 via the choke coil L3.

In the transfer unit 1061, for example, upon transferring the storage energy of the capacitors C4 to the capacitor C1, first the switch SW4 is controlled into the ON state. At this time, as shown in FIG. 30, the choke coil L3 is excited by a current I61. Then, a current I62 based on the exciting energy of the choke coil L3 flows by controlling simultaneously the switch SW4 and the switch SW31 into the OFF state and the ON state respectively to charge the capacitor C3. Then, the switch SW31 is controlled into the OFF state and then the switch SW32 is controlled into the ON state. Thus, a current I63 flows to excite the choke coil L2. In turn, a current I64 based on the exciting energy of the choke coil L2 flows by controlling simultaneously the switch SW32 and the switch SW22 into the OFF state and the ON state respectively to charge the capacitor C2. Then, the switch SW22 is controlled into the OFF state and then the switch SW21 is controlled into the ON state. Thus, a current I65 flows to excite the choke coil L1. Finally, a current I66 based on the exciting energy of the choke coil L1 flows by controlling simultaneously the switch SW21 and the switch SW1 into the OFF state and the ON state respectively to charge the capacitor C1. As a result, the storage energy of the capacitor C4 is transferred to the capacitor C1.

The transfer unit 1061 in the conventional art contains the problems described as follows.

In other words, in the transfer unit 1061, for example, upon transferring the energy from the capacitors C4 to the capacitors C3, the switch SW4 and the switch SW31 must be controlled simultaneously into the OFF state and the ON state. In this case, if the switch SW31 is controlled into the ON state prior to the OFF state of the switch SW4, the capacitors C3 and C4 are short-circuited via the switches SW4 and SW31, resulting in loss of the storage energy of both capacitors C3 and C4. On the contrary, if the switch SW4 is controlled into the OFF state prior to the ON state of the switch SW31, a very high voltage is generated across the switch SW4, resulting in failure of the switch SW4. In this manner, in the transfer unit 1061 in the conventional art, there is such a problem that, even if ON/OFF control timings of the switches S1 to SW4 are deviated slightly, short-circuit of the circuit and the failure of the circuit parts are brought about and also the energy cannot be transferred.

Also, in transferring the energy from the capacitor C4 to the capacitor C1, ON/OFF of the switches SW4 to SW1 must be controlled many times at a precise timing. Hence, in the transfer unit 1061, there is also such a problem that the control of the switches becomes complicated.

Further, in order to transfer the energy among four capacitors C1 to C4, six switches SW1 to SW4 must be used in the transfer unit 1061. In this case, if the situation that the energy is transferred among a number of capacitors is considered, the number of switches becomes about twice the number of capacitors. For this reason, in the transfer unit 1061 in the conventional art, there is also such a problem that, since the number of switches is increased, the transfer unit becomes expensive and the size of the unit is also increased.

A battery for vehicle and a charge unit for charging the battery have been developed swiftly in recent years. As one of the charge units of this type, a charge unit 1041 shown in FIG. 31 has already been developed. The charge unit 1041 is constructed to charge a battery BAT, which is constructed by series-connecting a plurality of electric double layer capacitors C1 to C4, for example, with high efficiency in compliance with the simply-constructed chopper system. In this charge unit 1041, when the control circuit (not shown) controls the switching element 1042 into the ON state, the charge current I11, which is generated based on the input voltage VIN such as the pulsating current obtained by rectifying the AC, the stabilized DC voltage, etc., flows through the current path comprising the switch element 1042, the choke coil 1043, and the battery BAT to thus charge the battery BAT. In contrast, when the switching element 1042 is controlled into the OFF state, the fly-wheel current IF flows through the current path comprising the choke coil 1043, the battery BAT, and the commutating diode 44, based on the energy stored in the choke coil 1043 during the flow of the charge current I11, whereby the battery BAT is also charged in this period. In this manner, in the charge unit 1041, the battery BAT can be continuously charged by the charge current I11 and the fly-wheel current IF during both periods of the ON period and the OFF period by ON/OFF-controlling the switch element 1042.

However, the charge unit 1041 in the conventional art contains the problems described as follows. In other words, in the charge unit 1041, the battery BAT is charged by passing the charge current I11 and the fly-wheel current IF through the capacitors C1 to C4 in series during both periods of the ON period and the OFF period of the switching element 1042. Therefore, the inter-terminal voltages of the capacitors C1 to C4 are not always maintained at the uniform voltage, rather they have a tendency to vary from each other. Meanwhile, the storage energy of the capacitor is in proportion to square of the inter-terminal voltage of the capacitor. Accordingly, even if the inter-terminal voltages are changed slightly, the storage energy of a plurality of capacitors C1 to C4 are changed considerably. Thus, such a situation occurs that, although the battery BAT has been charged sufficiently in due course, actually such battery BAT cannot discharge the enough electrical energy. For this reason, if the battery BAT for the electric vehicle is charged by the charge unit 1041, there is a possibility that the run-down of the battery is brought about after the vehicle travels merely within a short distance. In this manner, in the charge unit 1041 in the conventional art, there is such a problem that it is difficult to charge effectively sufficiently the storage means that is constructed by series-connecting a plurality storage elements. Further, there is another problem that, if the storage means is charged under the condition that the inter-terminal voltages of a plurality of storage elements are fluctuated, the lifetime of the storage elements is shortened.

SUMMARY OF THE INVENTION

The present invention has been made to overcome such problems, and it is an object of the present invention to provide an energy transfer unit which is able to transfer the energy easily without fail and with high reliability and is also constructed inexpensively in reduced size, a charge unit, a power supply unit, and a voltage uniforming unit.

In order to achieve the above object, according to a first aspect of the present invention, there is provided an energy transfer unit wherein a plurality of series-connected circuits which are formed by series-connecting at least windings and switching means are provided and that the plurality of series-connected circuits are parallel-connected to a plurality of energy storage means respectively, the plurality of windings being magnetically coupled to each other respectively, and the plurality of switching means being switching-controlled in synchronous with each other respectively.

According to a second aspect of the present invention, there is provided an energy transfer unit of the first aspect, further comprising a transformer having the plurality of windings, wherein the transformer further includes energy discharge windings for discharging storage energy of the transformer to the energy storage means when the switching means are controlled into an OFF state.

According to a third aspect of the present invention, there is provided an energy transfer unit of the second aspect, wherein the energy discharge windings are series-connected to the windings respectively, and the energy discharge windings discharge the storage energy of the transformer to the energy storage means connected to corresponding windings respectively.

According to a fourth aspect of the present invention, there is provided an energy transfer unit of the second aspect, wherein first to N-th (N is an integral number) series circuits comprising the windings and the switches means respectively are series-connected, and the energy discharging winding as an (N+1)-th winding is series-connected to the series-connected circuits such that the storage energy of the transformer can be discharged to the energy storage means which are connected to the (M−1)-th winding via an M-th (M is an integral number of more than 2 but less than (N+1)) winding and a uni-directional device.

According to a fifth aspect of the present invention, there is provided an energy transfer unit according to an y one of the second to fourth aspects, wherein the transformer is composed of a leakage transformer. In this case, the leakage transformer can be constructed easily by forming the gap in the iron core or holding the magnetic coupling of the windings appropriately.

According to a sixth aspect of the present invention, there is provided an energy transfer unit according to any one of the first to sixth aspects, wherein the energy storage means is composed of either a capacitor or a secondary battery. In this case, the secondary battery contains the lithium ion battery, the lithium polymer battery, etc., and the capacitor contains the electric double layer capacitor, etc.

According to a seventh aspect of the present invention, there is provided an energy transfer unit according to any one of the first to sixth aspects, wherein the windings are wound to the same number of turns respectively.

According to an eighth aspect of the present invention, there is provided an energy transfer unit according to any one of the first to seventh aspects, wherein the switching means are composed of a field effect transistor or a bipolar transistor.

According to a ninth aspect of the present invention, there is provided a charge unit comprising an energy transfer unit according to the first to eighth aspects, wherein the series-circuits are parallel-connected to both ends of each of a plurality of charged objects respectively.

According to a tenth aspect of the present invention, there is provided a power supply unit comprising an energy transfer unit according to the first to eighth aspects; wherein the plurality of energy storage means are composed of either a capacitor or a secondary battery respectively, and the storage energy in predetermined one of the energy storage means are distributed into other energy storage means.

According to an eleventh aspect of the present invention, there is provided a power supply unit according to the tenth aspect, wherein any one of inter-terminal voltages of the plurality of energy storage means is controlled to be stabilized into a predetermined voltage.

According to a twelfth aspect of the present invention, there is provided an energy transfer wherein a plurality of series-connected circuits which are formed by series-connecting at least windings and switching means are provided and that the plurality of series-connected circuits are parallel-connected to a plurality of energy storage means respectively, the plurality of windings being magnetically coupled to each other respectively, and the plurality of switching means being switching-controlled in synchronous with each other respectively, the unit comprises a transformer which is constructed by series-connecting a part or all of the plurality of windings and in which intermediate taps are formed at connection points between the windings, wherein at least a part of the plurality of switching means are series-connected to the windings via the intermediate taps of the transformer respectively.

According to a thirteenth aspect of the present invention, there is provided an energy transfer unit according to the twelfth aspect, further comprising a voltage detecting means for detecting inter-terminal voltages of the energy storage means; wherein the switching means are ON/OFF-controlled in response to a detected output of the voltage detecting means.

According to a fourteenth aspect of the present invention, there is provided an energy transfer unit according to the twelfth or thirteenth aspect, further comprising a current detecting means for detecting currents flowing through the switching means; wherein the switching means are caused to stop their switching when a detected current value of the current detecting means exceeds a predetermined value.

According to a fifteenth aspect of the present invention, there is provided an energy transfer unit according to any one of the twelfth to fourteenth aspects, wherein an over-current protecting means is series-connected in the series circuits.

According to a sixteenth aspect of the present invention, there is provided an energy transfer unit according to any one of the twelfth to fifteenth aspects, wherein the energy storage means is composed of either a capacitor or a secondary battery. In this case, the lithium ion battery, the lithium polymer battery, etc. are contained in the secondary battery, and the electric double layer capacitor, etc. are contained in the capacitor. Further, the energy storage means may be composed of the composite product which is composed of the secondary battery and the capacitor mixedly.

According to a seventeenth aspect of the present invention, there is provided an energy transfer unit according to any one of the twelfth to sixteenth aspects, wherein the switching means is composed of the field effect transistor or the bipolar transistor.

According to an eighteenth aspect of the present invention, there is provided an energy transfer unit according to any one of the twelfth to seventeenth aspects, wherein the separately excited oscillator circuit for controlling the switching of the switching means is provided.

According to a nineteenth aspect of the present invention, there is provided a charge unit, which is capable of charging a storage means which is constructed by series-connecting a plurality of storage elements, comprising a transformer having a first winding, and a plurality of second windings provided to correspond to the plurality of storage elements respectively, both windings being magnetically coupled to each other; and switching means series-connected to the first winding of the transformer and the storage means, for charging the storage means and also exciting the transformer by supplying a current via the first winding of the transformer when it is controlled into an ON state; wherein currents generated based on an exciting energy of the transformer excited in an ON period of the switching means are output from the plurality of second windings to the plurality of corresponding storage elements in an OFF period of the switching means respectively.

According to a twentieth aspect of the present invention, there is provided a charge unit according to the nineteenth aspect of the present invention, further comprising a plurality of transformers, wherein first windings of the transformers are series or parallel-connected mutually.

According to a twenty-first aspect of the present invention, there is provided a charge unit according to the nineteenth or twentieth aspect, wherein the storage elements are composed of either an electric double layer capacitor or an ion battery respectively.

According to a twenty-second aspect of the present invention, there is provided an energy transfer unit constructed such that N (N is a natural number) first current paths which comprise at least series-connected first windings and first switching means are provided and that first to N-th first current paths are parallel-connected to first to N-th energy storage means respectively, N first windings being magnetically coupled respectively and N first switching means being switching-controlled in synchronous with each other respectively, wherein N second current paths which comprise at least series-connected second windings and second switching means are provided and first to N-th second current paths are parallel-connected to first to N-th energy storage means respectively, the second windings in the first to N-th second current paths are magnetically coupled respectively, and turn ratios of the second windings to corresponding first windings in the first to N-th first current paths are set equal mutually, and N second switching means are controlled synchronously and switched into an ON state in an OFF period of the first switching means.

In this case, the energy storage means contains the secondary battery such as the lithium ion battery, the lithium polymer battery, etc., the capacitor such as the electric double layer capacitor, etc., and the composite product which include mixedly the capacitor and the secondary battery.

According to a twenty-third aspect of the present invention, there is provided an energy transfer unit according to the twenty-second aspect, wherein the N first windings and the N first switching means are wound on a same transformer respectively, and the N first current paths and the N second current paths are connected to N energy storage means respectively such that they can be excited by switching of the first switching means and switching of the second switching means to yield both polarities for the transformer.

According to a twenty-fourth aspect of the present invention, there is provided an energy transfer unit according to the twenty-second aspect, wherein N windings connected to the first switching means in the first to N-th first current paths as the first windings and one winding connected to the second switching means in the N-th second current path as the second winding are wound on a same transformer to an equal number of turns mutually respectively, and the second switching means in the N second current paths can be excited by switching of the second switching means and switching of the first switching means to yield both polarities for the transformer, the second switching means in the first to (N−1)-th second current paths are connected to the first windings in the second to N-th first current paths respectively, and the second switching means in the N-th second current path is connected to the one winding.

According to a twenty-fifth aspect of the present invention, there is provided an energy transfer unit according to any one of the twenty-second to twenty-fourth aspect, wherein a switching pause period in which both switching means are OFFed is provided between an ON period of the first switching means and an ON period of the second switching means.

According to a twenty-sixth aspect of the present invention, there is provided an energy transfer unit according to any one of twenty-second to twenty-fourth aspect, wherein ON periods of the first switching means and the second switching means are set to a same time length mutually.

According to a twenty-seventh aspect of the present invention, there is provided an energy transfer unit according to anyone of twenty-second to twenty sixth aspect, wherein the energy storage means is composed of either a capacitor or a secondary battery.

According to a twenty-eighth aspect of the present invention, there is provided a charge unit comprising an energy transfer unit set forth in any one of the twenty-second to twenty-seventh aspects; wherein the first current paths and the second current paths are parallel-connected to both ends of each of N charged objects as the energy storage means respectively.

According to a twenty-ninth aspect of the present invention, there is provided a power supply unit comprising an energy transfer unit set forth in any one of the twenty-second to twenty-seventh aspects; wherein the energy storage means is composed of either a capacitor or a secondary battery arranged on an output side, and storage energy in predetermined one or plural energy storage means are distributed into remaining energy storage means.

According to a thirtieth aspect of the present invention, there is provided a power supply unit according to the twenty-ninth aspect, wherein any one of inter-terminal voltages of the N energy storage means is controlled to be stabilized into a predetermined voltage.

According to a thirty-first aspect of the present invention, there is provided a voltage uniforming unit for uniforming inter-terminal voltages of a plurality of series-connected storage elements into a substantially equal voltage mutually by supplying an energy to the storage elements respectively, the series-connected unit comprising a transformer having an input winding connected to a DC power supply, and a plurality of output windings wound to a substantially same number of turns mutually; a switching means series-connected to the input winding; a plurality of uni-directional elements connected between the output windings and the storage elements respectively to supply storage energy of the transformer to the storage elements; and a voltage detecting means for detecting respective inter-terminal voltages of the plurality of series-connected storage elements. Here, a capacitor and a secondary battery are contained in the storage element in the present invention. In this case, an electric double layer capacitor, etc. are contained in the capacitor, and also a lithium ion battery, a lithium polymer battery, etc. are contained in the secondary battery. Also, a diode, an electric field transistor, a bipolar transistor, etc. are contained in the uni-directional element, and also the electric field transistor, the bipolar transistor, etc. are contained in the switching means.

In this case, preferably the switching means starts switching based on a detected result of the voltage detecting means when variation in the inter-terminal voltages of the plurality of storage elements is out of a predetermined voltage range, and stops the switching when variation in the inter-terminal voltages is within the predetermined voltage range. Also, preferably the switching means stops the switching based on the detected result of the voltage detecting means when one or more of the inter-terminal voltages of the plurality of storage elements reach a predetermined voltage which is set based on an allowable maximum charging voltage of the storage elements.

In addition, according to a thirty-second aspect of the present invention, there is provides a voltage uniforming unit for uniforming inter-terminal voltages of a plurality of series-connected storage elements into a substantially equal voltage mutually by supplying an energy to the storage elements respectively, the series-connected unit comprising a transformer having an input winding connected to a DC power supply, and a plurality of output windings wound to a substantially same number of turns mutually; a switching means series-connected to the input winding of the transformer; a plurality of uni-directional elements connected between the output windings of the transformer and the storage elements respectively to supply storage energy of the transformer to the storage elements; and a current detecting means for detecting currents supplied to the storage elements via the uni-directional elements.

In this case, preferably the switching means stops switching based on a detected result of the current detecting means when variation in the currents supplied to the storage elements is within the predetermined range. Also, preferably the voltage uniforming unit further comprises a control circuit for switching intermittently the switching means, and controlling the switching means into an OFF state when it is decided based on the detected result of the current detecting means that variation is within the predetermined range, and continuing switching of the switching means when it is decided that the variation is out of the predetermined range.

Further, according to a thirty-third aspect of the present invention, the voltage uniforming unit is possible to construct the DC power supply by a plurality of storage elements. Furthermore, preferably the voltage uniforming unit further comprises a charging function section for charging directly the plurality of series-connected storage elements. Besides, preferably the uni-directional elements are composed of a diode.

BRIEF DESCRIPTION OF THE DRAWINGS

FIGS. 7A and 7B are views explaining a merit of uniforming inter-terminal voltages VC11, VC12 of capacitors C11 and C12, wherein FIG. 7A is a circuit diagram in which a load L is connected to the capacitors C11 and C12, and FIG. 7B is a voltage characteristic view showing the discharging characteristic of both capacitors C11 and C12.

FIGS. 8A and 8B are views explaining a merit of uniforming inter-terminal voltages VC11 and VC12 of the capacitors C11 and C12, wherein FIG. 8A is a circuit diagram in which a load L is connected to the capacitors C11 and C12 and a diode D1 is parallel-connected to both ends of the capacitor C12, and FIG. 8B is a voltage characteristic view showing the discharging characteristic of both capacitors C11 and C12.

FIG. 19 is a circuit diagram of a transfer unit 301 according to an embodiment of the present invention.

FIGS. 20A and 20B are voltage waveform charts of control signals Ssa, Ssb in the transfer unit 301 according to the embodiment of the present invention.

DETAILED DESCRIPTION OF THE PRESENT INVENTION

Preferred embodiments of an energy transfer unit, a charge unit, a power supply unit, and a voltage uniforming unit according to the present invention will be explained with reference to the accompanying drawings hereinafter.

1st Embodiment

At first, an operational principle of an energy transfer unit according to the present will be explained with reference to FIG. 1.

Figure 1:
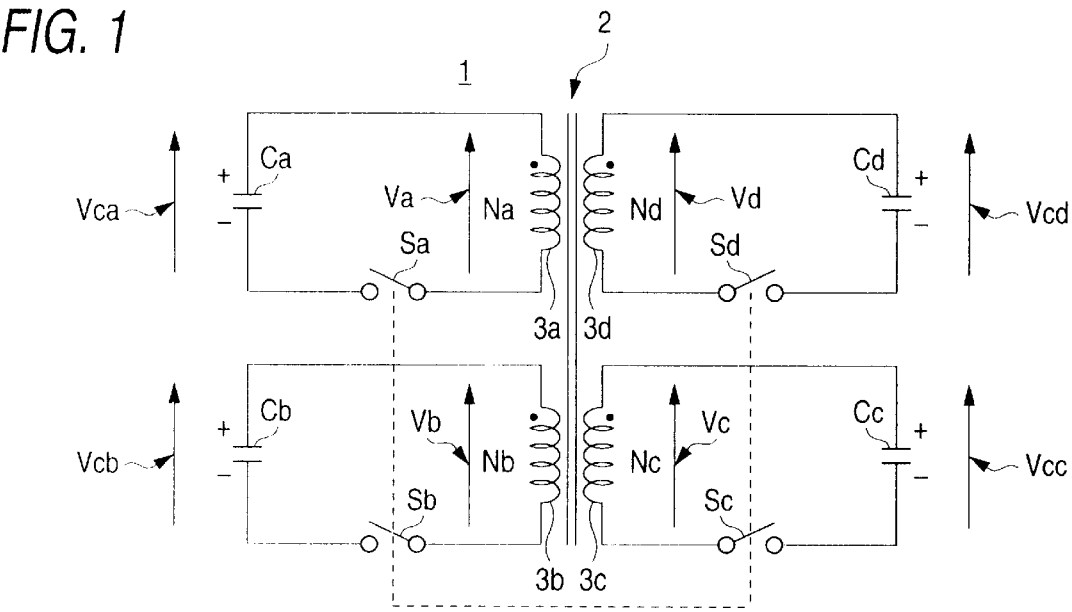
FIG. 1 is a circuit diagram of a transfer unit 1 for explaining an operational principle of the present invention.

As shown in FIG. 1, a transfer unit 1 is constructed to enable four capacitors Ca to Cd (referred to as "capacitors C" hereinafter if not particularly mentioned) as the energy storage means to transfer the energy among them. More particularly, the transfer unit 1 includes a transformer 2 which has windings 3a to 3d (referred to as "windings 3" hereinafter if not particularly mentioned). This transformer 2 functions as an ideal transformer which has a resistance component of the windings 3 of 0Ω, no leakage inductance, and no exciting current. In this case, the windings 3a to 3d are magnetically coupled with each other via an iron core, and are wound to the number of turns Na, Nb, Nc, and Nd respectively. In addition, the transfer unit 1 comprises switches Sa to Sd (referred to as "switches S" hereinafter if not particularly mentioned) connected between winding end portions of windings 3a to 3d and minus terminals of the capacitors Ca to Cd respectively. In this case, the switches Sa to Sd are composed of an EFT or a bipolar transistor respectively, for example, and are ON/OFF-controlled by the switching control circuit (not shown) in synchronous with each other.

In the transfer unit 1, winding start portions of the windings 3 and fixed contacts of the corresponding switches S are connected to both ends of the capacitors Ca to Cd respectively. In this condition, the switching control circuit controls the switching of the switches Sa to Sd. At this time, following Eq. (1) is satisfied between the inter-terminal voltages Vca to Vcd of the capacitors Ca to Cd and the numbers of turns Na to Nd of the windings 3:

$$Vca:Vcb:Vcc:Vcd=Na:Nb:Nc:Nd \quad (1)$$

Accordingly, upon switching the switches Sa to Sd, the energy transfer occurs among the capacitors Ca to Cd. More specifically, for example, explanation will be made while taking as an example the case where the voltage higher than the voltage specified by the above Eq. (1) is applied across terminals of the capacitor Ca. If the switches Sa to Sd are controlled into the ON state, the current flows through the current path comprising the plus terminal of the capacitor Ca, the winding 3a, the switch Sa, and the minus terminal of the capacitor Ca since only the inter-terminal voltage Vca of the capacitor Ca is higher than the voltage given by the above Eq. (1). In this case, the voltage Va which is equal to the inter-terminal voltage Vca of the capacitor Ca is generated in the winding 3a, whereas voltages Vb to Vd which mate with their ratios to the number of turns Na of the winding 3a are generated in other windings 3b to 3d respectively. In detail, the voltage Vb having a value (voltage Va×Nb/Na) is generated in the winding 3b, the voltage Vc having a value (voltage Va×Nc/Na) is generated in the winding 3c, and the voltage Vd having a value (voltage Va×Nd/Na) is generated in the winding 3d.

In this case, the voltages Vb to Vd becomes voltages which are higher than the corresponding inter-terminal voltages Vcb to Vcd. Therefore, the current generated based on the voltages Vb to Vd continues to flow through the current paths which comprise the windings 3, the capacitors C, and the switches S to thus charge the capacitors Cb to Cd respectively. Then, the charging of respective capacitors C in which the voltages Vb to Vd become equal to the corresponding inter-terminal voltages Vcb to Vcd is stopped sequentially. Finally, the above Eq. (1) can be satisfied. As a result, the energy is transferred to distribute from the capacitor Ca to other capacitors Cb to Cd.

In this fashion, according to the transfer unit 1, since the unit can be constructed by using the windings 3 and the switches S which are equal in number to the energy storage means, the number of circuit parts can be reduced and as a result reduction in size and reduction in cost of the unit can be attained. Also, since merely it is requested to switching-control the switches Sa to Sd, it becomes easy to control them and also the short-circuit failure is never brought about. Therefore, the energy transfer can be achieved among the capacitors Ca to Cd without fail with high reliability.

2nd Embodiment

Figure 2:
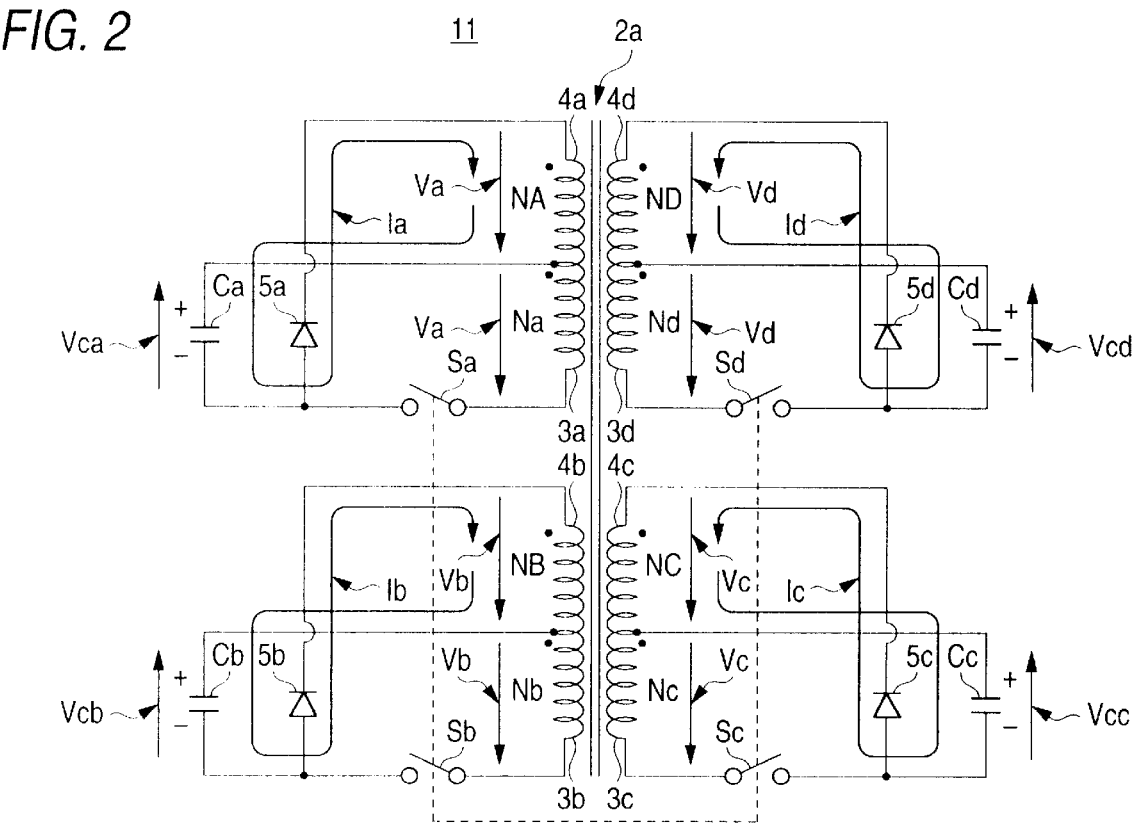
FIG. 2 is a circuit diagram of a transfer unit 11 according to an embodiment of the present invention.

Next, an actual circuit configuration of the practical transformer will be explained with reference to FIG. 2 hereunder. In this case, their redundant explanation will be omitted by affixing the same symbols to the same constituent elements as the transfer unit 1, and also their redundant explanation of the same operation will be omitted As shown in FIG. 2, a transfer unit 11 comprises a transformer 2a having reset windings (corresponding to energy discharging windings in the present invention) 4a to 4d (referred to as "reset windings 4" hereinafter if not particularly mentioned) series-connected to the windings 3a to 3d respectively, and reset current discharging diodes 5a to 5d (referred to as "diodes 5" hereinafter if not particularly mentioned). The windings 3a to 3d are wound to the numbers of turns Na to Nd at previously specified ratios by which the inter-terminal voltages Vca to Vcd of the capacitors Ca to Cd can satisfy the above Eq. (1) respectively. Also, the reset windings 4a to 4d are wound to the numbers of turns NA to ND to satisfy the above Eq. (2) respectively.

$$NA/Na=NB/Nb=NC/Nc=ND/Nd \quad (2)$$

In this case, a ratio (NA/Na) is defined such that the transformer 2a is magnetically reset without fail on the OFF period of the switches S.

In this transfer unit 11, like the above transfer unit 1, during when the switches Sa to Sd are controlled into the ON state, since the current flows from the plus terminal of the capacitor C whose voltage is higher than the voltage given by the above Eq. (1) to the minus terminal, the energy is transferred such that the inter-terminal voltages Vca to Vcd of the capacitors Ca to Cd satisfy the above Eq. (1). In the meanwhile, since the exciting current is flown in the actual transformer 2a, such transformer 2a is magnetized when the switches S are controlled into the ON state. Then, as shown in FIG. 2, during when the switches Sa to Sd are controlled into the OFF state, the voltages Va to Vd, VA to VD are generated in the windings 3a to 3d and the reset windings 4a to 4d respectively. In this case, because the windings 3a to 3d are magnetically coupled via the common iron core, the voltages are generated in respective windings based on the exciting energy of the transformer 2a in response to their turn ratios. At this moment, since the switches S can block the passing of the current generated based on the induced voltage in the windings 3, currents Ia to Id generated based on the voltages VA to VD induced in the reset windings 4 are discharged via the reset windings 4, the capacitors C, and the diodes 5 respectively. At this moment, the energy is discharged from the reset windings 4 to the capacitors C in the order of the larger voltage difference between the inter-terminal voltages Vca to Vcd and the induced voltage in the reset windings 4.

As a result, during when the switches S are controlled into the OFF state, the inter-terminal voltages Vca to Vcd can satisfy the above Eq. (1) since the energy is transferred from the capacitor C whose voltage is higher than the voltage given by the above Eq. (1) to other capacitors. If the turn ratios of the windings 3 are set equal, the inter-terminal voltages Vca to Vcd of the capacitors Ca to Cd can be made equal easily into the same voltage. Also, if the ratio (NA/Na) is set to a value 1, all the exciting energy of the transformer 2a can be discharged theoretically in the OFF period of the switches S by switching the switches S at a duty ratio of 50%. As a result, the magnetic saturation of the transformer 2a can be prevented firmly.

Also, if the leakage transformer is employed as the transformer 2a, the current also flows through the leakage inductance when the current flows via the windings 3 under the condition that the switches S are controlled into the ON state. Hence, the peak value of the current can be limited appropriately.

3rd Embodiment

Figure 3:
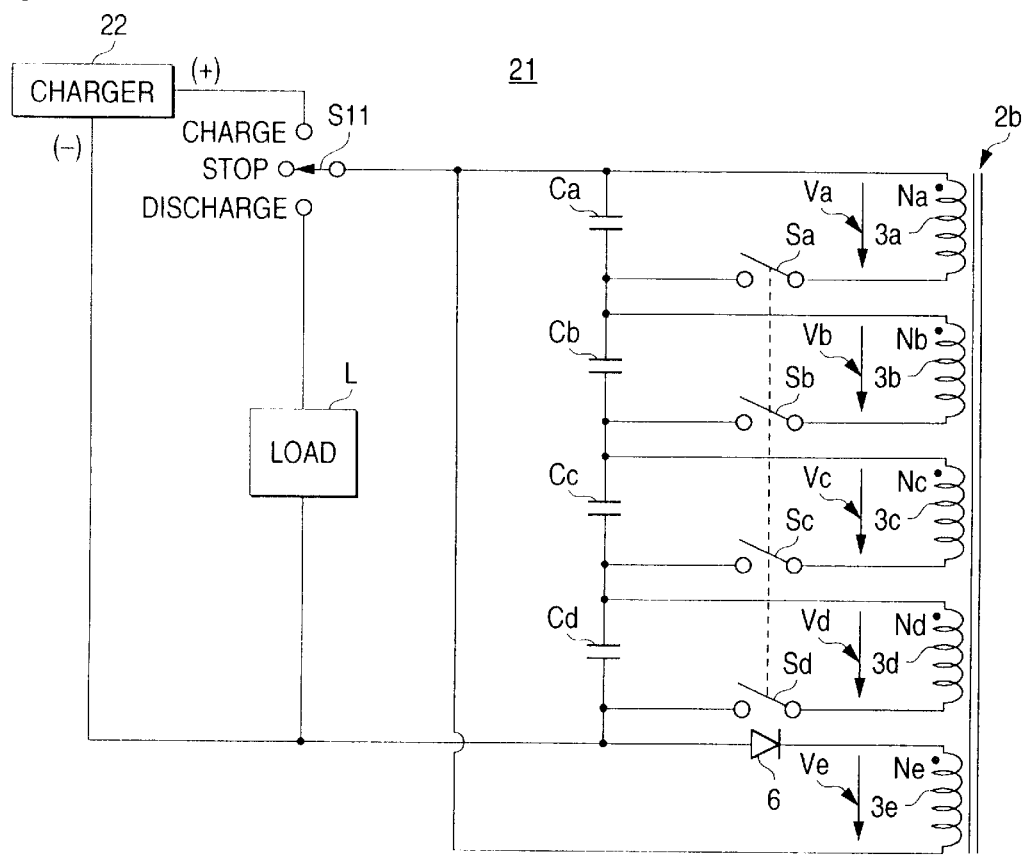
FIG. 3 is a circuit diagram of a charge/discharge unit 21 according to an embodiment of the present invention.

Next, an example in which the transfer unit 11 is applied to the charge/discharge unit 21 will be explained with reference to FIG. 3 hereunder.

The charge/discharge unit 21 charges the N (N is an integral number of more than 2) series-connected capacitors or secondary batteries (composite batteries which include the capacitors and the secondary batteries mixedly may be employed) as the energy storage means, and also supplies the storage energy of the energy storage means to the load L. An example will be explained hereinafter in which four capacitors Ca to Cd being series-connected and having the same capacity are employed as the energy storage means and are charged and discharged while maintaining the inter-terminal voltages of the capacitors Ca to Cd at the same voltage.

The charge/discharge unit 21 is constructed to have the electric double layer type capacitors Ca to Cd, a transformer 2b, switches Sa to Sd, S11, a diode 6, and a charger 22. In this case, the transformer 2b is constructed to have four windings 3a to 3d wound to the same numbers of turns Na to Nd mutually, and a reset winding 3e wound to the number of turn Ne which is four times the winding 3a, for example. Also, the switches Sa to Sd are controlled synchronously with the switching control of the switch S11, and switching-controlled merely in synchronous with the charge of the capacitors C by the charger 22 or the discharge from the capacitors C to the load L, and controlled to turn OFF when neither the charging nor the discharging is carried out. Further, the moving contact of the switch 11 is switched to the charge terminal in charging and is switched to the discharge terminal in discharging and switched to the stop terminal in non-charging and non-discharging. Also, the charger 22 is constructed to output the voltage enough to charge four capacitors Ca to Cd.

In this charge/discharge unit 21, when the switches S are controlled into the ON state in charging, the output current of the charger 22 flows via the switch S11 to charge the capacitors Ca to Cd. At the same time, the current based on the storage energy of the capacitor C whose inter-terminal voltage Vc is highest flows through the current path which comprises the plus terminal of the capacitor C, the winding 3, the switches S, and the minus terminal of the capacitor C. Thus, the inter-terminal voltages of other capacitors C are made equal into the same voltage and also the transformer 2b is excited. Then, when the switches S are controlled into the OFF state, voltages Va to Ve are induced in the windings 3a to 3e based on the storage energy of the transformer 2b, as shown in FIG. 3, respectively. In this case, the passing of the current generated by the voltages Va to Vd is blocked by the OFF-controlled switches Sa to Sd respectively. Therefore, the current based on the voltage Ve flows through the current path which comprises the winding end terminal of the winding 3e, the capacitors Ca to Cd, the diode 6, and the winding start terminal of the winding 3e. Thus, the capacitors Ca to Cd are charged and also the transformer 2b is magnetically reset. As a result, the energy is transferred to distribute from the capacitor C whose inter-terminal voltage is highest to other capacitors, whereby the inter-terminal voltages of the capacitors Ca to Cd are made equal into the same voltage.

In contrast, when the switch S11 is switched into the discharge terminal, the capacitors Ca to Cd are discharged to supply the current to the load L. At this time, if the switches Sa to Sd are continuously ON/OFF-controlled, the uniform of the inter-terminal voltages of the capacitors Ca to Cd is continuously carried out. Hence, the inter-terminal voltages of the capacitors Ca to Cd can be made equal inasmuch as the switches S are ON/OFF-controlled.

4th Embodiment

Figure 4:
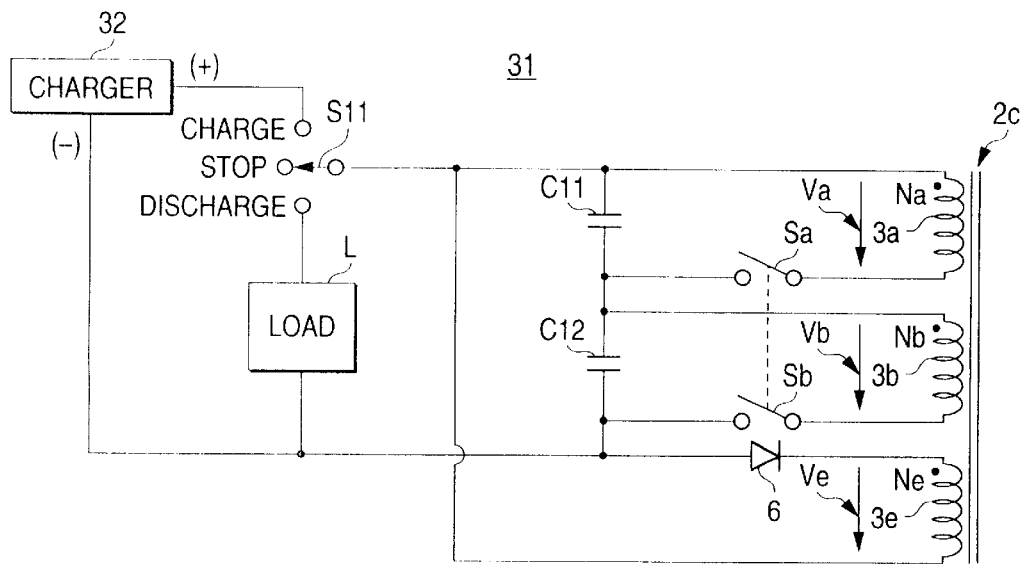
FIG. 4 is a circuit diagram of a charge/discharge unit 31 according to another embodiment of the present invention.

Next, a charge/discharge unit 31 which charges and discharges the capacitors as the energy storage means while keeping their different inter-terminal voltages mutually will be explained with reference to FIG. 4 hereunder.

The charge/discharge unit 31 comprises a charger 32, a switch S11, and a transformer 2c having three windings 3a, 3b, 3e, and is constructed to connect a series circuit of the winding 3a and the switch Sa across a capacitor 11 and connect a series circuit of the winding 3b and the switch Sb across a capacitor 12. In this case, assume that the capacitors are charged/discharged while maintaining the inter-terminal voltage of the capacitor C11 A times (A is a positive number) the capacitor C12. For this reason, the winding 3a is wound at an A-times turn ratio of the winding 3b, and also the winding 3e is wound at an (A+1)-times turn ratio of the winding 3b. In this charge/discharge unit 31, like the charge/discharge unit 21, during charging and discharging, the inter-terminal voltage of the capacitor C11 and the inter-terminal voltage of the capacitor C12 are maintained at voltages given by the above Eq. (1) when the switches S are controlled into the ON state and the OFF state.

According to the charge/discharge unit 31, the capacitors C11 and C12 can be charged/discharged with keeping the capacitors C11 and C12 at the different inter-terminal voltages mutually. In this case, the capacitors C11 and C12 may be constructed by a single capacitor, otherwise they may be constructed by a series circuit or a parallel circuit comprising a plurality of capacitors.

5th Embodiment

Figure 5:
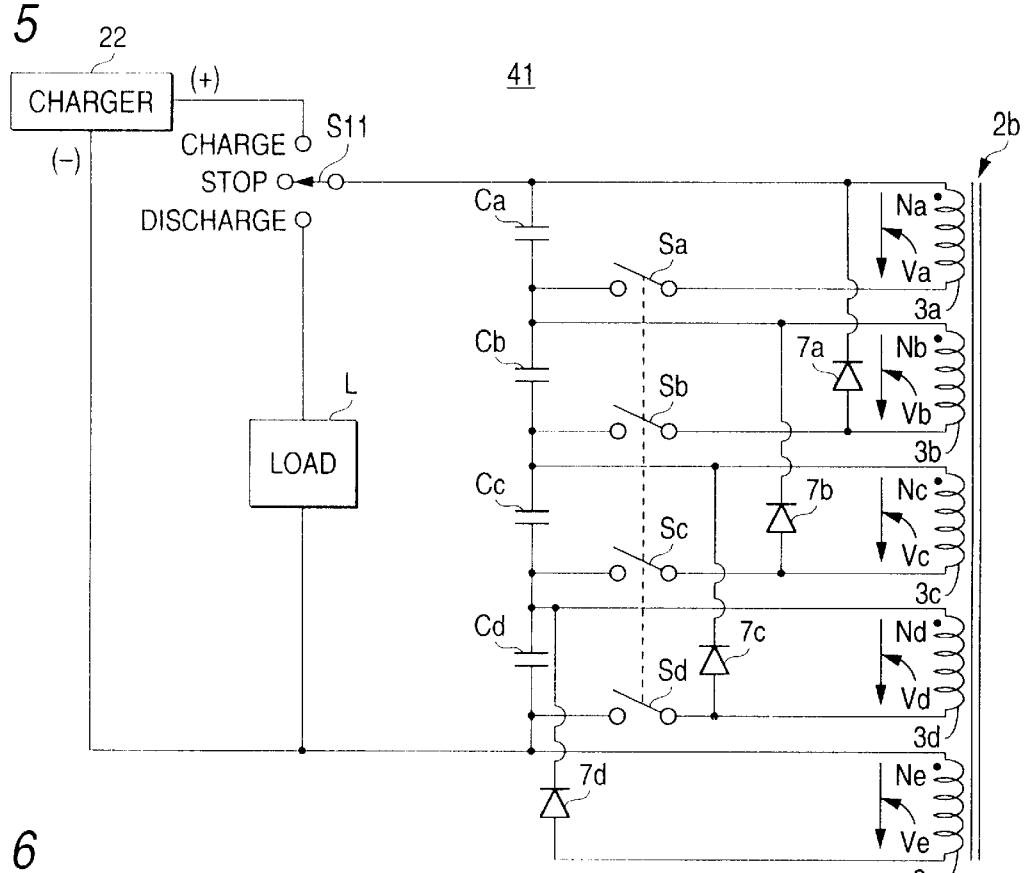
FIG. 5 is a circuit diagram of a charge/discharge unit 41 according to still another embodiment of the present invention.

Next, a charge/discharge unit 41 according to another embodiment will be explained with reference to FIG. 5 hereunder.

The charge/discharge unit 41 is constructed to have four capacitors Ca to Cd, a transformer 2b, switches Sa to Sd, S11, diodes 7a to 7d (referred to as "diodes 7" hereinafter if not particularly mentioned), and a charger 22. In this case, in the charge/discharge unit 41, first to N-th (N is a value 4) series circuits comprising the windings 3 of the transformer 2b and the switches S respectively are series-connected and also a reset winding 3e as the (N+1)-th winding is series-connected to the series-connected circuits such that the storage energy of the transformer 2b can be discharged to the capacitors C which are connected to the (M−1)-th winding via the M-th (M is an integral number of more than 2 but less than 5) winding 3 and the diodes 7. Here, assume that the windings Na to Ne of the windings 3a to 3e are set to the same number of turns mutually and that the capacitors Ca to Cd are uniformed mutually at the same inter-terminal voltage. Also, assume that, in order to discharge the exciting energy of the transformer 2b in the OFF-state controlled period, such OFF-state controlled period of the switches S is set equal to or longer than the ON-state controlled period.

In the charge/discharge unit 41, when the switches S are controlled into the OFF state, the current generated by the voltages Va to Ve induced in the windings 3a to 3e discharges the exciting energy of the transformer 2b to the capacitors C which are connected to the (M−1)-th winding via the M-th winding 3 and the diode 7. At this time, the capacitors C are uniformed at the voltage given by the above Eq. (1). Accordingly, the inter-terminal voltages of the capacitors are made equal only in the ON-state controlled period of the switches S in the foregoing charge/discharge unit 21, whereas the inter-terminal voltages of the capacitors are made equal in both the ON-state controlled period and the OFF-state controlled period of the switches S in the charge/discharge unit 41. As a result, the inter-terminal voltages of the capacitors can be made equal more surely and quickly.

6th Embodiment

Next, a charge/discharge unit 51 suitable for the case where the inter-terminal voltages of the capacitors Ca to Cd are different will be explained with reference to FIG. 6 hereunder.

Figure 6:
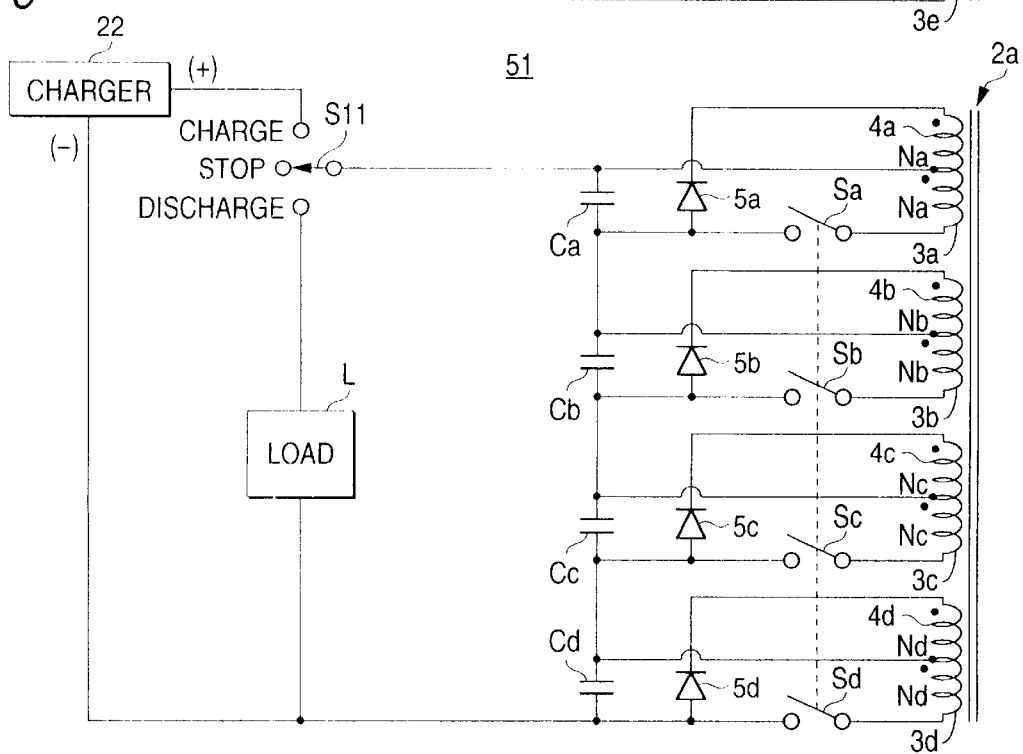
FIG. 6 is a circuit diagram of a charge/discharge unit 51 according to still another embodiment of the present invention.

As shown in FIG. 6, in the charge/discharge unit 51, a transformer 2a is constructed by series-connecting reset windings 4a to 4d to the windings 3a to 3d respectively. In this case, series-connected windings 3 and reset windings 4 are wound to the same number of turns mutually, for example, and the windings 3a to 3d are wound to the numbers of turns Na to Nd whose turn ratios are decided such that the inter-terminal voltages of the capacitors Ca to Cd can satisfy the above Eq. (1).

Basically, the charge/discharge unit 51 operates based on the operational principle similar to the transfer unit 11. Accordingly, the capacitors C are charged and discharged by the output current of the charger 22 such that their inter-terminal voltages are made equal to the voltage defined by the above Eq. (1).

Next, a merit achieved by charging and discharging the capacitors C while uniforming the inter-terminal voltages Vca to Vcd of the capacitors Ca to Cd will be explained hereunder.

The inter-terminal voltages Vc of the capacitors C can be expressed by:

$$Vc = I \times T/C \qquad (3)$$

where I is a charge/discharge current, T is a charge/discharge time, and C is a capacitance of the capacitor C.

According to Eq. (3), it can be seen that the inter-terminal voltages Vc is in inverse proportion to the capacitance C. Therefore, in case the capacitance C is varied, the inter-terminal voltage Vc is low in the capacitor with the large capacitance C while the inter-terminal voltage Vc is high in the capacitor with the small capacitance C, even when the identical current I is supplied. Accordingly, even when the capacitors C are charged by the same current for the same time, the capacitor with the small capacitance C can be charged quickly up to the rated withstand voltage but the capacitor with the large capacitance C cannot be sufficiently charged.

Meanwhile, the storage energy E of the capacitor can be expressed by following Eq. (4), which is proportional to square of the inter-terminal voltages Vc:

$$E = C \times Vc^2/2 \qquad (4)$$

Therefore, the storage energy E is largely changed even when the inter-terminal voltages Vc are slightly different. Therefore, for example, it is preferable that, in order to increase sufficiently the storage energy E of the driving secondary batteries employed in the electric vehicle, etc., the inter-terminal voltages Vc should be charged exactly up to the rated withstand voltage. For this reason, if a plurality capacitors having different capacities mutually are charged simultaneously by one charging device, it is most preferable from the viewpoint of the charging efficiency to charge the capacitors just up to the rated withstand voltage while uniforming the inter-terminal voltages Vc. Therefore, it is possible to say that the merit of charging the capacitors while uniforming the start Vca to Vcd of the capacitors Ca to Cd is extremely significant.

Next, merits achieved by uniforming the inter-terminal voltages of a plurality of capacitors when the discharge from the series circuit comprising a plurality of capacitors, which have different capacities mutually, to the load L is executed will be explained hereunder.

Figure 7A:
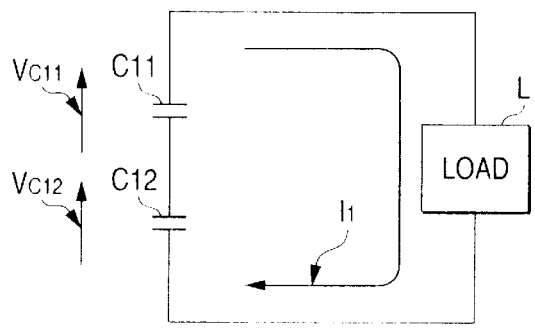
Figure 7B:
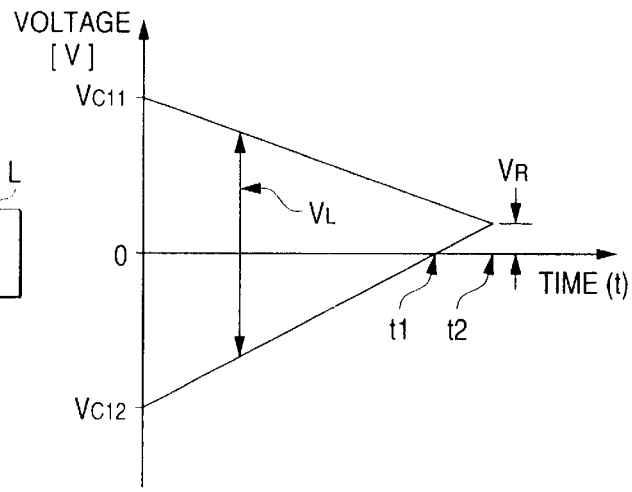

First, the case will be explained with reference to FIGS. 7A and 7B hereunder where charges are discharged from the series circuit of the capacitors C11 and C12, which are charged to the same voltage mutually, to the load L. Assume that the capacitor C11 shown in FIG. 7A has a larger capacity than that of the capacitor C12 and that, as shown in FIG. 7B, the inter-terminal voltage Vc11 of the capacitor C11 and the inter-terminal voltage Vc12 of the capacitor C12 are maintained at the equal voltage at the time point of starting the discharge for the load L (t=0). Accordingly, the load end voltage VL is maintained at a value of (Vc11+Vc12=2·Vc11) at this time point. Then, when the current I1 is discharged to the load L until the time point t1, the discharge of the capacitor C12 with the small capacity is finished and the inter-terminal voltage Vc12 becomes 0 V. After this, since the current I1 being discharged from the capacitor C11 charges the capacitor C12 in the opposite direction, the load end voltage VL is lowered abruptly. Then, as shown in FIG. 7B, although the storage energy of the capacitor C11 is not completely supplied to the load L, the load end voltage VL becomes 0 V at the time point t2. Under this condition, the storage energy of the capacitor C11 still remains in the capacitors C11 and C12.

Figure 8A:
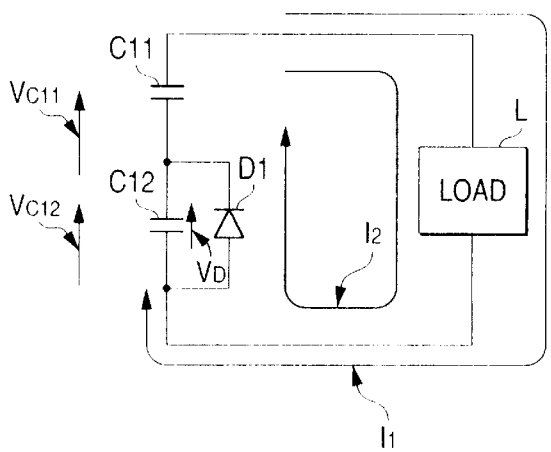
Figure 8B:
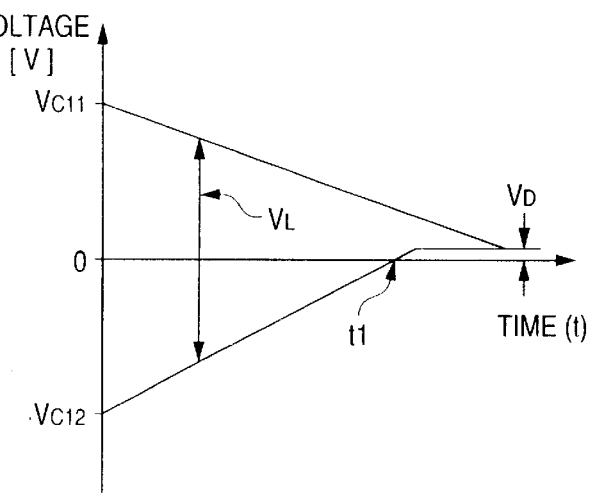

In the meanwhile, as shown in FIG. 8A, in order to prevent the capacitor C12 from being charged in the opposite direction, it may be considered that a diode D1 is connected in parallel with the capacitor C12. In this case, after the time point t1 at which the discharge of the capacitor C12 has been finished, the current I2 being discharged from the capacitor C11 flows through the current path which comprises the plus terminal of the capacitor C11, the load L, the diode D1, and the minus terminal of the capacitor C11. Thus, the inter-terminal voltage Vc12 of the capacitor C12 is limited to the forward voltage VD of the diode D1 and the reverse charging can be prevented. As a result, the energy can be supplied much more to the load L rather than the circuit shown in FIG. 7A. However, in this case, since the current I2 flows through the diode D1, power loss due to the diode D1 is in vain.

Figure 9:
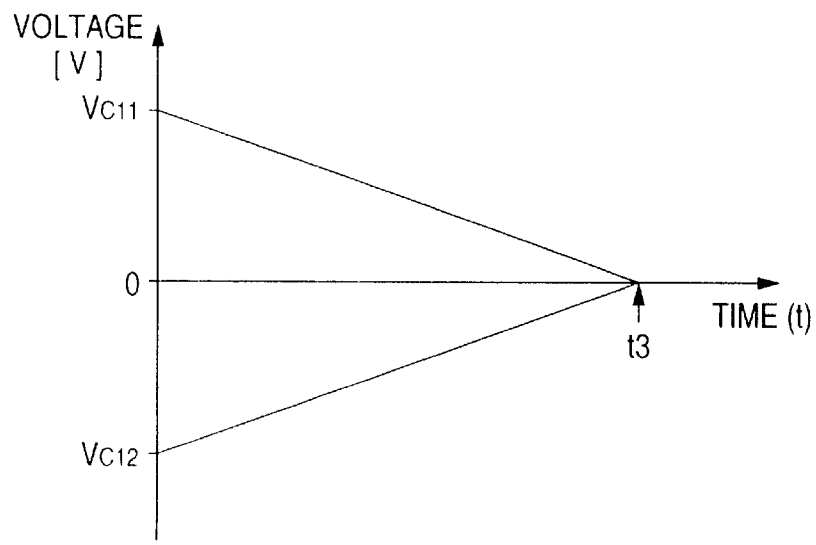
FIG. 9 is a voltage characteristic view showing the discharging characteristic when the inter-terminal voltages VC11 and VC12 of both capacitors C11 and C12 are uniformed.

At any rate, the capacitors are discharged while uniforming the inter-terminal voltages Vc11, Vc12 of both capacitors C11 and C12, energy discharge by the capacitors C11, C12 is finished simultaneously at the time point t3, as shown in FIG. 9. As a result, since the charging of the capacitor C12 by the storage energy of the capacitor C11 is not performed prior to the time point t3, all the storage energy of the capacitors C11 and C12 can be effectively supplied to the load L. Since the energy portion which is different between the capacitor C11 and the capacitor C12 is not directly supplied to the capacitor C12, the wasteful power loss due to the diode D1 in the circuit in FIG. 8A can be prevented and in addition such a merit can be achieved that the sharp voltage drop of the load end voltage VL is not caused.

In this fashion, according to the above charge/discharge units 21, 31, 41 and 51, since the capacitors can be charged and discharged while maintaining the inter-terminal voltages of the capacitors C, which are parallel-connected to the series circuits of the windings 3 and the switches S, at the voltage given by the above Eq. (1), the energy can be stored much more in the capacitors C and also the energy can be discharged effectively from the capacitors C. In addition, because the number of circuit parts is small, the charge/discharge unit can be constructed in reduced size inexpensively. Further, since it is requested merely to ON/OFF-control the switches S, the charge/discharge unit can be controlled easily. Moreover, because the short-circuit failure of the capacitors C is not brought about, the energy can be transferred among the capacitors C, C with high reliability.

Figure 10:
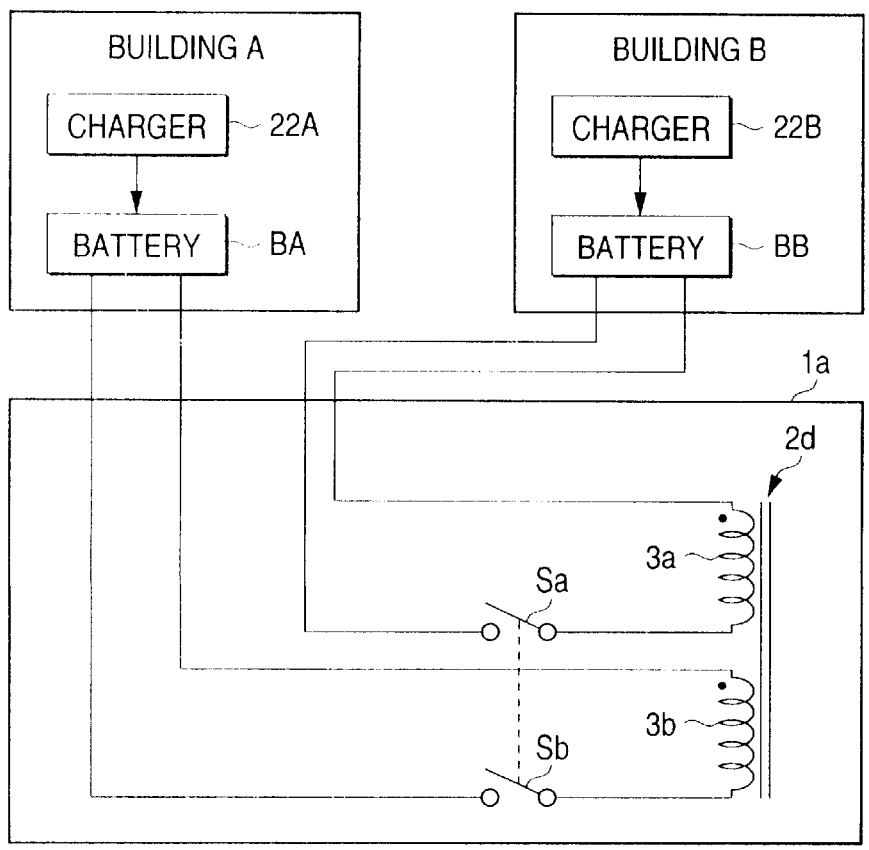
FIG. 10 is a view of a system configuration of a storage system S1.

The present invention is not limited to the above embodiments of the present invention, and its configuration may be modified appropriately. For example, although the explanation has been made while taking the charge/discharge units 21, etc. as examples in the embodiments of the present invention, a storage system S1 may be constructed, as shown in FIG. 10, for example. In this case, the storage system S1 comprises a battery BA installed in a building A, a charger 22A for charging the battery BA, a battery BB installed in a building B and having a different inter-terminal voltage from the battery BA, a charger 22B for charging the battery BB, and a transfer unit 1a. The transfer unit 1a includes a transformer 2d having windings 3a and 3b which are magnetically coupled to each other, and switches Sa and Sb which are series-connected to both windings 3a and 3b respectively and ON/OFF-controlled in synchronous with each other. In FIG. 10, ideal circuits are illustrated. According to this storage system S1, the storage energy can be transferred mutually by controlling the switching of both switches Sa, Sb in the situation that the batteries BA and BB are isolated mutually. Therefore, for example, if the charged voltage of the battery BB is reduced because of the failure of the charger 22B, the storage energy of the battery BA can be automatically transferred to the battery BB such that both inter-terminal voltages of both batteries BA and BB can satisfy the above Eq. (1).

Besides, the transfer unit shown in FIG. 2 can be applied to the power supply unit. More particularly, the case will be explained as an example where, for example, the capacitor Ca corresponds to the output side capacitor of the switching power supply unit (not shown) and the voltage is stabilized at a predetermined voltage by the switching power supply unit. In the conventional art, when a plurality of power supply outputs which have different voltage values and output current values are generated based on the DC voltage generated by one switching circuit, the switching power supply unit generates a plurality of power supply outputs by further connecting another switching power supply unit to the output side capacitor of the switching power supply unit. In this case, there is such a problem that, if the forward type or fly-back type switching power supply unit is employed as another switching power supply unit, a circuit configuration becomes complicated and the output stability is degraded. In addition, in the forward type switching power supply unit, the current flows through the secondary winding of the switching transformer only when the main switching device is controlled into the ON state. In contrast, in the fly-back type switching power supply unit, the current flows through the secondary winding of the transformer only when the main switching device is controlled into the OFF state. For this reason, there is such a problem that, since the utilization factor of the secondary winding of the transformer is bad in both switching circuits, the output ripple voltage is large and the peak current is large. Besides, if a plurality of other switching power supply units are arranged to correspond to a plurality of power supply outputs, a plurality of switching noises each has a different frequency are generated. As a result, there are such problems that beats between the noises are generated and reduction in the EMI noises becomes extremely difficult.

In the power supply unit employing the transfer unit 11, when the capacitor Ca is stabilized at a predetermined voltage, the storage energy of the capacitor Ca can be easily distributed to other capacitors Cb to Cd by ON/OFF-controlling the switches Sa to Sd. Accordingly, if the inter-terminal voltages Vcb to Vcd of other capacitors Cb to Cd are used as the power supply output voltages, a plurality of power supply outputs that have different voltage values and different output current values can be generated easily while stabilizing them.

In this case, when the switches S are controlled into the ON state, the storage energy of the capacitor Ca is distributed into the capacitors Cb to Cd via the windings 3b to 3c of the transformer 2a. While, when the switches S are controlled into the OFF state, the storage energy of the capacitor Ca is distributed into the capacitors Cb to Cd via the reset windings 4b to 4c of the transformer 2a. Therefore, the current can flow through the windings 3 and 4 of the transformer 2a in both the ON states and the OFF stages of the switches S. As a result, the utilization factor of the windings 3 and 4 of the transformer 2a can be improved extremely and also the peak current value at that time can be suppressed. Accordingly, reduction in size of circuit parts can be achieved and also the output ripple voltage can be reduced sufficiently.

Further, concerning the switching noise, in the power supply unit employing the transfer unit 11, since the switches S are switching-controlled in synchronous with each other, the switching noise to be generated is limited to one type. As a result, no beat between the noises is generated and it is ready to reduce sufficiently the EMI noise. Further, the power loss in distributing the energy can be sufficiently reduced by utilizing FETs and bipolar transistors in place of the diodes 5a to 5d.

Moreover, in the embodiments of the present invention, the electric double layer capacitor has been explained as the energy storage means as the example. The energy storage means is not limited to this, and various large capacity capacitors, various secondary batteries, etc. may be employed.

7th Embodiment

Next, an operational principle of an energy transfer unit according to the present invention will be explained with reference to FIG. 11.

Figure 11:
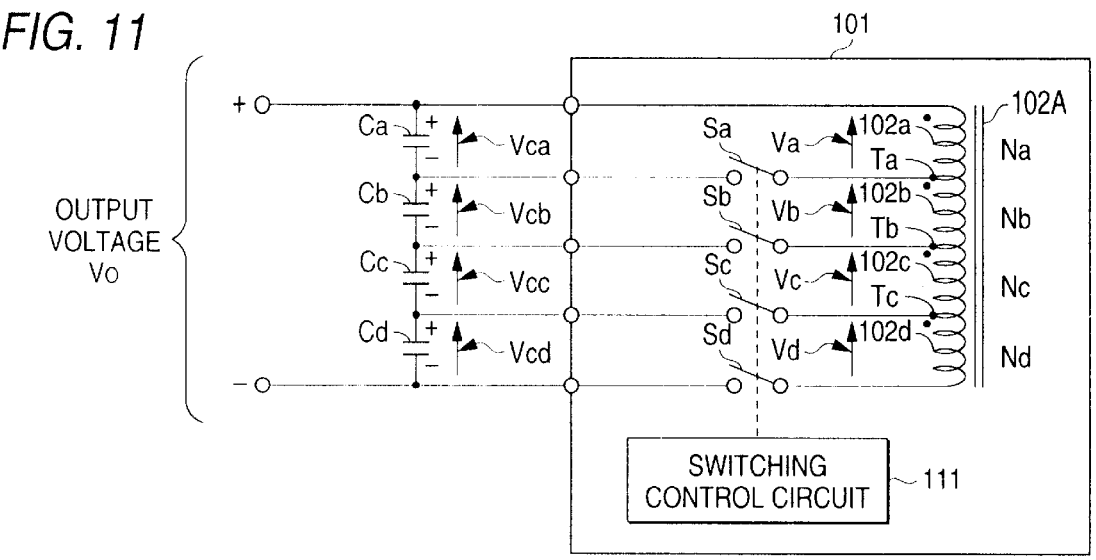
FIG. 11 is a circuit diagram of a transfer unit 101 for explaining an operational principle of the present invention.

As shown in FIG. 11, a transfer unit 101 is constructed to enable four series-connected capacitors Ca to Cd as the electrical energy storage means to transfer the electrical energy among them mutually, for example. More particularly, the transfer unit 101 includes a transformer 102A, switches Sa to Sd, and a switching control circuit 111. In this case, windings 102a to 102d (referred to as "windings 102" hereinafter if not particularly mentioned) are series-connected to the transformer 102A, and also intermediate taps Ta to Tc (referred to as "intermediate taps T" hereinafter if not particularly mentioned) are formed at connection points between the windings 102 respectively. The windings 103a to 103d are magnetically coupled with each other via the iron core, and are wound to the number of turns Na, Nb, Nc, and Nd respectively. This transformer 102 functions as an ideal transformer which has a resistance component of the windings 103 of 0Ω), no leakage inductance, and no exciting current.

While, the switches S are composed of an FET or a bipolar transistor, for example, and are held in the normally open state at the time of switching OFF. Also, one ends of the switches Sa to Sc are connected to the intermediate taps Ta to Tc of the transformer 102A respectively, and other ends thereof are connected to the connection points of the capacitors C respectively. In addition, one end of the switch Sd is connected to the winding end terminal of the winding 102d, and the other end thereof is connected to the minus terminal of the capacitor Cd as the earth potential. Further, the switching control circuit 11 ON/OFF-controls the switches S synchronously mutually.

In this transfer unit 101, when the switches S are switched by the switching control circuit 111, the energy transfer occurs to distribute into the capacitors C such that the above Eq. (1) is satisfied between the inter-terminal voltages Vca to Vcd of the capacitors Ca to Cd. Accordingly, the inter-terminal voltages Vca to Vcd of the capacitors C can be made equal by setting the number of turns of the windings 102 to the same number. Since the operational principle is similar to the transfer unit 121, their detailed operational explanation will be omitted.

In this transfer unit 101, winding start portions of the windings 102a are connected to the plus terminals of the capacitors Ca. Other ends of the switches Sa to Sc are connected to the connection point between the capacitor Ca and the capacitor Cb, the connection point between the capacitor Cb and the capacitor Cc, and the connection point between the capacitor Cc and the capacitor Cd respectively. Other end of the switch Sd is connected to the minus terminal of the capacitor Cd. Then, the switching control circuit switching-controls the switches Sa to Sd. In this condition, the output voltage $V_0$ is supplied from both ends of the capacitors Ca to Cd to the load (not shown) in any period during when the switches S are switched and when the switching is stopped.

At this time, in the transfer unit 101, the energy transfer occurs to distribute among the capacitors Ca to Cd. For example, in the situation that the inter-terminal voltage Vca of the capacitor Ca is higher than the voltage specified by the above Eq. (1), if the switches Sa to Sd are controlled into the ON state, the current flows through the current path comprising the plus terminal of the capacitor Ca, the winding 102a, the intermediate tap Ta, the switch Sa, and the minus terminal of the capacitor Ca. In this case, the voltage Va which is equal to the inter-terminal voltage Vca of the capacitor Ca is generated in the winding 102a, whereas voltages Vb to Vd which mate with their ratios to the number of turns Na of the winding 102a are generated in other windings 102b to 102d respectively. In detail, the voltage Vb having a value (voltage Va×Nb/Na) is generated in the winding 2b, the voltage Vc having a value (voltage Va×Nc/Na) is generated in the winding 2c, and the voltage Vd having a value (voltage Va×Nd/Na) is generated in the winding 102d.

At this time, since the voltages Vb to Vd becomes voltages which are higher than the corresponding inter-terminal voltages Vcb to Vcd respectively, the current generated by the voltages Vb to Vd continues to flow through the current paths which comprise the windings 102, the capacitors C, and the switches S, thereby charging the capacitors Cb to Cd respectively. In this case, for example, the connection line for connecting the intermediate tap Tb to the connection point between the capacitors Cb and Cc is commonly used as the current path for the capacitor Cb and the capacitor Cc. Then, the charging of respective capacitors C in which the voltages Vb to Vd become equal to the corresponding inter-terminal voltages Vcb to Vcd is stopped sequentially. Finally, the above Eq. (1) can be satisfied. As a result, the energy transfer occurs to distribute from the capacitor Ca to other capacitors Cb to Cd, so that the above Eq. (1) can be satisfied.

In this fashion, according to the transfer unit 101, the connection line for connecting the intermediate tap Tb to the connection point between the capacitors Cb and Cc is commonly used as the current path for the capacitor Cb and the capacitor Cc. Similarly, the connection lines for connecting other intermediate taps T to the connection points between the capacitors C and C are commonly used as the current paths for both capacitors C and C. Therefore, if N capacitors C are series-connected, the number of connection can be reduced rather than 2·N since the number of the connection cables to be connected to these capacitors C is (N+1) In particular, if the number of the capacitors C is large, the number of the connection cables can be reduced by almost half. As a result, the cost of the wiring operation can be reduced and the cost of wiring material can be reduced by almost half.

8th Embodiment

Next, an actual circuit configuration of the practical transformer will be explained with reference to FIG. 12 hereunder. In this case, their redundant explanation will be omitted by affixing the same symbols to the same constituent elements as the transfer unit 101, and also their redundant explanation of the same operation will be omitted.

Figure 12:
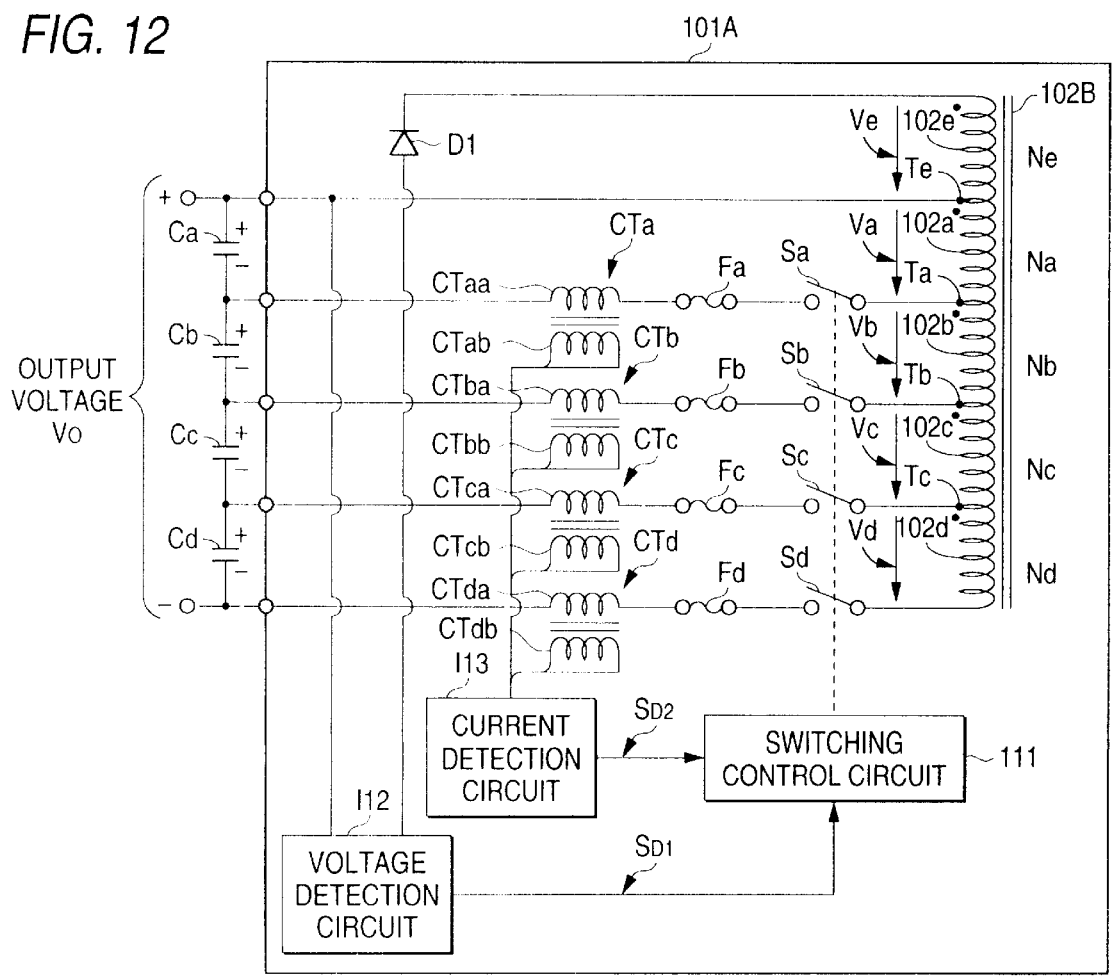
FIG. 12 is a circuit diagram of a transfer unit 101A according to an embodiment of the present invention.

As shown in FIG. 12, a transfer unit 101A comprises a transformer 102B. In this transformer 2B, four windings 102a to 102d which are wound to the same numbers of turns Na to Nd mutually and a reset winding 102e (referred to as a "reset winding 102" hereinafter if not particularly mentioned) are series-connected, and the intermediate taps Ta to Tc and Te (referred to as "intermediate taps T" hereinafter if not particularly mentioned) are formed at the connection points between the windings 102 respectively. In this case, the windings 102a to 102e are magnetically coupled via the iron core mutually. Also, the transfer unit 1A comprises fuses Fa (or Fb to Fd, referred to as "fuses F" hereinafter if not particularly mentioned) and current transformers CTa (or CTb to CTd, referred to as "current transformers CT" hereinafter if not particularly mentioned) which are series-connected between switches Sa (or Sb to Sd) and the connection terminals for the capacitors C, and comprises a voltage detection circuit 112, a current detection circuit 13, and a reset current discharging diode D1. The configuration includes only either the fuses F or the current transformers CT may be employed.

The fuses F correspond to an overcurrent protecting means in the present invention, and can prevent the current breakdown of the switches S and the burnout of the wirings and the transformer 102B by cutting off the overcurrent when the overcurrent which exceeds the rated maximum current of the switches S starts to flow. The current transformers CT correspond to a current detecting means in the present invention, and detects the current value which flows through the primary windings CTaa (or CTba to CTda) in switching and outputs from the secondary windings CTab (or CTbb to CTdb). The voltage detection circuit 112 detects the inter-terminal voltages of the series-connected capacitors Ca to Cd the, and outputs a detection signal SD1 to the switching control circuit 111 when such inter-terminal voltages exceed a predetermined voltage which corresponds to 60% of an added value of the rated charging voltage of the capacitors C, for example, thereby causing the switching control circuit 111 to switch the switches S. Also, the current detection circuit 113 outputs a detection signal SD2 to the switching control circuit 111 when the current values output from the secondary windings of the current transformers CT exceed a predetermined voltage (90% of the rated current of the switches S, for example), thereby causing the switching control circuit 111 to stop the switching of the switches S.

In this transfer unit 101A, when the capacitors Ca to Cd are charged up to a predetermined voltage by the charger (not shown), the voltage detection circuit 112 outputs the detection signal SD1 to the switching control circuit 111. Then, the switching control circuit 111 causes the switches S to switch synchronously to uniform the inter-terminal voltages of the capacitors C, like the above transfer unit 101. At this time, since the exciting current flows in the actual transformer 2B, the transformer 2a is magnetized in the ON-state controlled period of the switches S. Then, when the switches S are controlled into the OFF state, the voltages Va to Ve are generated in the windings 2a to 2e based on the exciting energy of the transformer 2B in response to their turn ratios respectively, as shown in FIG. 12, since the windings 2a to 2e are magnetically coupled by the common iron core. In this case, the passing of the currents generated based on the voltages Va to Vd can be blocked by the OFF-controlled switches Sa to Sd respectively. Accordingly, the current based on the voltage Ve flows through the current path comprising the intermediate tap Te, the capacitors Ca to Cd, the diode D1, and the winding start terminal of the winding 2e, so that the capacitors Ca to Cd are charged and also the transformer 102b is magnetically reset.

In this case, a turn ratio (Ne/Na) of the winding 102e to the winding 102a is set to a value 104, all the exciting energy of the transformer 102B can be discharged theoretically in the OFF period of the switches S by switching the switches S at a 50% duty ratio. Thus, the magnetic saturation of the transformer 102B can be prevented firmly. As a result, all the energy stored in the transformer 102B is transferred to distribute into the capacitors C. Meanwhile, when the inter-terminal voltages of the capacitors Ca to Cd are lowered rather than the predetermined voltage because the output voltage $V_0$ is supplied to the load in the condition that the charging is stopped, the voltage detection circuit 112 stops to output the detection signal SD1 to the switching control circuit 111. At this time, the switching control circuit 111 can reduce the loss caused in switching the switches S by stopping the switching of the switches S.

When the inter-terminal voltages of the capacitors C are fluctuated extremely, in some cases the large current may flow through from the capacitor C that has the high inter-terminal voltage to the capacitor C that has the low inter-terminal voltage in switching the switches S. In such case, the current transformer CT detects such current, and then outputs it to the current detection circuit 113. In this case, when the current flowing through the primary windings of the current transformers CT exceeds a predetermined current value, the current detection circuit 113 stops the switching of the switches S by outputting the detection signal SD2 to the switching control circuit 111. Accordingly, the current breakdown of the switches S and the burnout of the wirings and the transformer 102B can be prevented. If the leakage transformer is employed as the transformer 102B, the current also flows through the leakage inductance when the current flows via the windings 102 under the condition that the switches S are controlled into the ON state. Hence, the peak value of the current can be limited appropriately. Also, when the excessive current exceeding the maximum rated current of the switches S starts to flow through the switches S, the fuses F provided in the current paths are cut off. Therefore, the destruction of the switches S and the burnout of the wirings and the transformer 102B can be prevented. Accordingly, the transfer unit 101A can be constructed with high reliability.

9th Embodiment

Figure 13:
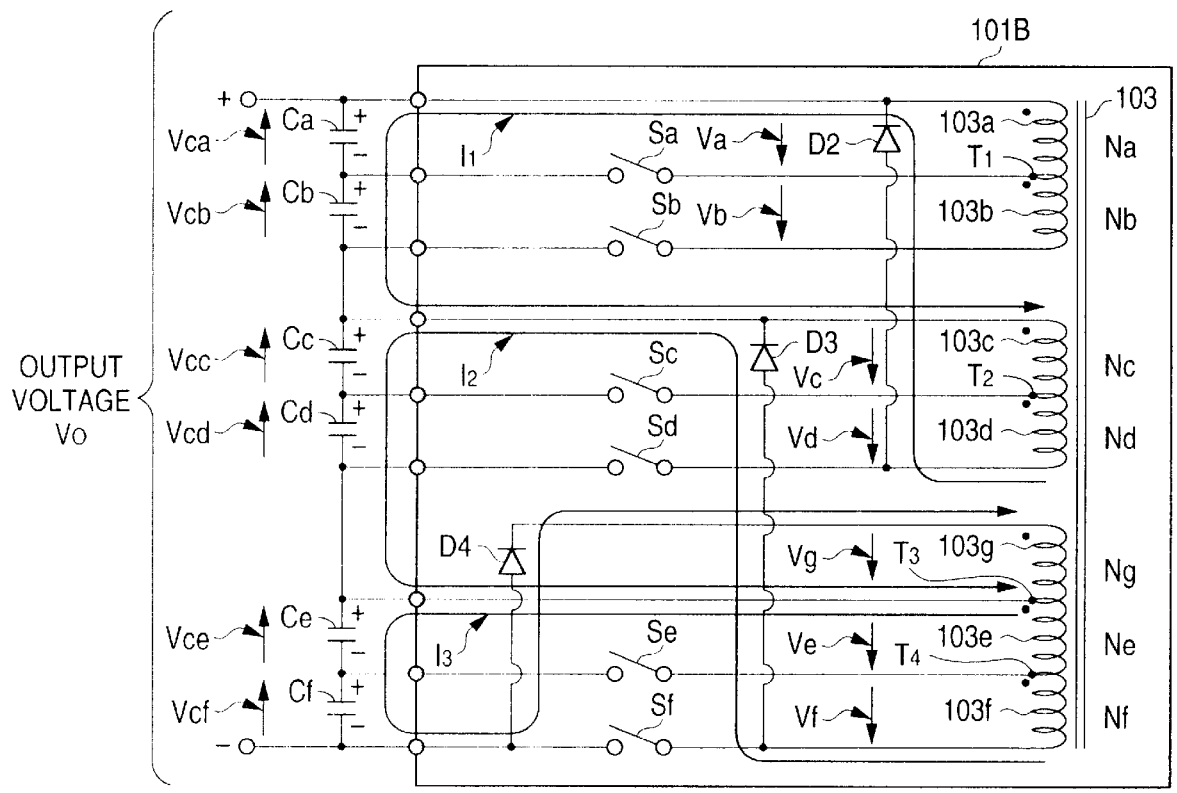
FIG. 13 is a circuit diagram of a transfer unit 101B according to another embodiment of the present invention.

Next, a transfer unit 101B according to another embodiment will be explained with reference to FIG. 13 hereunder. In the transfer unit 101B described in the following, differences from the transfer unit 101A will be mainly explained, and thus the illustration of circuit parts which are common in operation to the switching control circuit 111, etc. will be omitted hereunder.

The transfer unit 101B includes a transformer 103 in place of the transformer 102B in the transfer unit 101A. The windings 103a and 103b which are series-connected and at a connection point of which an intermediate tap T1 is provided, the windings 103c and 103d which are series-connected and at a connection point of which an intermediate tap T2 is provided, and the windings 103e and 103f and a reset winding 103g which are series-connected and at connection points of which intermediate taps T3, T4 are provided are wound on the transformer 103 such that they are isolated and magnetically coupled with each other. In this case, the windings 103a to 103f are wound mutually to the same number of turns Na to Nf, and the winding 103g is wound to the number of turns Ng which is twice the winding 103e. Also, the transfer unit 1B has diodes D2 to D4 for discharging the exciting energy of the transformer 103.

In the transfer unit 101B, when the switches S are controlled into the switching-ON state, the energy transfer occurs such that the inter-terminal voltages Vca to Vcf of the capacitors Ca to Cf can satisfy following Eq. (5) since the current flows from the plus terminal of the capacitor C whose voltage is higher than the voltage specified by the following Eq. (5) to the minus terminal thereof, like the transfer unit 101A. While, when the switches S are controlled into the switching-OFF state, the current I1 generated by the voltages Vc and Vd induced in the windings 103c and 103d flows through the current path comprising the winding end terminal of the winding 103d, the diode D2, the capacitors Ca and Cb, and the winding start terminal of the winding 103c. Similarly, the current I2 generated by the voltages Ve and Vf induced in the windings 103e and 103f flows through the current path comprising the winding end terminal of the winding 103f, the diode D3, the capacitors Cc and Cd, and the winding start terminal of the winding 103e. Similarly, the current I3 generated by the voltage Vg induced in the reset winding 103g flows through the current path comprising the winding end terminal of the winding 103g, the capacitors Ce and Cf, the diode D4, and the winding start terminal of the winding 103g. Accordingly, the exciting energy of the transformer 103 is discharged to distribute into the series circuit of the capacitors Ca and Cb, the series circuit of the capacitors Cc and Cd, and the series circuit of the capacitors Ce and Cf.

$$Vca:Vcb:Vcc:Vcd:Vce:Vcf=Na:Nb:Nc:Nd:Ne:Nf \quad (5)$$

As a result, when the switches S are controlled into the OFF state, the exciting energy of the transformer 103 is transferred into the series circuit of a set of capacitors C and C whose inter-terminal voltages are lowest and then transferred preferentially sequentially into the series circuit of a set of capacitors C and C whose inter-terminal voltages are lower until the discharge of the exciting energy is completed. Therefore, during when the switches S are controlled into the switching-OFF state, the exciting energy of the transformer 103 can be effectively discharged rather than the transfer unit 101A in which the energy is discharged collectively to the series circuits of all capacitors Ca to Cd.

10th Embodiment

Next, the driving system for controlling the switching of the switches S will be explained with reference to FIG. 14 hereunder.

Figure 14:
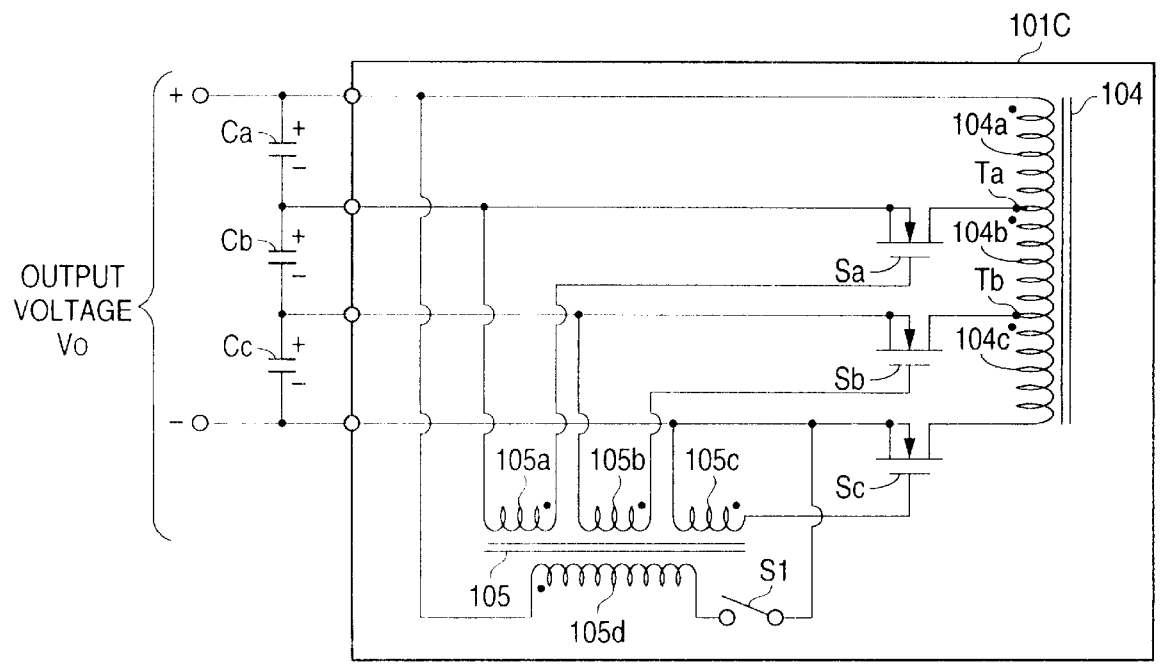
FIG. 14 is a circuit diagram of a transfer unit 101C according to another embodiment of the present invention.

A transfer unit 101C shown in FIG. 14 is a transfer unit for controlling ON/OFF of the switches S based on the separately excited system, and comprises a transformer 104 in which windings 104a to 104c are series-connected and intermediate taps Ta and Tb are provided at the connection points, switches Sa to Sc composed of FETs, and a transformer 105 in which secondary windings 105a to 105c are connected between the gate-source of the switches S and a primary winding 105d is parallel-connected to a series circuit of the capacitors Ca to Cc via the switch S1. In this case, the switch S1 is composed of an FET or a bipolar transistor, for example, and is ON/OFF-controlled in synchronous with a switching synchronizing signal which is output from the switching control circuit provided on the outside of the unit.

In this transfer unit 101C, when the switch S1 is ON/OFF-controlled, the current flows through the primary winding 105d of the transformer 105 and voltages are induced in the secondary windings 105a to 105c at that time. Then, since the induced voltages are supplied to the switches Sa to Sc, the switches Sa to Sc are ON/OFF-controlled in synchronous with a switching frequency of the switch S1. Therefore, ON/OFF switching of all switches Sa to Sc can be controlled without fail in synchronous with a switching synchronizing signal by inputting the switching synchronizing signal from the outside of the unit.

In this fashion, according to the above transfer units 101 and 101A to 101C, since the capacitors C can be charged and discharged with holding the inter-terminal voltages of the capacitors C at the voltage defined by Eq. (1) or Eq. (5), the energy can be stored much more in the capacitors C and also the energy can be discharged effectively from the capacitors C. Also, since the intermediate taps T are provided at the connection points between the windings of the transformers and then the intermediate taps T are connected to the connection points between the capacitors C and C, the number of the connection cables to be connected to the capacitors C can be reduced. As a result, the cost of the wiring operation can be reduced and also the cost of wiring material can be reduced by half. In addition, because the number of circuit parts is small, the transfer units 101 and 101A to 101C can be constructed small in size and inexpensively.

Figure 15:
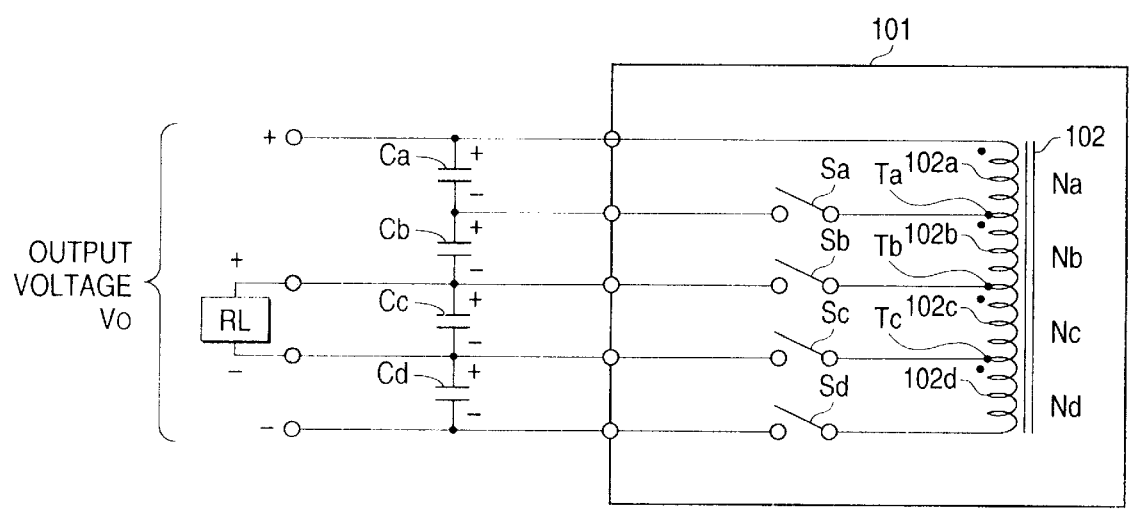
FIG. 15 is a circuit diagram of the transfer unit 101 showing a method of supplying storage energy of capacitors to a load.

The present invention is not limited to the above embodiments of the present invention and the configuration may be modified appropriately. For example, the method of supplying the storage energy in the capacitors C to the load is not limited to the above embodiments, and, as shown in FIG. 15, the energy can be supplied from both ends of the capacitor C (e.g., capacitor Cc in FIG. 15) or both ends of any number of capacitors C to the load RL. In this case, as shown in FIG. 15, in case the energy is supplied from both ends of the particular capacitor Cc to the load RL, a larger amount of current flows through the capacitor Cc. Therefore, it is preferable that a wire diameter of the winding 102 (winding 102c in this example) series-connected to the capacitor Cc should be formed thicker than a wire diameter of other windings 102.

In addition, the present invention is not limited to the application for uniforming the inter-terminal voltages of the capacitors C serving as cells in the vehicle battery. For example, in the storage system in which large capacity storage means are series-connected, etc., the present invention may be applied to make equal the inter-terminal voltages of the large capacity storage means, to keep the inter-terminal voltages at the voltages in accordance with the turn ratios of the windings in the transformer, or the like. It is of course that the present invention may be applied in any applications.

11th Embodiment

Figure 16:
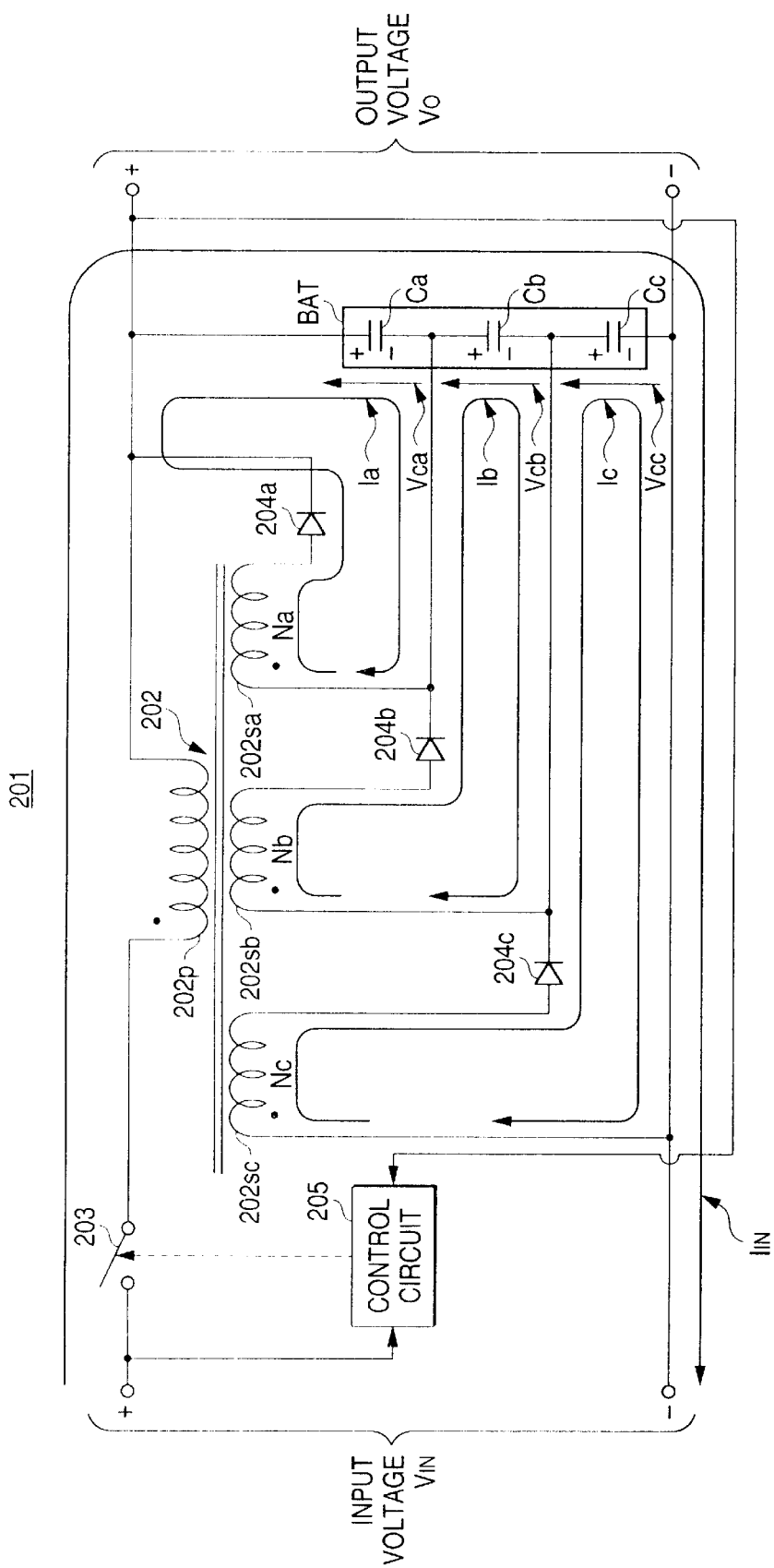
FIG. 16 is a circuit diagram of a charge unit 201 according to an embodiment of the present invention.

Next, a charge unit 201 shown in FIG. 16 is suitable for charging the battery which is constructed by series-connecting a plurality of storage elements whose inter-terminal voltage is fluctuated largely, e.g., ion batteries like lithium ion batteries, electric double layer capacitors, etc. The case where a battery BAT being constructed by series-connecting the electric double layer capacitors Ca to Cc as storage elements is charged will be explained as an example hereinafter.

The charge unit 201 is constructed as the chopper circuit as a whole. The charge unit 201 comprises a transformer 202 having a primary winding 202p which corresponds to a first winding in the present invention, and secondary windings 202sa to 202sc which correspond to second windings in the present invention and are identical in number to the capacitors Ca to Cc; a switching element 203 formed of an FET or a transistor and series-connected to the primary winding 202p; diodes 204a to 204c series-connected to the secondary windings 202sa to 202sc respectively; and a control circuit 205 for controlling ON/OFF of the switching element 203.

In this case, the primary winding 202p of the transformer 202 is connected in series with the switching element 203 and the battery BAT. Also, the winding start terminal of the secondary winding 202sc is connected to the negative electrode terminal of the battery BAT, and the winding end terminal thereof is connected to the winding start terminal of the secondary winding 202sb and the positive terminal of the capacitor Cc via the diode 204c. In addition, the winding end terminal of the secondary winding 202sb is connected to the winding start terminal of the secondary winding 202sa and the positive terminal of the capacitor Cb via the diode 4b. The winding end terminal of the secondary winding 202sa is connected to the positive terminal of the capacitor Ca via the diode 204a. Meanwhile, the control circuit 205 controls ON/OFF of the switching element 203 in accordance with the PWM (Pulse Width Modulation) control system, for example, such that the values of the charge currents for charging the capacitors Ca to Cc can have optimum values in response to a voltage difference between the input voltage $V_{IN}$ and the output voltage V0.

In this charge unit 201, in starting the charge, the control circuit 205 controls the switch element 203 into the ON state. At this time, the current $I_{IN}$ generated by the input voltage $V_{IN}$ flows through the current path comprising the plus input terminal, the switch element 203, the primary winding 202p of the transformer 202, the battery BAT, and the minus input terminal, whereby the battery BAT is charged and the exciting energy is stored in the transformer 202. In this case, the current value of the current $I_{IN}$ is increased gradually with the lapse of time. Accordingly, the control circuit 205 monitors voltages of the input voltage $V_{IN}$ and the output voltage $V_0$ and then controls an ON time of the switch element 203 such that the optimum current value to charge the capacitors Ca to Cc can be obtained in response to a voltage difference between the input voltage $V_{IN}$ and the output voltage $V_0$. Then, the control circuit 205 controls the switch element 203 into the OF state at a time point when it is decided that the current value of the current $I_{IN}$ reaches the optimum current value.

When the switch element 203 is controlled into the OFF state, the fly-back current generated by the exciting energy stored in the transformer 202 is discharged from the secondary windings 202sa to 202sc. In this case, assume that the numbers of turns of the secondary windings 202sa, 202sb, 202sc are Na, Nb and Nc, and the inter-terminal voltages of the capacitors Ca, Cb and Cc in the battery BAT are Vca, Vcb and Vcc respectively and that forward voltages of the diodes 204a to 204c can be neglected, following Eq. (6) can be satisfied. Then, under the assumption that the inter-terminal voltages Vca to Vcc of the capacitors Ca to Cc are charged up to the equal voltage mutually and thus the secondary windings 202sa to 202sc are wound to the same number of turns, explanation will be made hereinafter.

$$Vca:Vcb:Vcc=Na:Nb:Nc \qquad (6)$$

Accordingly, when the fly-back current is discharged, the capacitors are charged in sequence from the capacitor whose inter-terminal voltage is lowest with respect to the voltage specified by Eq. (6) (i.e., which has the lowest inter-terminal voltage). More specifically, in case the inter-terminal voltage Vca of the capacitor Ca is lowest and the inter-terminal voltage Vcb of the capacitor Cb is highest, first the fly-back current Ia flows through the current path comprising the winding end terminal of the secondary winding 202sa, the diode 204a, the capacitor Ca in the battery BAT, and the winding start terminal of the secondary winding 202sa, thereby charging the capacitor Ca. Then, at a time point when the inter-terminal voltage Vca of the capacitor Ca becomes equal to the inter-terminal voltage Vcc of the capacitor Cc is, the fly-back current Ic is also discharged from the secondary winding 202sc. At this time, the fly-back current Ic flows through the current path comprising the winding end terminal of the secondary winding 202sc, the diode 204c, the capacitor Cc in the battery BAT, and the winding start terminal of the secondary winding 202sc, thereby charging both the capacitors Ca and Cc. Then, at a time point when the inter-terminal voltages Vca to Vcc of all the capacitors Ca to Cc become equal to each other, the fly-back current Ib is also discharged from the secondary winding 202sb. At this time, the fly-back current Ib flows through the current path comprising the winding end terminal of the secondary winding 2sb, the diode 4b, the capacitor Cb in the battery BAT, and the winding start terminal of the secondary winding 202sb, thereby charging both the capacitors Ca to Cc.

As a result, all capacitors Ca to Cc can be charged to satisfy the above Eq. (6). In this case, if the exciting energy of the transformer which is excited by the switch element 203 via one switching operation is not enough to satisfy the above Eq. (6), the switch element 203 is switched repeatedly, so that all capacitors Ca to Cc can be charged to satisfy the above Eq. (6).

In this manner, according to the charge unit 201, the battery BAT can be charged by the current $I_{IN}$ flowing through the primary winding 202p of the transformer 202 during the ON period of the switch element 203, while the capacitors Ca to Cc can be charged during the OFF period of the switch element 203 such that the inter-terminal voltages Vca to Vcc come up to the equal voltage. As a consequence, the large capacity electrical energy can be stored most effectively in the battery BAT to reach the limiting value of storage. In addition, since the inter-terminal voltages of respective capacitors Ca to Cc can be made equal, the lifetime of the capacitors Ca to Cc can be prolonged considerably rather than the charging method by the charge unit 1041 in the conventional art.

12th Embodiment

Next, a configuration and an operation of a charge unit 2021 according to another embodiment will be explained with reference to FIG. 17 hereunder. In this case, redundant explanation will be omitted by affixing the same symbols to constituent elements which have the same function as those of the charge unit 201. Also, since ON/OFF switching of the switching element 203 is controlled in the same way as the charge unit 201, illustration of the control circuit 205, etc. is omitted.

Figure 17:
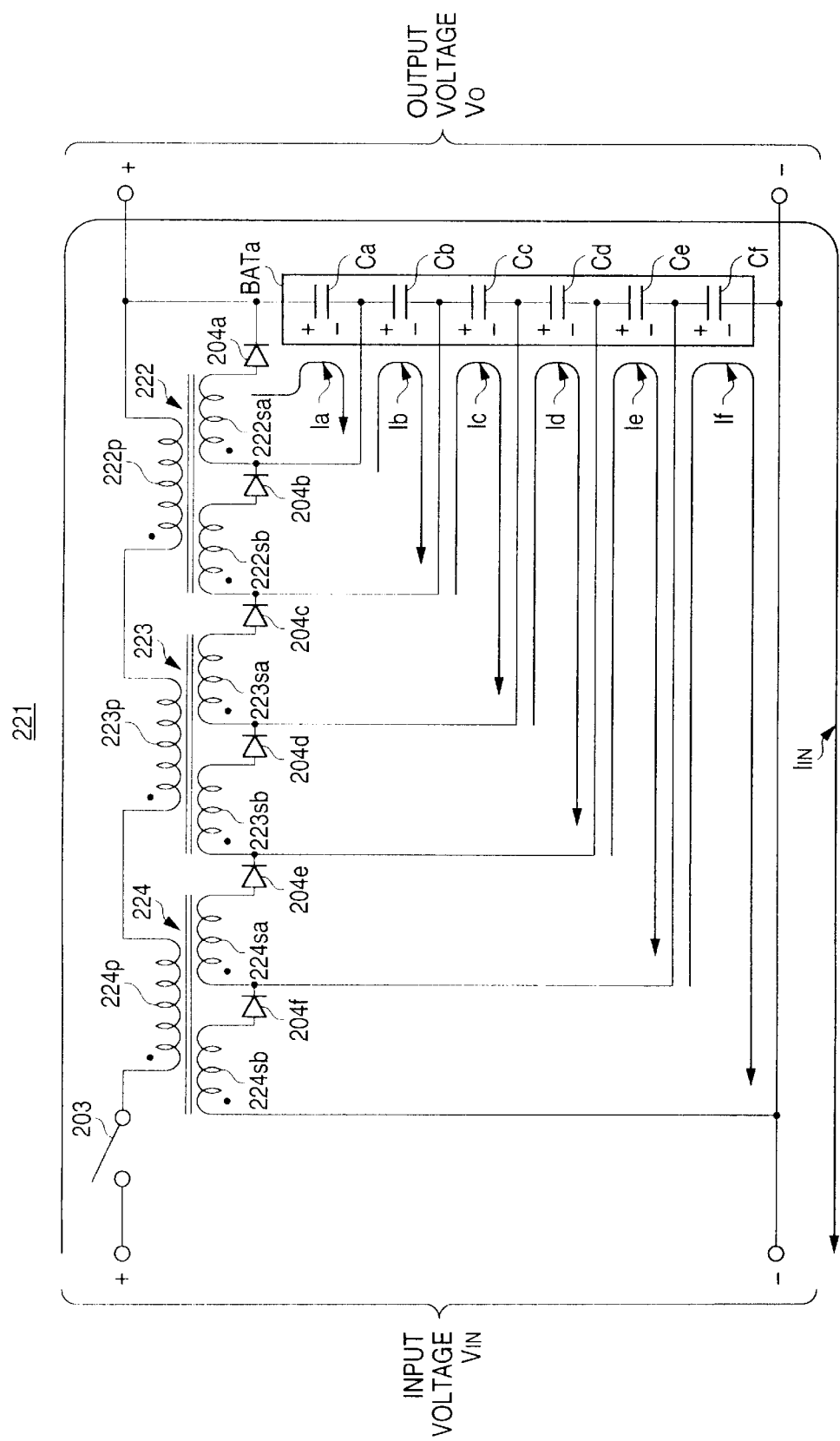
FIG. 17 is a circuit diagram of a charge unit 221 according to an embodiment of the present invention.

In the charge unit 221 shown in FIG. 17, a configuration that is constructed by series-connecting a number of capacitors Ca to Cf and is suited to charge a battery BATa is adopted. In case the battery BATa constructed by series-connecting a number of capacitors is charged, many secondary windings may be formed on the transformer 202 in the charge unit 201. In such case, a variety of transformers must be fabricated to meet with various batteries which have different numbers of the capacitors, and thus it becomes difficult to achieve common use of the transformer. Also, since manufacturing steps needed to form a number of secondary windings on one transformer are complicated, the production cost is increased. Therefore, in this charge unit 221, by employing a plurality of transformers on which the secondary windings are wound to the same number, the common use of the transformer can be achieved and also the production cost of the transformer can be reduced.

More particularly, in the charge unit 221, transformers 222 to 224 on which two windings are formed, for example, are employed. In this case, primary windings 222p to 224p of the transformers 222 to 224 are series-connected, and these primary windings 222p to 224p are connected in series with the switching element 203 and the battery BATa. Also, the winding start terminal of a secondary winding 224sb of the transformer 224 is connected to the negative electrode terminal of the battery BATa, and the winding end terminal thereof is connected to the winding start terminal of the secondary winding 224sa and the positive electrode terminal of the capacitor Cf via a diode 204f. Then, the winding end terminal of the secondary winding 224sa is connected to the winding start terminal of the secondary winding 223sb of the transformer 223 and the positive electrode terminal of the capacitor Ce via a diode 204e. Further, the winding end terminal of the secondary winding 223sb of the transformer 223 is connected to the winding start terminal of the secondary winding 223sa and the positive electrode terminal of the capacitor Cd via a diode 204d. Then, the winding end terminal of the secondary winding 223sa is connected to the winding start terminal of the secondary winding 222sb of the transformer 222 and the positive electrode terminal of the capacitor Cc via a diode 204c. Similarly, the winding end terminal of the secondary winding 222sb of the transformer 222 is connected to the winding start terminal of the secondary winding 222sa and the positive electrode terminal of the capacitor Cb via a diode 204b. Then, the winding end terminal of the secondary winding 222sa is connected to the positive electrode terminal of the capacitor Ca via a diode 204a.

In this charge unit 221, the switch element 203 is controlled into the ON state upon starting the charging operation. At this time, the current $I_{IN}$ generated based on the input voltage $V_{IN}$ flows through the current path comprising the plus input terminal, the switch element 203, the primary winding 224p of the transformer 224, the primary winding 223p of the transformer 223, the primary winding 222p of the transformer 222, the battery BATa, and the minus input terminal, whereby the battery BATa is charged and the exciting energy is stored in the transformers 222 to 224.

Then, when the switch element 203 is controlled into the OFF state, the fly-back currents Ia to If generated based on the exciting energies stored in the transformers 222 to 224 are discharged from the secondary windings 222sa, 222sb, 223sa, 223sb, 224sa and 224sb. In this case, since the secondary windings 222sa to 224sb of the transformers 222 to 224 are wound to the same number of turns, the battery BATa can also be charged such that the inter-terminal voltages of the capacitors Ca to Cf are made equal.

13th Embodiment

Next, a configuration and an operation of a charge unit 231 according to still another embodiment will be explained with reference to FIG. 18 hereunder. In this case, redundant explanation will be omitted by affixing the same symbols to constituent elements which have the same function as those of the charge unit 221.

Figure 18:
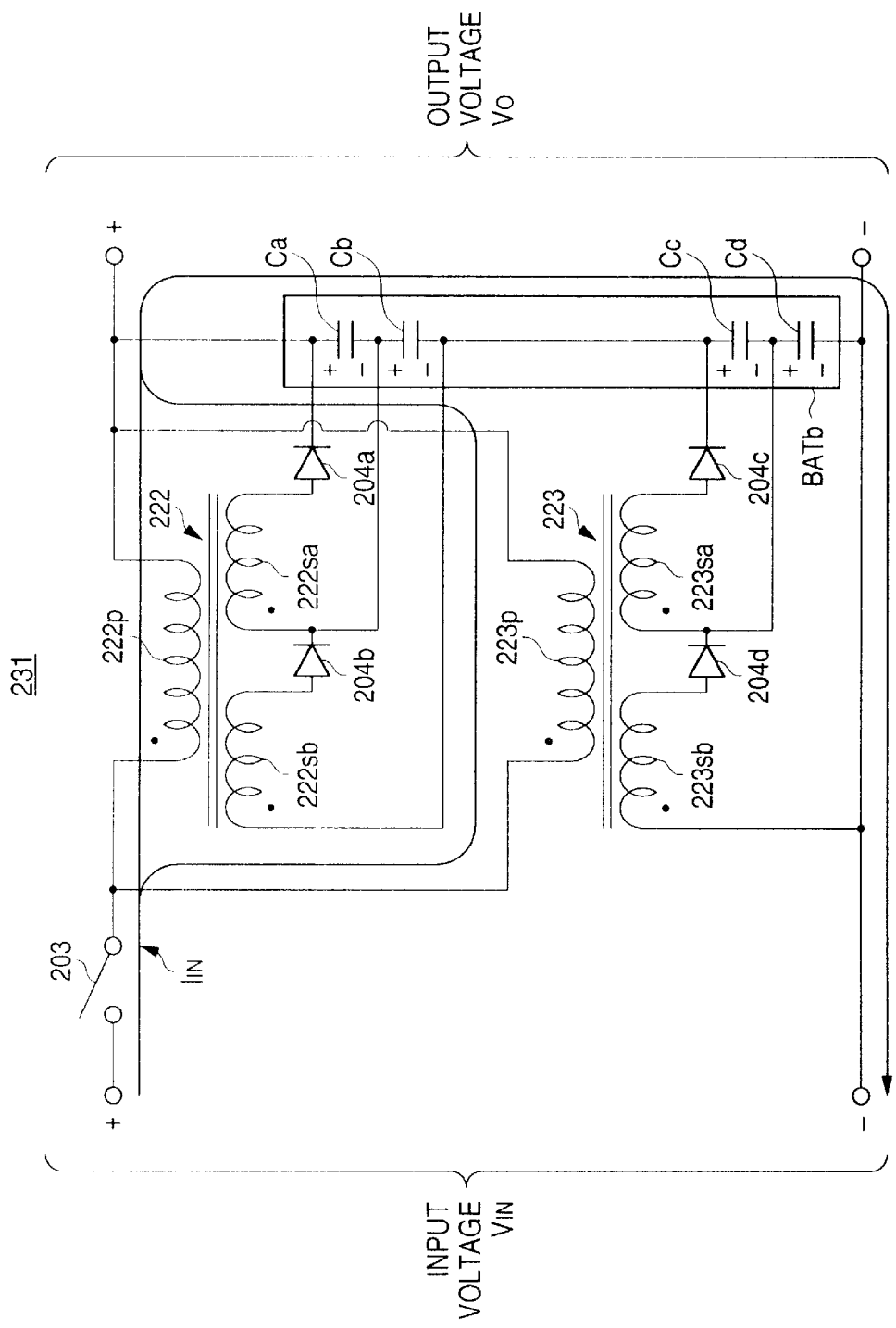
FIG. 18 is a circuit diagram of a charge unit 231 according to an embodiment of the present invention.

In the charge unit 231 shown in FIG. 18, unlike the charge unit 221, the primary winding 222p of the transformer 222 and the primary winding 223p of the transformer 223 are connected in parallel with each other. Since connection of the secondary windings 222sa, 222sb, 223sa and 223sb of the transformers 222 and 223 is similar to the transformers 222 and 223 in the charge unit 21, their explanation will be omitted.

In this charge unit 231, in starting the charging operation, when the switch element 203 is controlled into the ON state, the current $I_{IN}$ generated by the input voltage $V_{IN}$ flows through the current path comprising the plus input terminal, the switch element 203, a parallel circuit of the primary winding 222p of the transformer 222 and the primary winding 223p of the transformer 223, the battery BATb, and the minus input terminal, whereby a battery BATb is charged and also the exciting energy is stored in the transformers 222 and 223. Then, when the switch element 203 is controlled into the OFF state, the fly-back currents generated by the exciting energy stored in the transformers 222 and 223 are discharged to the capacitors Ca to Cd, like the charge unit 221. In this case, the battery BATb can also be charged such that the inter-terminal voltages of the capacitors Ca to Cd are made equal.

Here the present invention is not limited to the above embodiments of the present invention, and its configuration may be modified appropriately. For instance, the battery as the charged object is not limited to those constructed by the ion batteries, the electric double layer capacitors, etc., and may be constructed by various batteries such as the lead storage batteries, various capacitors, etc. Also, the storage means in the present invention is not limited to the storage means which is constructed by series-connecting single storage elements, and may be constructed by series-connecting storage element sets in which a plurality of storage elements are parallel-connected. In addition, the number of the secondary windings of the transformer and the number of the transformers are not limited to the embodiments of the present invention, and may be specified arbitrarily.

14th Embodiment

Next, concerning an operational principle of a transfer unit 301 corresponding to the invention, an example in which the inter-terminal voltages Vca to Vcd of the electric double layer type capacitors Ca to Cd, for example, as the energy storage means can be made equal will be explained with reference to FIG. 19.

A transfer unit 301 is so constructed that capacitors Ca to Cd as the energy storage means are isolated with each other and that the energy can be transferred to distribute into four capacitors Ca to Cd when their inter-terminal voltages Vca to Vcd are different. More particularly, the transfer unit 1 includes a transformer 302 which has windings 302aa to 302ad (referred to generically as "windings 302a" hereinafter) corresponding to first windings in the present invention, and windings 302ba to 302bd (referred to generically as "windings 302b" hereinafter) corresponding to second windings in the present invention. In this case, the windings 302a and 302b of the transformer 302 are coupled magnetically with each other via the iron core, and are wound to the number of turns Naa to Nad and Nba to Nbd to respectively satisfy the following Eq. (7):

$$Naa/Nba=Nab/Nbb=Nac/Nbc=Nad/Nbd \qquad (7)$$

In addition, the transfer unit 301 comprises switches Saa to Sad (referred to as "switches Sa" hereinafter if not particularly mentioned) connected between winding end portions of windings 302aa to 302ad and minus terminals of capacitors Ca to Cd respectively, which correspond to first switch means in the present invention, switch Sba to Sbd (referred to as "switches Sb" hereinafter if not particularly mentioned, and also referred to generically as "switches S" together with the switches Sa hereinafter) connected between winding start portions of windings 302ba to 302bd and minus terminals of capacitors Ca to Cd respectively, which correspond to second switch means in the present invention, and a switching control circuit 303 for controlling the switching of the switches S. The switches S are composed of an EFT, for example, respectively, and ON/OFF of the switches S is switching-controlled in accordance with control signals Ssa and Ssb output from the switching control circuit 303. In this case, as shown in FIGS. 20A and 20B, the switches Sa and Sb are controlled such that time lengths of respective ON periods are specified equally mutually and a duty ratio of the ON period is set to about 50%, and also controlled such that the switches Sa are turned ON in the OFF period of the switches Sb and the switches Sb are turned ON in the OFF period of the switches Sa. Very short switching pause periods T1 are provided between the ON periods of both switches Sa and Sb so as to turn OFF both the switches Sa and Sb when both control signals Ssa and Ssb are controlled to a low level.

In this transfer unit 301, winding start portions of the windings 302a in the transformer 302 and fixed contacts of the switches Sa (e.g., in the case of FET, source electrodes or drain electrodes although they are different according to n-channel FETs or p-channel FETs) connected to the windings 302a are connected to both ends of the capacitors Ca to Cd respectively, and also winding end portions of the windings 302b and fixed contacts of the switches Sb connected to the windings 302b are connected to both ends of the capacitors Ca to Cd respectively. In this case, the winding start portions of the windings 302a and the winding end portions of the windings 302b may be connected previously as intermediate taps, and then the intermediate taps may be connected to the positive sides of capacitors C.

In this case, the current path which corresponds to the first one of the first current paths in the present invention and comprises the winding 302aa and the switch Saa, and the current path which corresponds to the second one of the first current paths in the present invention and comprises the winding 302ba and the switch Sba are connected in parallel to the capacitor Ca. The current path which corresponds to the first one of the second current paths in the present invention and comprises the winding 302ab and the switch Sab, and the current path which corresponds to the second one of the second current paths in the present invention and comprises the winding 302bb and the switch Sbb are connected in parallel to the capacitor Cb. The current path which corresponds to the first one of the third current paths in the present invention and comprises the winding 302ac and the switch Sac, and the current path which corresponds to the second one of the third current paths in the present invention and comprises the winding 302bc and the switch Sbc are connected in parallel to the capacitor Cc. The current path which corresponds to the first one of the fourth current paths in the present invention and comprises the winding 302ad and the switch Sad, and the current path which corresponds to the second one of the fourth current paths in the present invention and comprises the winding 302bd and the switch Sbd are connected in parallel to the capacitor Cd.

Under this condition, the switching control circuit 303 first controls the switches Sa to bring them into their ON states while controlling the switches Sb into their OFF states. At this time, between the inter-terminal voltages Vca to Vcd of the capacitors Ca to Cd and the number of turns Naa to Nad of the windings 302a, the transfer unit 301 acts to satisfy the following Eq. (8):

$$Vca:Vcb:Vcc:Vcd = Naa:Nab:Nac:Nad \qquad (8)$$

Accordingly, in the ON period of the switches Sa, the energy transfer occurs among the capacitors Ca to Cd. More specifically, for example, the case where the inter-terminal voltage Vca of the capacitor Ca is higher than the voltage specified by the above Eq. (8) will be explained as an example. If the switches Sa are controlled to be brought into its ON state, the current flows through the current path comprising the plus terminal of the capacitor Ca, the winding 302aa, the switch Saa, and the minus terminal of the capacitor Ca since only the inter-terminal voltage Vca of the capacitor Ca is higher than the voltage given by the above Eq. (8). At this moment, the voltage Vaa which is equal to the inter-terminal voltage Vca of the capacitor Ca is generated in the winding 302aa, whereas voltages Vab to Vad which mate with their ratios to the number of turns Naa of the winding 302aa are generated in other windings 302ab to 302ad respectively. In detail, the voltage Vab having a value (voltage Vaa×Nab/Naa) is generated in the winding 302ab, the voltage Vac having a value (voltage Vaa×Nac/Naa) is generated in the winding 302ac, and the voltage Vad having a value (voltage Vaa×Nad/Naa) is generated in the winding 302ad.

In this case, the voltages Vab to Vad becomes voltages higher than the corresponding inter-terminal voltages Vcb to Vcd. Therefore, the current generated based on the voltages Vab to Vad continues to flow through the current path comprising the windings 302a, the capacitors C, and the switches Sa to thus charge the capacitors Cb to Cd respectively, and also the current flows through the windings 302a to thus excite the transformer 302. Then, the charging of respective capacitors C in which the voltages Vab to Vad become equal to the inter-terminal voltages Vcb to Vcd correspondingly is stopped sequentially. Normally, due to the line impedance, etc., it is difficult to output the current, which is enough to make equal the inter-terminal voltages Vcb to Vcd of other capacitors Cb to Cd, from the capacitor Ca by one switching operation of the switches Sa. As a result, the above Eq. (8) cannot always be satisfied merely by one switching operation of the switches Sa.

Then, the switching control circuit 303 controls the switches Sa to bring them into their OFF state. In the switching pause period T1 at this time, the voltages Va each has the direction opposite to that shown in FIG. 19 are generated in the windings 302a respectively, and the voltages Vba to Vbd each has the same direction as that shown in FIG. 19 are generated in the windings 302ba to 302bd respectively. In this case, the passing of the currents generated based on the voltages Va generated in the windings 302a is blocked by the OFFed switches Sa. Meanwhile, the currents based on the voltages Vba to Vbd generated in the windings 302ba to 302bd pass through parasitic diodes Dba to Dbd being built in the FETs as the switches Sb respectively (referred to as "diodes Db" hereinafter if not particularly mentioned), and thus pass through the current paths which comprise the winding end terminals of the windings 2b, the capacitors C, the parasitic diodes Db, and the winding start terminals of the windings 302b. Accordingly, since the current flows much more into the capacitors C whose inter-terminal voltages Vc are lower than the voltages Vb, the inter-terminal voltages Vc of the capacitors C can be made equal and also a part of the exciting energy of the transformer 302 is discharged.

Then, after the switching pause period T1 has been lapsed, the switching control circuit 303 controls the switches Sb to turn ON. At this time, the switching control circuit 303 also operates such that following Eq. (9) can be satisfied between the inter-terminal voltages Vca to Vcd of the capacitors Ca to Cd and the number of turns Nba to Nbd of the windings 302b. At this time, since the current flows through the windings 302b, the transformer 302 is magnetically reset temporarily and then excited to have the polarity which is opposite to that excited in the ON period of the switches Sa. As a result, the utilization factor of the core in the transformer 302 can be improved, reduction in size of the core and in turn reduction in size of the transformer 302 can be achieved.

$$Vca:Vcb:Vcc:Vcd=Nba:Nbb:Nbc:Nbd \qquad (9)$$

In the ON period of the switches Sb, like the ON period of the switches Sa, the energy transfer occurs from the capacitors C having the high inter-terminal voltages Vc to the capacitors C having the low inter-terminal voltages Vc among the capacitors Ca to Cd. Then, the switching control circuit 303 controls the switches Sa to bring them into their OFF state. In the switching pause period T1 at this time, the voltages Va each has the direction opposite to that shown in FIG. 19 are generated in the windings 302*b* respectively, and the voltages Vaa to Vad each has the same direction as that shown in FIG. 19 are generated in the windings 302*aa* to 302*ad* respectively. In this case, the passing of the currents generated based on the voltages Vb generated in the windings 302*b* is blocked by the OFFed switches Sb. In the meanwhile, the currents based on the voltages Vaa to Vad generated in the windings 302*aa* to 302*ad* pass through parasitic diodes Daa to Dad being built in the FETs as the switches Sa respectively (referred to as "diodes Da" hereinafter if not particularly mentioned), and thus pass through the current paths which comprise the winding start terminals of the windings 302*a*, the capacitors C, the parasitic diodes Da, and the winding end terminals of the windings 302*a*. Accordingly, since the current flows much more into the capacitors C whose inter-terminal voltages Vc are lower than the voltages Va, the inter-terminal voltages Vc of the capacitors C can be uniformed and also a part of the exciting energy of the transformer 302 is discharged. Subsequently, since the alternative switching of the switches Sa and Sb is carried out continuously, the energy transfer occurs to distribute from the capacitor Ca to other capacitors Cb to Cd. As a result, the inter-terminal voltages Vca to Vcd of the capacitors Ca to Cd can be made equal in a short time.

In this fashion, according to the transfer unit 301, the energy transfer occurs to distribute from the capacitors C whose inter-terminal voltages Vc are high to the capacitors C whose inter-terminal voltages Vc are low in the ON period of the switches Sa, and also the energy transfer occurs to distribute from the capacitors C whose inter-terminal voltages Vc are high to the capacitors C whose inter-terminal voltages Vc are low in the OFF period of the switches Sa because the switches Sb are controlled into their ON state. Therefore, if switching duty ratios of the switches Sa and Sb are set to 50% in the transfer units 301 and 1 respectively, the inter-terminal voltages Vca to Vcc of the capacitors Ca to Cc can be made equal in the transfer unit 301 in an almost ½ time rather than the transfer unit 1. Also, generation of the short circuit current because of simultaneous ON states of both switches Sa and Sb can be prevented without fail by providing the switching pause period T1. If bipolar transistors are employed as the switches Sa and Sb, diodes may be connected in series with the switches Sa and Sb in the same direction as the parasitic diodes Da and Db.

15th Embodiment

Figure 21:
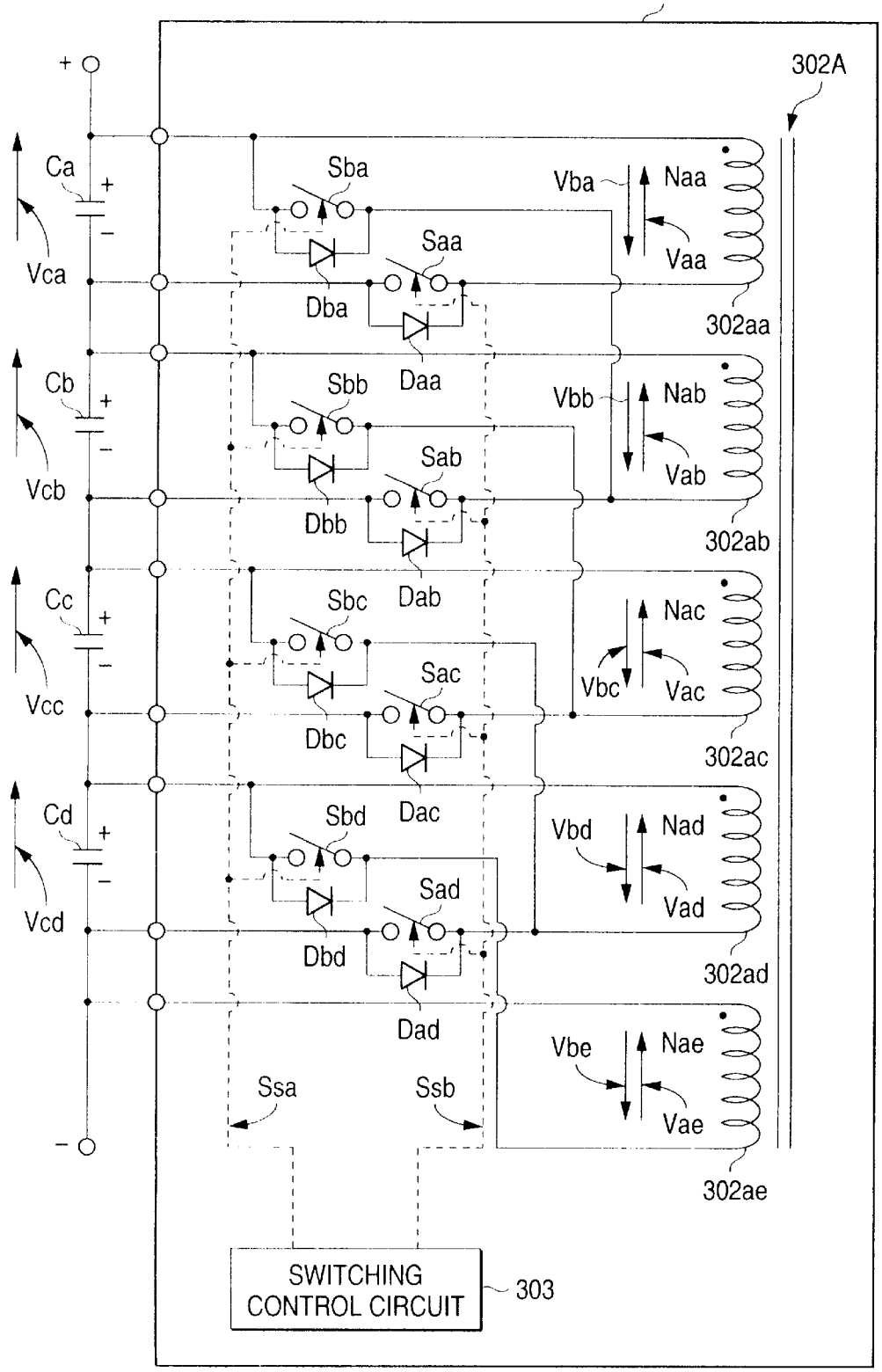
FIG. 21 is a circuit diagram of a transfer unit 301A according to another embodiment of the present invention.

Next, a transfer unit 301A will be explained with reference to FIG. 21 hereinafter.

The transfer unit 301A is constructed applicably to the case where the capacitors Ca to Cd as energy storage means are series-connected and also the inter-terminal voltages Vca to Vcd are equal mutually. As shown in FIG. 21, the transfer unit 301A includes a transformer 302A on which five windings 302*aa* to 302*ae* are wound. In this case, the windings 302*aa* to 302*ae* are wound such that the numbers of turns Naa to Nae of them become equal mutually.

In this transfer unit 301A, winding start portions of the windings 302*aa* to 302*ad* in the transformer 302A and fixed contacts of the switches Sa connected to the windings 302*a* are connected to both ends of the capacitors Ca to Cd respectively, and the winding start portion of the winding 302*ae* is connected to the minus terminal of the capacitor Cd.

In this case, the current path which corresponds to the first one of the first current paths in the present invention and comprises the winding 302*aa* and the switch Saa, and the current path which corresponds to the second one of the first current paths in the present invention and comprises the winding 302*ab* and the switch Sba are connected in parallel to the capacitor Ca. The current path which corresponds to the first one of the second current paths in the present invention and comprises the winding 302*ab* and the switch Sab, and the current path which corresponds to the second one of the second current paths in the present invention and comprises the winding 302*ac* and the switch Sbb are connected in parallel to the capacitor Cb. The current path which corresponds to the first one of the third current paths in the present invention and comprises the winding 302*ac* and the switch Sac, and the current path which corresponds to the second one of the third current paths in the present invention and comprises the winding 302*ad* and the switch Sbc are connected in parallel to the capacitor Cc. The current path which corresponds to the first one of the fourth current paths in the present invention and comprises the winding 302*ad* and the switch Sad, and the current path which corresponds to the second one of the fourth current paths in the present invention and comprises the winding 302*ae* and the switch Sbd are connected in parallel to the capacitor Cd.

Under this condition, the switching control circuit 303 first controls the switches Sa to bring them into their ON states while controlling the switches Sb into their OFF states. At this time, the transfer unit 301A acts to satisfy the above Eq. (8) between the inter-terminal voltages Vca to Vcd of the capacitors Ca to Cd and the number of turns Naa to Nad of the windings 302*a*.

Accordingly, in the ON period period of the switches Sa, like the transfer unit 301, the energy transfer occurs among the capacitors Ca to Cd. In this period, for example, when the inter-terminal voltage Vca of the capacitor Ca is higher than the voltage specified by the above Eq. (8), the voltages Vaa to Vae generated in the windings 302*aa* to 302*ae* (see FIG. 21) are equal to the inter-terminal voltage Vca of the capacitor Ca and are higher than the inter-terminal voltages Vc of other capacitors Cb to Cd since the windings 302*aa* to 302*ae* have equal number of turns mutually. Therefore, the current generated based on the voltages Vab to Vad continues to flow through the current path comprising the windings 302*a*, the capacitors C, and the switches Sa to charge the capacitors Cb to Cd respectively. As a result, the energy transfer occurs to distribute from the capacitor Ca to other capacitors Cb to Cd, and thus the inter-terminal voltages Vca to Vcd of the capacitors Ca to Cd can be uniformed. At this time, the transformer 302A is excited by the current that flows through the winding 302*a*.

Then, the switching control circuit 303 controls the switches Sa to bring them into their OFF state. In the switching pause period T1 at this time, the voltages Va each has the direction opposite to that shown in FIG. 21 are generated in the windings 302*a* respectively. In this case, the currents generated based on the voltages Va generated in the windings 302*a* passes through the parasitic diodes Da being built in the switches Sb respectively since the passing of such current is blocked by the OFFed switches Sa, and thus passes through the current paths which comprise the winding end terminals of the windings 302b, the parasitic diodes Db, the capacitors C, and the winding start terminals of the windings 302b. More particularly, for example, the current generated based on the voltage Vac passes through the current path which comprises the winding end terminal of the winding 2ac, the diode Dbb serving as the switch Sbb, the capacitor Cb, and the winding start terminal of the winding 2ac. Accordingly, since the current flows much more into the capacitors C whose inter-terminal voltages Vc are lower than the voltages Va, the inter-terminal voltages Vc of the capacitors C can be made equal and also a part of the exciting energy of the transformer 2A is discharged. At this time, the passing of the current generated based on the voltage Vaa is blocked by the switch Saa. Alternatively, the current generated based on the voltage Vae flows through the current path which comprises the winding end terminal of the winding 2ae, the diode Dbd serving as the switch Sbd, the capacitor Cd, and the winding start terminal of the winding 2ae.

Then, after the switching pause period T1 has been lapsed, the switching control circuit 303 controls the switches Sb to turn ON. At this time, the switching control circuit 303 also acts such that following Eq. (10) can be satisfied between the inter-terminal voltages Vca to Vcd of the capacitors Ca to Cd and the number of turns Nab to Nae of the windings 302ab to 302ae. At this time, since the current flows through the switches Sb, the transformer 302A is magnetically reset temporarily and then excited to have the polarity which is opposite to that excited in the ON period of the switches Sa. As a result, in the transfer unit 301A, since the utilization factor of the core can be improved in the transformer 302A, reduction in size of the transformer 302A can be achieved.

$$Vca:Vcb:Vcc:Vcd=Nab:Nac:Nad:Nae \quad (10)$$

In the ON period of the switches Sb, like the ON period of the switches Sa, for example, when the inter-terminal voltage Vca of the capacitor Ca is higher than the voltage defined by the above Eq. (10), the voltages Vba to Vbe generated in the windings 302aa to 302ae (see FIG. 21) are equal to the inter-terminal voltage Vca of the capacitor Ca and are higher than the inter-terminal voltages Vc of other capacitors Cb to Cd since the number of turns of the windings 302aa to 302ae are mutually equal. Therefore, the current generated by the voltages Vbc to Vbe continues to flow through the current path comprising the windings 302a, the switches Sb, and the capacitors C to thus charge the capacitors Cb to Cd respectively. More particularly, for example, the current generated by the voltage Vbc flows through the current path which comprises the winding end terminal of the winding 302ac, the switch Sbb, the capacitor Cb, and the winding start terminal of the winding 302ac. As a result, the energy transfer occurs to distribute from the capacitor Ca to other capacitors Cb to Cd, and thus the inter-terminal voltages Vca to Vcd of the capacitors Ca to Cd can be uniformed.

Then, the switching control circuit 303 controls the switches Sb to bring them into their OFF state. In the switching pause period T1 at this time, the voltages Vba to Vbe each has the direction opposite to that shown in FIG. 21 are generated in the windings 302a respectively. In this case, the currents generated by the voltages Vb caused in the windings 302a passes through the parasitic diodes Da being built in the switches Sa respectively, and thus passes through the current paths which comprise the winding start terminals of the windings 302a, the capacitors C, the parasitic diodes Da, and the winding end terminals of the windings 302a.

Accordingly, since the current flows much more into the capacitors C whose inter-terminal voltages Vc are lower than the voltages Vb, the inter-terminal voltages Vc of the capacitors C can be made equal and also a part of the exciting energy of the transformer 302A is discharged. Subsequently, since the alternative switching of the switches Sa and Sb is carried out continuously, the inter-terminal voltages Vca to Vcd of the capacitors Ca to Cd can be made equal in a short time.

In this way, according to the transfer unit 301A, the energy transfer occurs to distribute from the capacitors C whose inter-terminal voltages Vc are high to the capacitors C whose inter-terminal voltages Vc are low in the ON period of the switches Sa. Also, because the switches Sb are controlled into their ON state, the energy transfer occurs to distribute from the capacitors C whose inter-terminal voltages Vc are high to the capacitors C whose inter-terminal voltages Vc are low in the OFF period of the switches Sa. Therefore, the inter-terminal voltages Vca to Vcd of the capacitors Ca to Cd can be leveled into the same voltage in a short time. Also, the transformer 302A in the transfer unit 301A can be reduced in size rather than the transformer 302 in the transfer unit 301, in which the windings 302a and 302b are twice the number of the capacitors C, by employing the transformer 302A which includes the number of turns larger than the number of the capacitors by one.

Figure 22:
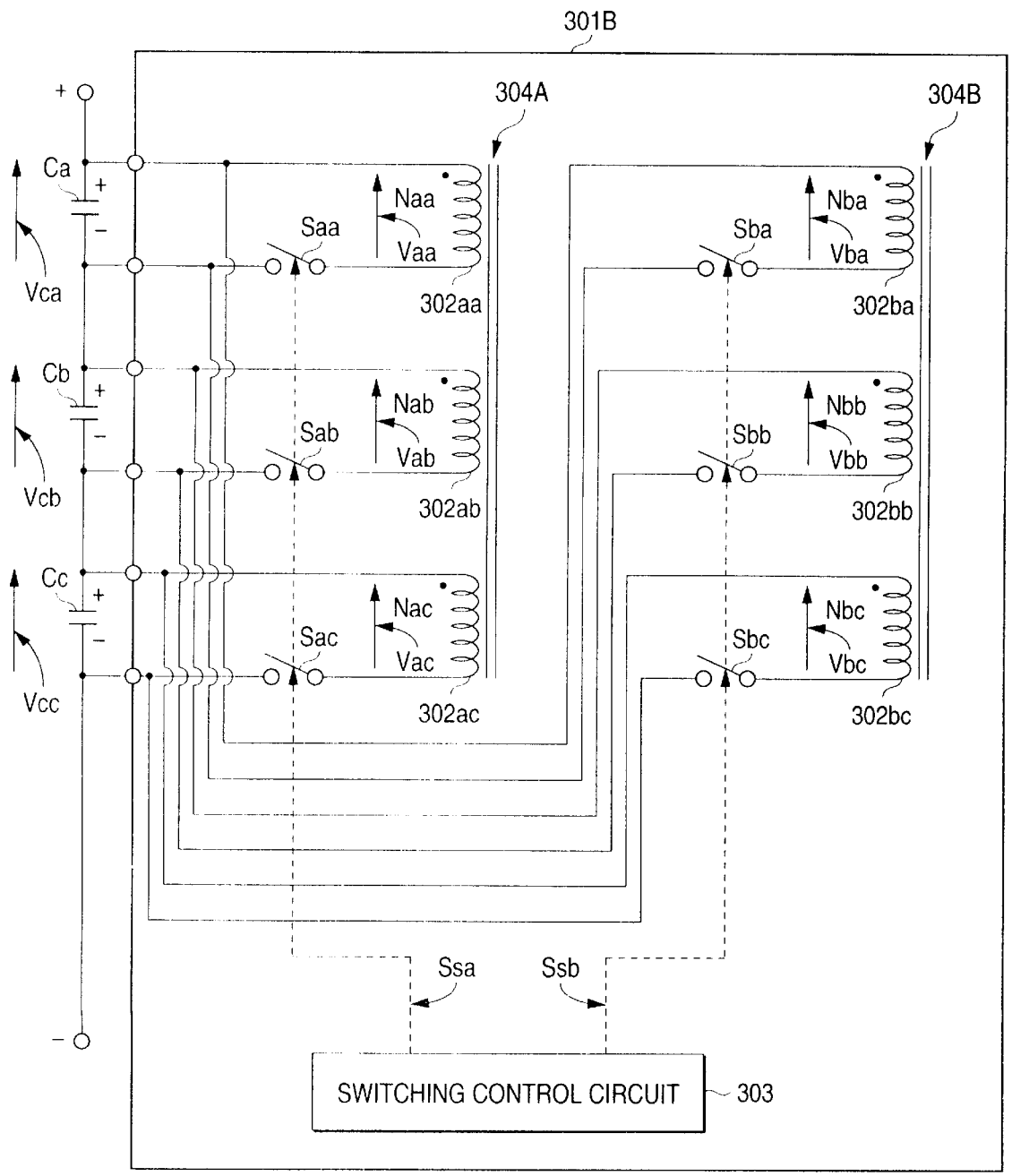
FIG. 22 is a circuit diagram of a transfer unit 301B according to another embodiment of the present invention.

In this case, the present invention is not limited to configurations of the above transfer units 301 and 301A. For example, like a transfer unit 301B shown in FIG. 22, the first winding in the invention is wound on the transformer 304A, and the second winding in the same invention can be wound on the transformer 304B which is different from the transformer 304A. In the transfer unit 301B, the current paths comprising the switches Sa and the windings 302a corresponds to the first current paths in the present invention, and current paths comprising the switches Sb and the windings 302b correspond to the second current paths in the present invention. FIG. 22 shows the principle when the ideal transformers 304A and 304B without the leakage inductance are employed. In the transfer unit 301B, the switching control circuit 303 controls the switches Sa to turn ON in the OFF period of the switches Sb, and controls the switches Sb to turn ON in the OFF period of the switches Sa. As a result, in the transfer unit 301B, the inter-terminal voltages Vca to Vcc of the capacitors Ca to Cc can also be made equal in a short time.

Figure 23:
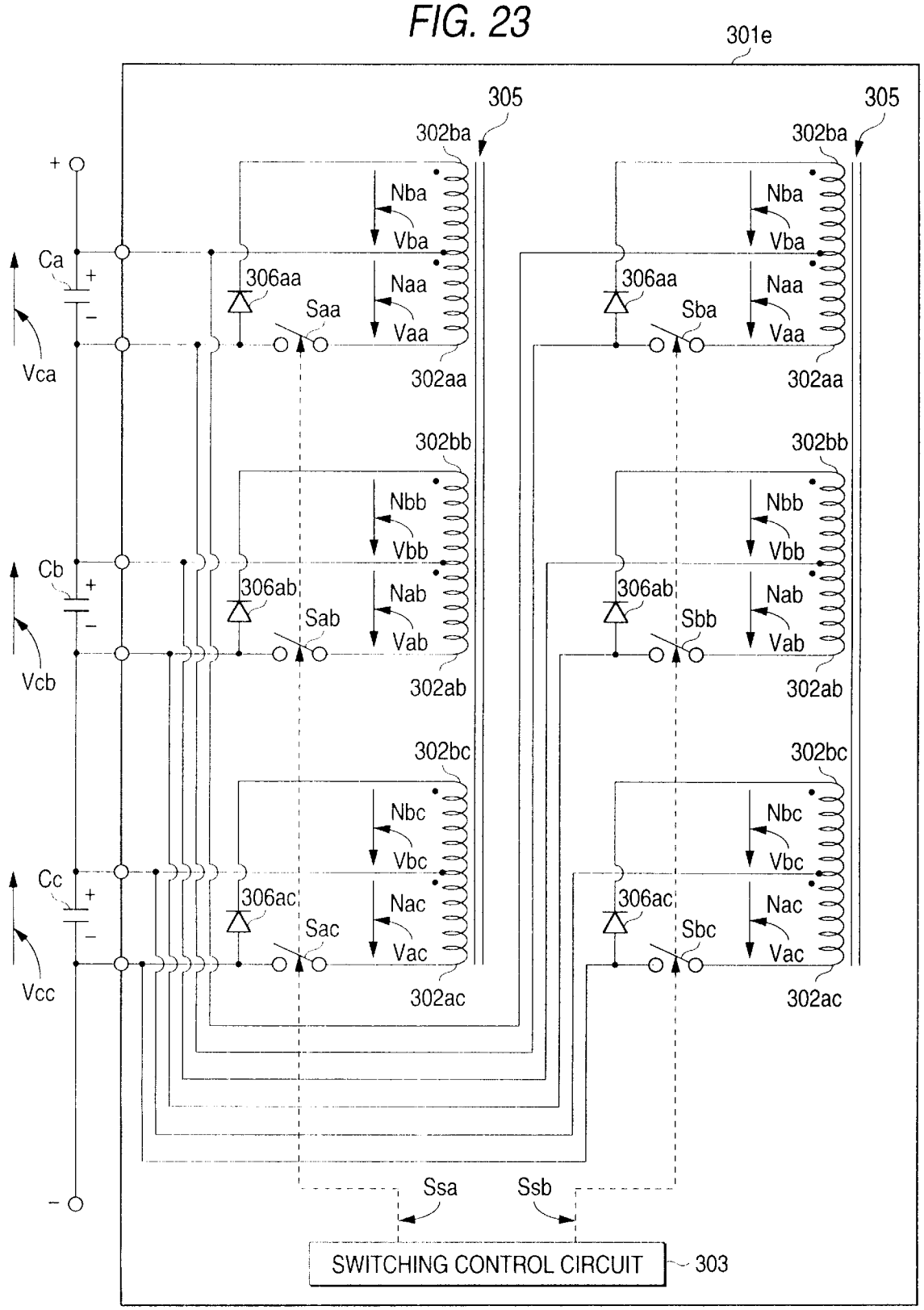
FIG. 23 is a circuit diagram of a transfer unit 301C according to still another embodiment of the present invention.

Further, a circuit diagram of a transfer unit 1C using a practical transformer is shown in FIG. 23 hereunder. The transfer unit 1C employs in principle two transformers 305 on which three pairs of windings 2a and 2b of the transformer 2 in the transfer unit 1 are wound respectively. Like the transfer unit 301B, in the transfer unit 301C, the switching control circuit 303 controls the switches Sa to turn ON in the OFF period of the switches Sb and also controls the switches Sb to turn ON in the OFF period of the switches Sa. Accordingly, the inter-terminal voltages Vca to Vcc of the capacitors Ca to Cc can be made equal in a short time in the transfer unit 301C. In this case, power loss in transferring the energy can be reduced sufficiently small by employing FETs or bipolar transistors in place of diodes 306aa to 306ac.

16th Embodiment

Figure 24:
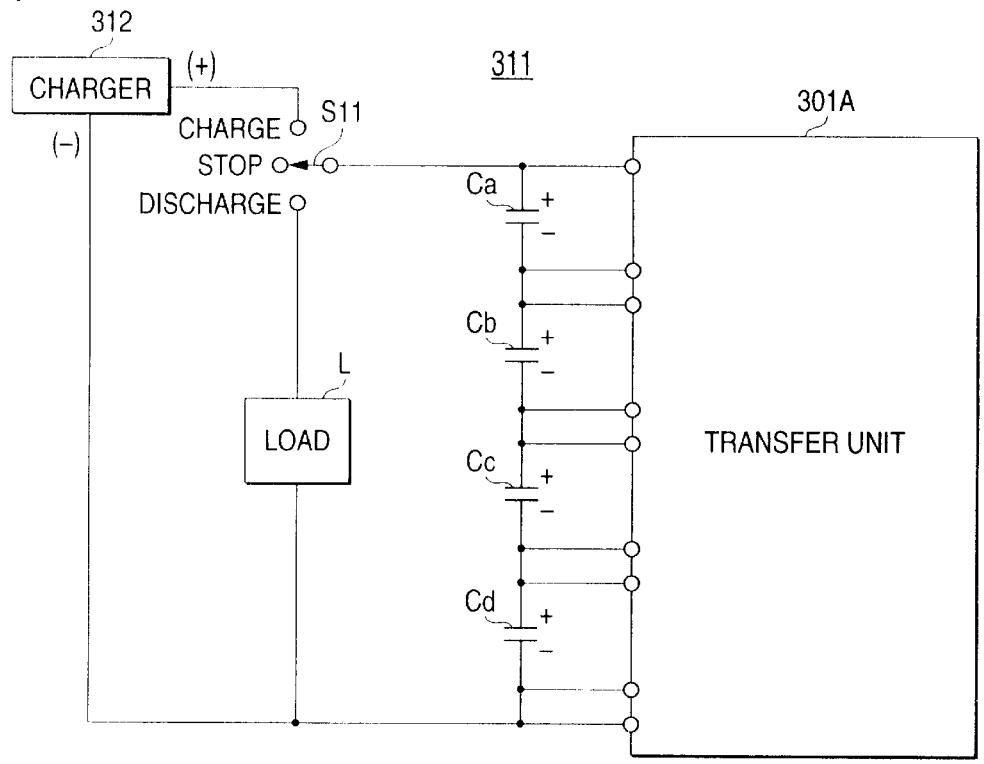
FIG. 24 is a circuit diagram of a charge unit 311 according to an embodiment of the present invention.

Next, an embodiment in which the transfer unit 301A is applied to the charge unit will be explained with reference to FIG. 24 hereunder.

A charge unit 311 is constructed to charge the series-connected capacitors Ca to Cd (secondary batteries or composite batteries which include the capacitors and the secondary batteries mixedly may be employed) as the energy storage means and supply the storage energy of the capacitors Ca to Cd to the load L connected to the external device. An example will be explained hereinafter in which the capacitors Ca to Cd are charged and discharged while maintaining the inter-terminal voltages Vc of the capacitors Ca to Cd at the same voltage.

The charge unit 311 is constructed to have the electric double layer type capacitors Ca to Cd, a charger 312, a switch S11, and the above transfer unit 301A. In this case, the switches Sa to Sd in the transfer unit 301A are controlled synchronously with the switching control of the switch S11, and switching-controlled in synchronous with the charge of the capacitors C by the charger 312 or the discharge from the capacitors C to the load L mutually, and controlled to turn OFF when neither the charging nor the discharging is carried out. Furthermore, the moving contact of the switch 311 is switched to the charge terminal in charging and is switched to the discharge terminal in discharging, and is switched to the stop terminal in non-charging and non-discharging. Also, the charger 312 is constructed to output the voltage enough to charge four capacitors Ca to Cd.

In this charge unit 311, the capacitors Ca to Cd is charged continuously in charging by supplying the output current of the charger 312 via the switch S11. In contrast, when the switches Sa are controlled into their ON state, the current based on the storage energy of the capacitor C whose inter-terminal voltage Vc is highest flows through the current path which comprises the plus terminal of the capacitor C, the winding 302a, the switch Sa, and the minus terminal of the capacitor C. Therefore, the inter-terminal voltages of other capacitors C are made equal into the same voltage and also the transformer 302A is excited. Then, after the switches Sa have been controlled into their OFF state, the switches Sb are controlled into their ON state at the time point when the switching pause period T1 has lapsed. At this time, the current based on the storage energy of the capacitor C whose inter-terminal voltage Vc is highest flows through the current path which comprises the plus terminal of the capacitor C, the switch Sb, the winding 302b, and the minus terminal of the capacitor C. Therefore, the inter-terminal voltages of other capacitors C are made equal into the same voltage and also the transformer 302A is excited in the opposite polarity to the polarity which is excited in the ON period of the switches Sa. Then, the capacitors are made equal into the same voltage by controlling the switches Sa and Sb into their ON state alternatively.

In contrast, when the switch S11 is switched into the discharge terminal, the capacitors Ca to Cd are discharged to supply the current to the load L. At this time, if the switches Sa and Sb are controlled into their ON state continuously and alternatively, the uniform of the inter-terminal voltages Vc of the capacitors C is performed continuously. Accordingly, the inter-terminal voltages Vc of the capacitors Ca to Cd can be made equal inasmuch as the switches Sa and Sb are switching-controlled continuously. As a result, the maximum electrical energy can be discharged effectively from the capacitors Ca to Cd.

17th Embodiment

Next, an embodiment in which the transfer unit 1A is built in a power supply unit will be explained with reference to FIG. 25 hereunder.

To begin with, the purpose of building the transfer unit 301A in the power supply unit will be explained. In the conventional art, when a plurality of power supply outputs which have different voltage values and output current values are generated based on the DC voltage generated by one switching circuit, the switching power supply unit generates a plurality of power supply outputs by further connecting another switching circuit to the smoothing capacitor on the output side in the switching circuit. In this case, there is such a problem that, if the forward type or fly-back type switching circuit is employed as another switching circuit, a circuit configuration becomes complicated as the overall power supply unit and the output stability is degraded. In addition, in the single forward type switching circuit, the current flows through the secondary winding of the switching transformer only when the main switching device is controlled into the ON state. In contrast, in the fly-back type switching circuit, the current flows through the secondary winding of the switching transformer only when the main switching device is controlled into the OFF state. For this reason, there is such a problem that, since the utilization factor of the secondary winding of the transformer is poor in both switching circuits, the output ripple voltage is large and the peak current is large. Besides, if a plurality of other switching circuits are arranged so as to correspond to a plurality of power supply outputs, a plurality of switching noises each has a different frequency are generated. As a result, there are problems that beats between the noises are generated and it becomes extremely difficult to reduce the EMI noises.

Figure 25:
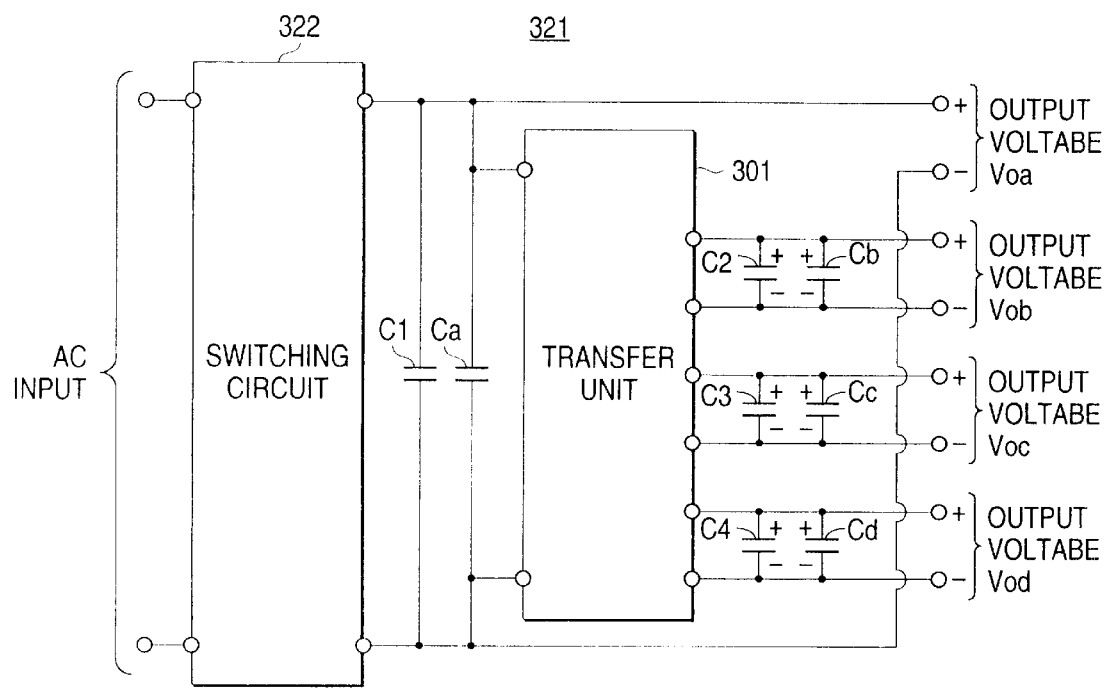
FIG. 25 is a circuit diagram of a power supply unit 321 according to an embodiment of the present invention.

As the power supply unit to overcome the above problems, the power supply unit 321 shown in FIG. 25 is constructed to have a switching circuit 322, capacitors Ca to Cd, C1 to C4, and the transfer unit 301. In this case, the switching circuit 322 rectifies/smoothes an AC input into a DC voltage and then stabilize the inter-terminal voltage of the capacitor Ca into a predetermined voltage by switching the DC voltage in accordance with PWM (Pulse Width Modulation) control. Also, the capacitors Ca to Cd are composed of the electric double layer capacitor, and arranged on the output side of the power supply unit 321 to function as the smoothing capacitor which smoothes the resultant DC voltage to reduce the ripple component. In contrast, each of the capacitors C1 to C4 are composed of the electrolytic capacitor which has small high frequency loss, and the capacitors C1 to C4 can supply the power to the load in an instant instead of the capacitors Ca to Cd respectively upon the sudden change into the heavy load.

In the power supply unit 321, the storage energy of the capacitor Ca is distributed to other capacitors Cb to Cd by switching-controlling the switches Sa and Sb in the transfer unit 301 alternatively. Accordingly, the inter-terminal voltages of the capacitors Ca, Cb, Cc and Cd can be generated easily as a plurality of output voltages Voa, Vob, Voc and Vod that have different voltage values and output current values. At this time, since the output voltage Voa has been stabilized into a predetermined voltage by the switching circuit 322, remaining output voltage Vob to Vod are also stabilized automatically. Further, because the windings 302a to 302d in the transfer unit 1 are isolated mutually, the output voltages Voa to Vod can also be isolated mutually. Since the detailed operation of the transfer unit 1 in the power supply unit 21 are similar to the above functions, their explanation will be omitted.

In the power supply unit 321, the storage energy of the capacitor Ca is distributed into the capacitors Cb to Cd via the windings 302a of the transformer 302 when the switches Sa in the transfer unit 301 are controlled into the ON state, while the storage energy of the capacitor Ca is distributed into the capacitors Cb to Cd via the windings 302b of the transformer 302 when the switches Sb are controlled into the ON state. Therefore, the current can flow through the windings 302a and 302b of the transformer 302 in both ON states of the switches Sa and Sb. As a result, the utilization factor of the windings 302a and 302b of the transformer 302 can be improved extremely and also the peak current values at that time can be suppressed. Accordingly, reduction in size of circuit parts can be achieved and also the output ripple voltage can be reduced sufficiently.

Further, concerning the switching noise, in the power supply unit 321, since the switching of the switches Sa and Sb is controlled in synchronous with each other, generation of the beats between the noises is reduced and it is ready to reduce sufficiently the EMI noise.

18th Embodiment

Figure 26:
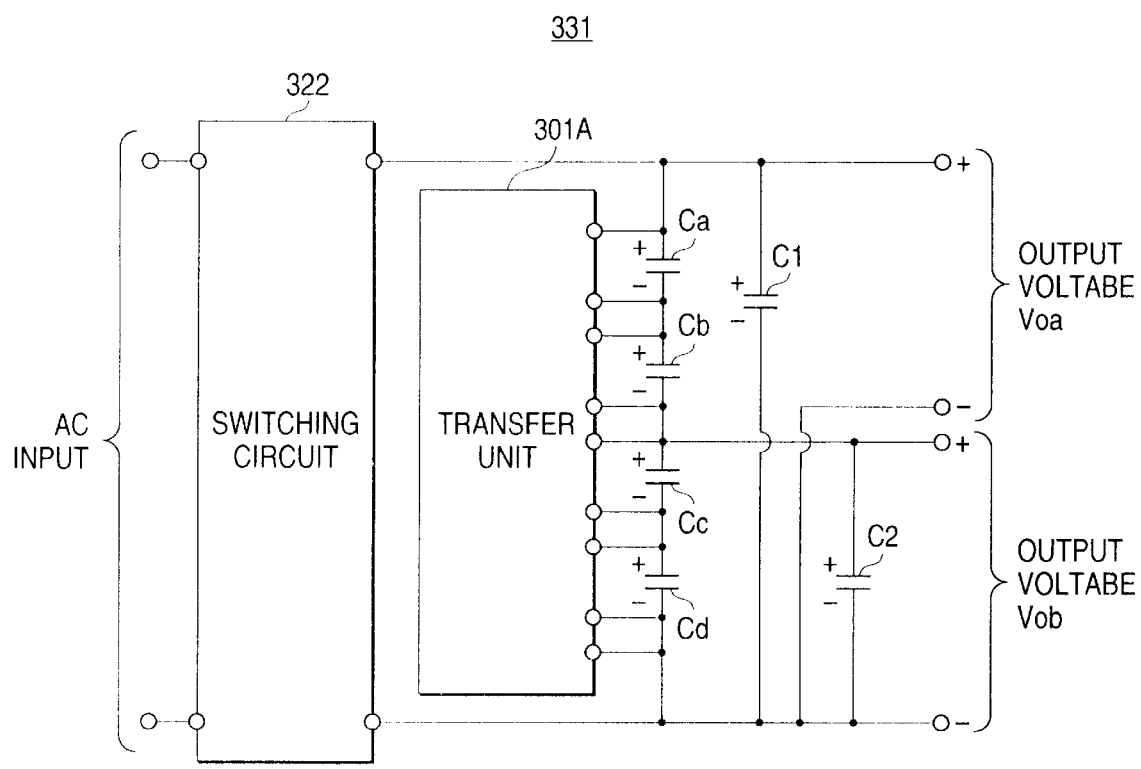
FIG. 26 is a circuit diagram of a power supply unit 331 according to an embodiment of the present invention.

Meanwhile, as shown in FIG. 26, a power supply unit 331 may be constructed by applying the transfer unit 301A.

The power supply unit 331 is constructed to be applied to the case where there is no necessity to isolate the output voltages Voa and Vob and also the output voltage Voa and Vob are set to the integral multiple of the inter-terminal voltage of the capacitor Ca. More particularly, the power supply unit 331 is constructed to have the switching circuit 322, the transfer unit 301A, and capacitors Ca to Cd, C1 and C2.

In the power supply unit 331, the switching circuit 322 stabilizes the inter-terminal voltages of the overall series-connected capacitors Ca to Cd into a constant voltage to generate the output voltage Voa. Under this condition, the inter-terminal voltages of the capacitors Ca to Cd are made equal by switching-controlling the switches Sa and Sb in the transfer unit 301 alternatively. Accordingly, the inter-terminal voltages of the capacitors Cc and Cd are generated as the output voltage Vob which is stabilized automatically twice the inter-terminal voltages of the capacitors C. Because the operations of the transfer unit 301A at this time are similar to the above functions, their explanation will be omitted.

In this case, the present invention is not limited to above embodiments of the present invention, and their configurations can be modified appropriately. For example, in the transfer unit 301, the example in which the inter-terminal voltages Vca to Vcd of the capacitors Ca to Cd are mutually different has been explained. In the case of the same voltage, as described above, the windings 302a and 302b of the transformer 302 can be wound to the same number of turns.

Also, in the transfer units 301B and 301C, there is no need that the switching-control should always be conducted not to overlap the ON periods of the switches Sa and Sb. The switches Sa and Sb can be controlled such that at least a part of the ON period of the switches Sb is contained in the OFF period of the switches Sa. That is, the switches Sa and Sb can be switching-controlled such that the ON period of the switch Sb and the ON period of the switch Sa are not perfectly overlapped. In this case, the uniform process of the inter-terminal voltage Vc of the capacitors C can also be quickly completed in contrast to the transfer unit 1. However, the time required for the uniform can be mostly reduced if the switching control is carried out according to the scheme described in the embodiment of the present invention.

Moreover, in the embodiments of the present invention, as the energy storage means, the electric double layer capacitor has been explained as the example. The energy storage means is not limited to this, and various large capacity capacitors, various secondary batteries, etc. may be employed.

19th Embodiment

Next, a basic operational principle of a voltage uniforming unit according to the present will be explained with reference to FIG. 27.

Figure 27:
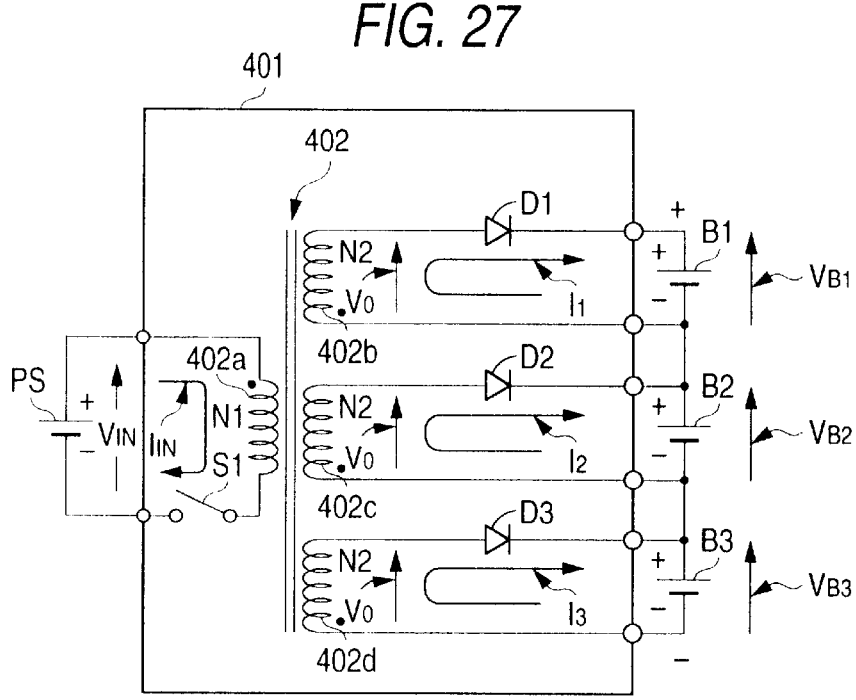
FIG. 27 is a basic circuit diagram of a voltage uniforming unit 401 for explaining a basic operational principle of the present invention.

As shown in FIG. 27, a voltage uniforming unit 401 is constructed to uniform respective inter-terminal voltages VB1, VB2 and VB3 (referred to as "inter-terminal voltages VB" hereinafter if not particularly mentioned) of three batteries B1 to B3 (referred to as "batteries B" hereinafter if not particularly mentioned) as chargable storage elements which are directly charged by a charger (not shown) for example. More particularly, the voltage uniforming unit 401 includes a transformer 402 in which a winding 402a which functions as an input winding and is wound to the number of turns N1 and three windings 402b to 402d which function as output windings and are wound to the same number of turns N2 mutually are magnetically coupled to each other. This transformer 402 has a leakage inductance, and functions as a so-called fly-back transformer. In addition, the voltage uniforming unit 401 includes a switch S1 which corresponds to a switching means in the present invention. This switch S1 is composed of an EFT or a bipolar transistor, for example, and its switching is controlled by a switching control circuit (not shown). Also, equivalently one end of the switch S1 is connected to the winding end terminal of the winding 402a and the other end thereof is connected to the minus output terminal of the DC power supply PS. In addition, the voltage uniforming unit 401 includes three diodes D1 to D3 (referred to as "diodes D" hereinafter if not particularly mentioned) whose anodes are connected to the winding end terminal of the windings 402b to 402d.

Next, an operation of the voltage uniforming unit 401 will be explained hereunder. First, a winding start portion of the winding 402a is connected to the plus output terminal of the DC power supply PS and the other end of the switch S1 is connected to the minus output terminal of the DC power supply PS. Cathodes of the diodes D1 to D3 are connected to the plus terminals of the batteries B1 to B3 respectively, and winding start terminals of the windings 402b to 402d are connected to the minus terminals of the batteries B1 to B3 respectively. Then, the switch S1 is ON/OFF-controlled. In this case, when the switch S1 is in the switching-ON, the current IIN generated by the output voltage VIN of the DC power supply PS flows through the current path comprising the plus output terminal of the DC power supply PS, the winding 402a, the switch S1, and the minus output terminal of the DC power supply PS, as shown in FIG. 27. At this time, since the diodes D1 to D3 block the discharge of the current from the windings 402b to 402d, the energy is stored in the transformer 402 by the current IIN flowing through the winding 402a.

Then, when the switch S1 is controlled into the OFF state, the voltages 0 V are induced in the windings 402b to 402d respectively to discharge the storage energy of the transformer 402. In this case, the voltages 0 V rise instantly to the voltage which can discharge the energy to the battery B with the lowest inter-terminal voltage VBMIN out of the batteries B (precisely the voltage obtained by adding the forward voltage of the diode D to the inter-terminal voltage VBMIN) and the exciting energy of the transformer 402 is discharged to the battery B. Therefore, the voltage V0 stops to rise and is clamped at this voltage. At the same time, one of a plurality of windings 402b to 402d is clamped at that voltage, and thus all windings 402b to 402d become the same voltage because the number of turns of the windings 402b to 402d are set equal mutually. As a result, for example, if the inter-terminal voltage VB of the battery B1 has the lowest voltage, the current I1 generated by the voltage V0 induced in the winding 402b flows through the current path comprising the winding end terminal of the winding 402b, the diode D1, the battery B1, and the winding start terminal of the winding 402b at the beginning respectively. Then, at a time point when the inter-terminal voltage VB of the battery B1 rises to the voltage equal to the inter-terminal voltage VB of other batteries B, the currents I2 and I3 flow sequentially. Accordingly, the inter-terminal voltage VB of the batteries B can be made equal.

In this manner, since the voltage uniforming unit 401 can be constructed by one switch S1, the transformer 402 which has the windings 402a to 402d substantially identical in number to the batteries B as the storage elements, and the diodes D which are identical in number to the batteries, the number of circuit parts can be reduced and as a result reduction in size and reduction in cost of the unit can be attained. Also, since the inter-terminal voltage VB of a plurality of batteries B can be automatically uniformed merely by ON/OFF-controlling one switch S1, switching control becomes ready. In addition, since the short-circuit failure is not brought about, the voltage uniforming process of the inter-terminal voltage VB of the batteries B can be carried out surely with high reliability. Here this voltage uniforming unit 401 does not intend to charge directly the batteries B1 to B3 by supplying the currents I1 to I3. This is because, if it is tried to charge directly the batteries B1 to B3 by the voltage uniforming unit 401, loss due to the diodes D1 to D3 occurs when the currents I1 to I3 are supplied to the batteries B1 to B3 and thus the charging efficiency is lowered. Accordingly, it is preferable that, when the inter-terminal voltages VB1 to VB3 are varied after the batteries B1 to B3 have been charged directly by the charger, such inter-terminal voltages VB1 to VB3 should be made equal by the voltage uniforming unit 401.

20th Embodiment

Figure 28:
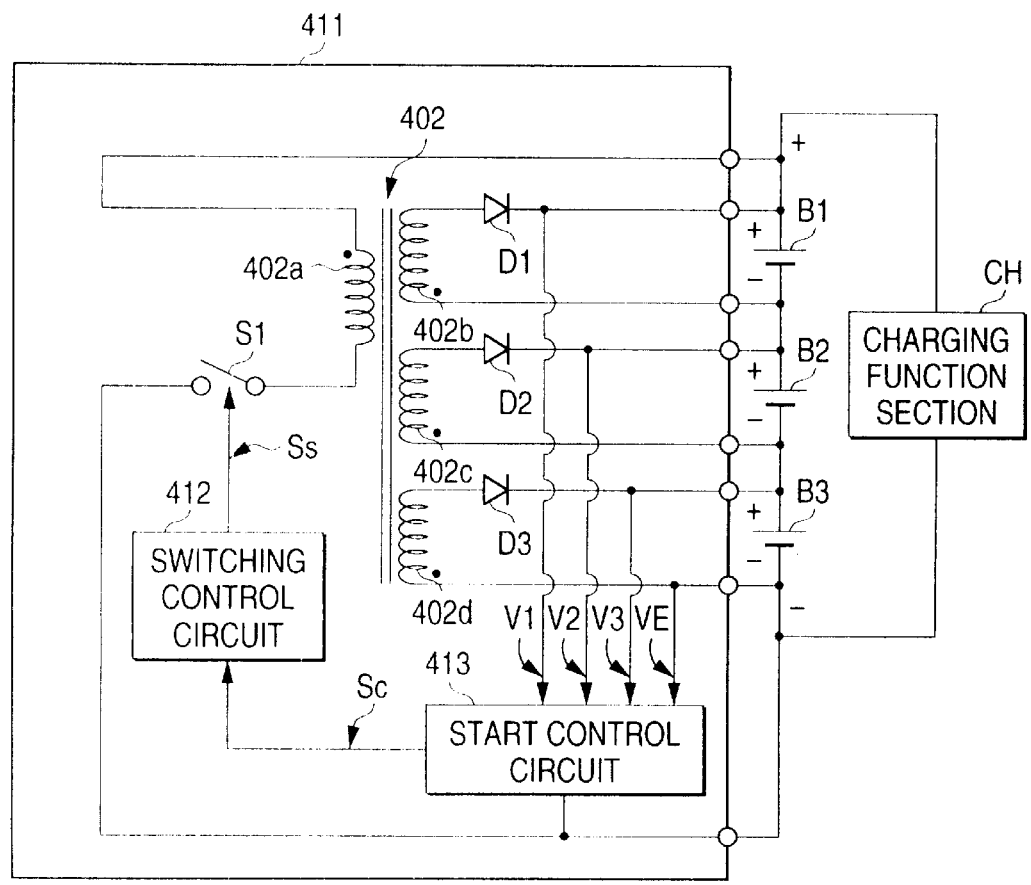
FIG. 28 is a circuit diagram of a voltage uniforming unit 411 according to another embodiment of the present invention.

Next, a voltage uniforming unit 411 according to another embodiment will be explained with reference to FIG. 28 hereunder. Redundant explanation will be omitted by affixing the same symbols to the same constituent elements as the voltage uniforming unit 401, and redundant explanation of the same operation will also be omitted.

At first, a configuration of the voltage uniforming unit 411 will be explained. As shown in FIG. 28, unlike the voltage uniforming unit 401, in the voltage uniforming unit 411, the winding start terminal of the winding 402a and the other end of the switch S1 are connected to the plus terminal of the battery B1 and the minus terminal of the battery B3 respectively. Also, the voltage uniforming unit 411 comprises a switching control circuit 412 for controlling the switching of the switch S1, and a start control circuit 413 which corresponds to a voltage detecting means in the present invention and detects the inter-terminal voltage VB of the batteries B and then controls the start of the switching control circuit 412 based on the detected result. In addition, a charging function section CH is connected to the batteries B1 to B3. This charging function section CH charges directly the batteries B by supplying the DC voltage to the batteries B. In this voltage uniforming unit 411, a configuration that can employ the energy output from the charging function section CH or the storage energy of the batteries B1 to B3 itself as the uniforming energy in place of the DC power supply PS is adopted, unlike the voltage uniforming unit 401. Accordingly, for example, in the case where the batteries B are the vehicle battery, etc., unless the energy is supplied from the charging function section CH even in the condition that the engine is stopped at the parking time, etc., the uniforming process of the inter-terminal voltage of the batteries B can be continued by utilizing the storage energy of the batteries B1 to B3. Also, since the energy output from the charging function section CH connected to the batteries B can be also used as the voltage uniforming energy, the DC power supply PS can be neglected and thus reduction in size and reduction in cost of the unit can be achieved.

Next, an operation of the voltage uniforming unit 411 will be explained hereunder. First, the output terminal and the earth terminal of the charging function section CH are connected to the plus terminal of the battery B1 and the minus terminal of the battery B3 respectively. Then, the charge of the batteries B1 to B3 is started by the charging function section CH. At this time, in the voltage uniforming unit 411, the start control circuit 413 receives terminal voltages V1 to V3 at the plus terminals of the batteries B1 to B3 with respect to the earth potential VE, and then gets the inter-terminal voltages VB1 to VB3 of the batteries B1 to B3 based on the terminal voltages V1 to V3. Then, the start control circuit 413 outputs a control signal SC to the switching control circuit 412 when fluctuation in difference voltage between the inter-terminal voltages VB1 to VB3 is out of a voltage range of 0 (V) to Va (V) (which corresponds to a predetermined voltage range in the present invention), for example. More particularly, assume that the maximum voltage and the minimum voltage of the inter-terminal voltages VB1 to VB3 of the batteries B1 to B3 are set to VMAX and VMIN respectively, and that the charge start voltage which corresponds to 90%, for example, of the allowable maximum charging voltage obtained when the batteries B1 to B3 are charged up to the allowable maximum limit is set to VAM. In this case, the start control circuit 413 outputs the control signal SC when the difference voltage between the maximum voltage VMAX and the minimum voltage VMIN exceeds the upper limit voltage Va of the fluctuation and the inter-terminal voltages VB of all batteries B satisfy the condition which is less than or equal to (or below) the charge start voltage VAM. Even when the inter-terminal voltages VB1 to VB3 of the batteries B1 to B3 is sufficiently lower than the charge start voltage VAM, the start control circuit 413 does not output the control signal SC unless the above condition. Concerning this respect, the voltage uniforming unit 411 differs from the normal charge unit which charges the charged object irrespective of the fluctuation of the inter-terminal voltages VB1 to VB3 of the batteries B1 to B3. In this case, the above upper limit voltage Va of the fluctuation is set to a voltage value which is almost 10% of the allowable maximum charging voltage of the batteries B1 to B3, for example.

When the control signal SC is output from the start control circuit 413, the switching control circuit 412 detects the inputting of the control signal SC and then ON/OFF-controls the switch S1 by outputting the switching control signal SS to the switch S1. Accordingly, the current being output from the charging function section CH or the series circuit of the batteries B1 to B3 is supplied to the winding 402a via the switch S1. After this, the above voltage uniforming process of the inter-terminal voltages VB is carried out in the voltage uniforming unit 411.

Meanwhile, the start control circuit 413 stops outputting of the control signal SC at a time point when at least one of the above conditions is not satisfied. At this time, the switch S1 is kept in its OFF state since the switching control circuit 412 stops the control of the switching of the switch S1. As a consequence, minute loss such as switching loss of the switch S1, loss caused when the currents I1 to I3 pass the diode D, etc., during the voltage uniforming process can be prevented.

In this fashion, according to this voltage uniforming unit 411, the energy of the charging function section CH or the energy stored in the overall series circuit of the batteries B1 to B3 is distributed into the batteries B whose inter-terminal voltage VB is lower, so that the inter-terminal voltages VB of the batteries B1 to B3 can be made equal. As a result, the voltage uniforming process can be conducted not to need the DC power supply PS. In addition, since switching of the switch S1 is stopped when the inter-terminal voltages VB of all batteries B are made equal, slight loss because of the voltage uniforming process can be prevented and as a result the voltages of the storage elements can be uniformed with extremely high efficiency. Moreover, since the voltage uniforming process is carried out only when all inter-terminal voltages VB of the batteries B1 to B3 do not exceed the voltage VAM, the excessive charging of the batteries B can be prevented. Besides, the charging unit can be constructed by building the charging function section CH in the voltage uniforming unit 411. In this case, since the charging can be executed by the charging function section CH while uniforming the inter-terminal voltages VB of the batteries B, a largest amount of electrical energy can be stored effectively in the batteries B.

21st Embodiment

Next, a voltage uniforming unit 421 according to still another embodiment will be explained with reference to FIG. 29 hereunder. Redundant explanation will be omitted by affixing the same symbols to the same constituent elements as the voltage uniforming units 401 and 411, and redundant explanation of the same operation will also be omitted.

Figure 29:
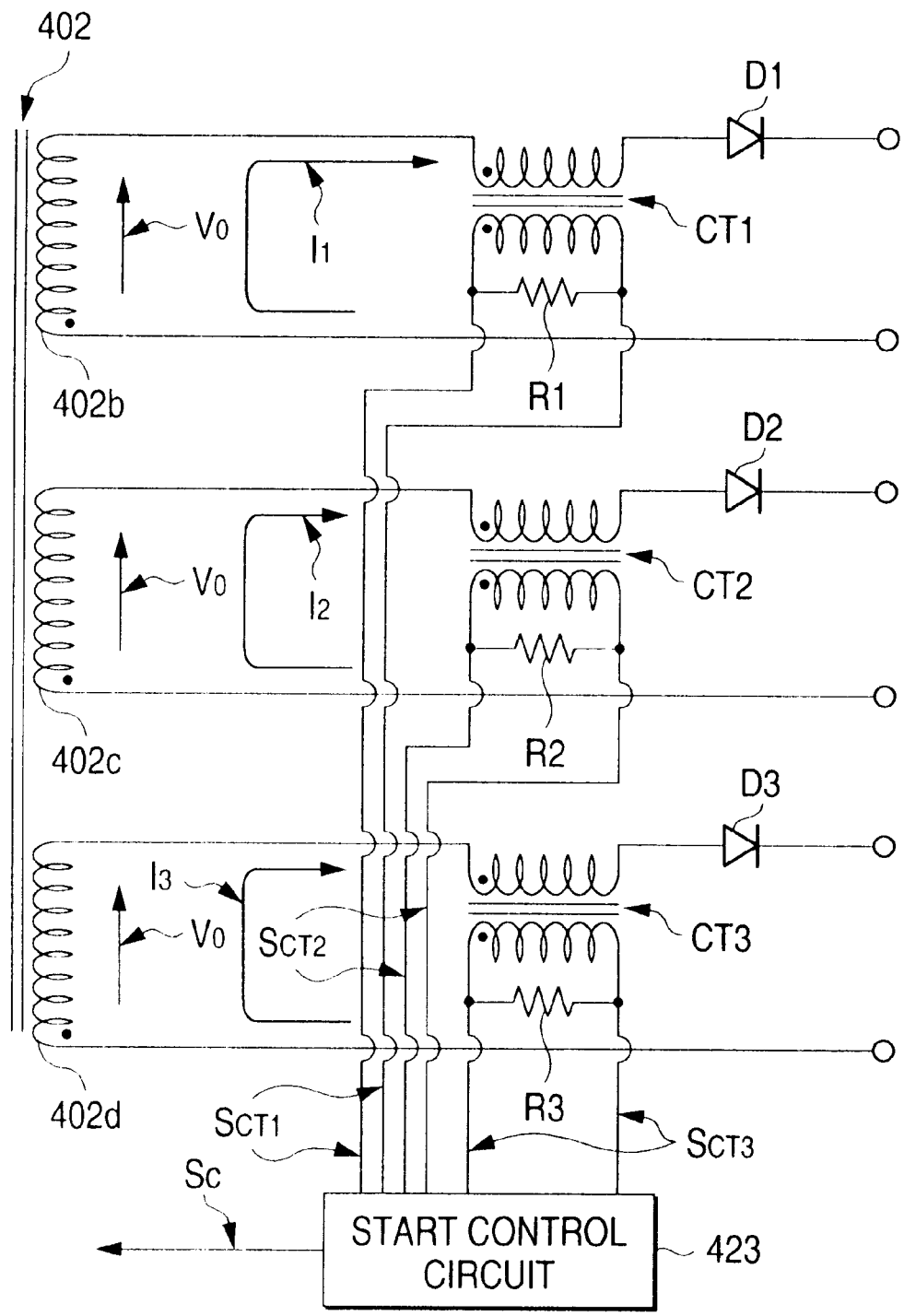
FIG. 29 is a circuit diagram of a part of a voltage uniforming unit 421 according to still another embodiment of the present invention.
Figure 30:
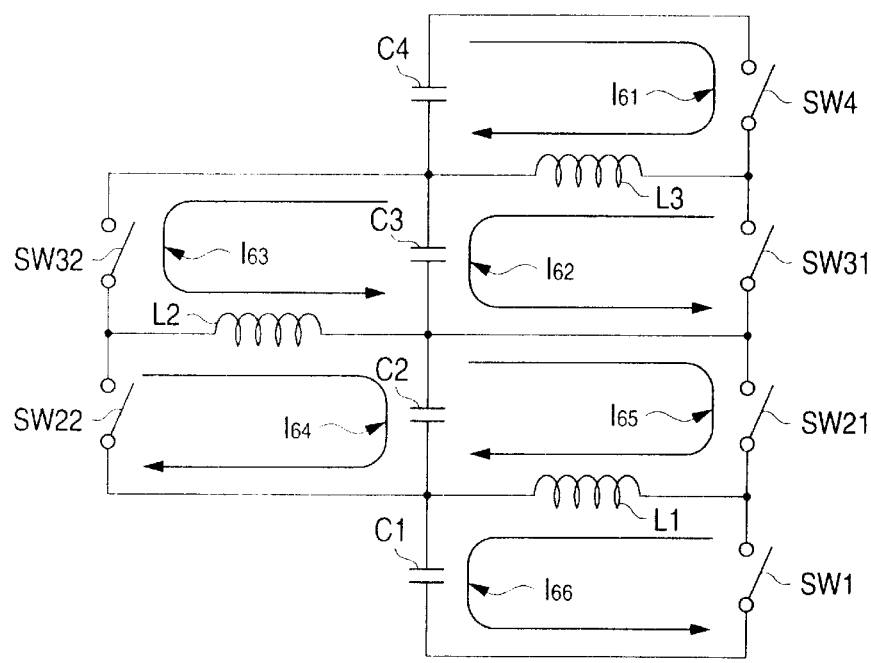
FIG. 30 is a circuit diagram of a transfer unit 1061 in the conventional art.
Figure 31:
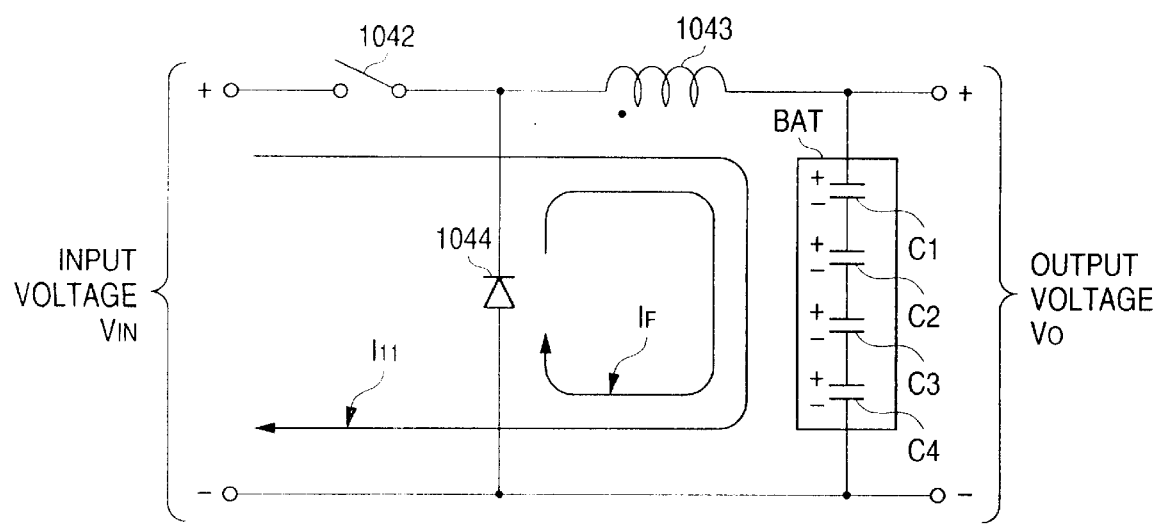
FIG. 31 is a circuit diagram of a charge unit 1041 in the conventional art.

As shown in FIG. 29, unlike voltage uniforming units 401 and 411, the voltage uniforming unit 421 comprises current transformers CT1 to CT3 (referred to as "current transformers CT" hereinafter if not particularly mentioned), resistors R1 to R3, and a start control circuit 423. In this case, the current transformers CT1 to CT3 together with the resistors R1 to R3 constitute a current detecting means in the present invention, and detect the currents flowing through the diodes D to generate detection signals SCT1 to SCT3 (referred to as "detection signals SCT" hereinafter if not particularly mentioned). Also, the resistors R1 to R3 are parallel-connected to secondary windings of the current transformers CT1 to CT3 respectively to convert the currents flowing through the secondary windings into voltages. In addition, the start control circuit 423 as well as the switching control circuit 412 constitutes a control circuit in the present invention, and functions as a current supply state deciding means for deciding the supply state of the current supplied to the batteries B, and controls the start of the switching control circuit 412 based on the detection signals SCT1 to SCT3 in response to the current values of the currents supplied to the batteries B. In this case, in FIG. 29, illustration of the same configurations as the voltage uniforming unit 411 such as the batteries B, the charging function section CH, the primary circuit of the winding 402a side, etc. will be omitted.

In this voltage uniforming unit 421, the start control circuit 423 outputs intermittently the control signal SC. Thus, first the switching control circuit 412 switches ON/OFF of the switch S1 once. At this time, when the switch S1 is controlled into the OFF state by the switching control circuit 412, the currents I1 to I3 are supplied to any one or more of the batteries B based on the voltages V0 induced in the windings 402b to 402d in answer to the inter-terminal voltages VB of the batteries B1 to B3. In this case, if the forward current-forward voltage characteristics of the diodes D1 to D3 are substantially equal, and the inter-terminal voltages VB of all batteries B1 to B3 are substantially equal, and also the voltages V0 induced in the windings 402b to 402d are substantially equal, the currents I1 to I3 having the substantially equal current value are supplied to all batteries B1 to B3 respectively. Meanwhile, if the inter-terminal voltage VB of any battery B is higher than the inter-terminal voltage VB of other batteries B, no current is supplied, or an amount of supply becomes very small. At this time, the detection signals SCT1 to SCT3 which mate with the resistance values of the resistors R1 to R3 and the current values of the current I1 to I3 flowing through the input windings are generated in the output windings of the current transformers CT1 to CT3. In this case, since the resistance values of the resistors R1 to R3 are fixed values, the voltage values of the detection signals SCT1 to SCT3 are substantially in proportion to the current values of the currents I1 to I3. Therefore, the start control circuit 423 decides the supply states of the currents I1 to I3 to the batteries B based on the voltage values of the detection signals SCT.

More particularly, the start control circuit 423 decides whether or not, for example, the fluctuation in the difference voltage between the highest voltage values of the detection signal SCT and the voltage values of other detection signals SCT is within a predetermined range (e.g., a 0 to 10% range of the highest voltage of the detection signal SCT, that is, 0 to 10% range of the largest current value of the currents I1 to I3). In this case, the start control circuit 423 decides that the inter-terminal voltage VB of any battery B has not been uniformed when the voltage value of any detection signal SCT is out of the predetermined range, and then causes the switching control circuit 412 to continue the switching of the switch S1 by outputting the control signal SC continuously. It is preferable that the start control circuit 423 should detect the inter-terminal voltages VB of the batteries B1 to B3 in the same way as in the start control circuit 423 in the voltage uniforming unit 411, and then output the control signal SC only when all inter-terminal voltages VB of the batteries B1 to B3 do not exceed the above voltage VAM. In contrast, the start control circuit 423 decides that the inter-terminal voltages VB of all batteries B have been substantially uniformed when the voltage values of other detection signals SCT are within the predetermined range, and then causes the switching control circuit 412 to keep the switch S1 in the OFF state by stopping the output of the control signal SC. After this, the start control circuit 423 repeats the above processes by outputting intermittently the control signal SC to the switching control circuit 412.

In this fashion, according to the voltage uniforming unit 421, since the voltage uniforming process is carried out by deciding the supply states of the currents to the batteries B and the switching of the switch S1 is stopped when the inter-terminal voltages VB of all batteries B are made equal, minute loss due to the voltage uniforming process can also be prevented. As a result, like the voltage uniforming unit 411, the inter-terminal voltages VB1 to VB3 of the batteries B can be made equal with extremely high efficiency.

The present invention is not limited to the above embodiments of the present invention, and may be modified appropriately. For example, in the embodiments of the present invention, examples in which the start control circuits 413 and 423 either output the control signal SC or stop the output according to the detected results the voltage detecting means and the current detecting means in the present invention have been explained. The present invention is not limited to this. For example, a control unit provided on the outside of the unit can control start and stop of the operation of the voltage uniforming units 411 and 421 as a whole by outputting the detected results to the outside of the unit. Also, in the voltage uniforming unit 401, an amount of energy to be supplied to the battery B is adjusted by causing the switching control circuit 412 to switch the ON/OFF of the switch S1, but an amount of energy to be supplied to the battery B can be adjusted by causing the switching control circuit 412 to change the duty ratio of the ON period of the switch S1. In addition, the inter-terminal voltages VB of the batteries B as the storage elements can be maintained at different voltages by changing appropriately the turn ratios of the windings 402*b* to 402*d*. Furthermore, in the storage elements in the present invention, not only the secondary battery but also the capacitor is contained. Besides, the number of the uniformed storage elements is not particularly restricted. In the case that the inter-terminal voltages of a large number of storage elements are made equal, the transformer which has the output windings according to the number of the storage elements may be employed.

As described above, according to the energy transfer unit according to the first aspect, since the energy transfer can be performed among a plurality of energy storage means by switching-controlling a plurality of switching means synchronously mutually, the control at that time can be extremely simplified. Also, since no short-circuit failure is brought about, the storage energy in the energy storage means can be transferred surely with high reliability. In addition, since the energy transfer unit can be constructed by the windings and the switching means which are identical in number to the energy storage means, the number of circuit parts can be reduced. As a result, reduction in size and reduction in cost of the energy transfer unit can be attained.

Also, according to the energy transfer unit according to the second aspect, the transformer further includes the energy discharge windings for discharging the storage energy of the transformer to the energy storage means. Therefore, the magnetization of the transformer due to the current flowing through the windings can be reset without fail, and thus magnetic saturation of the transformer can be prevented surely.

Also, according to the energy transfer unit according to the third aspect, the energy discharge windings which are series-connected to the windings discharge the storage energy of the transformer to the energy storage means connected to corresponding windings respectively. Therefore, the inter-terminal voltages of the energy storage means can be made equal in magnetizing the transformer and magnetically resetting the transformer respectively.

Also, according to the energy transfer unit according to the fourth aspect, since the number of the energy discharging windings can be reduced, the transformer can be reduced in size.

Also, according to the energy transfer unit according to the fifth aspect, the leakage transformer is employed as the transformer. Therefore, the peak value of the current flowing through the windings can be limited appropriately.

Also, according to the energy transfer unit according to the sixth aspect, the energy storage means is composed of either the capacitor or the secondary battery. Therefore, for example, in the storage system, etc., since the inter-terminal voltages of the capacitors or the secondary batteries can be uniformed, the charge and discharge can be performed effectively.

Also, according to the energy transfer unit according to the seventh aspect, the windings are wound to the same number of turns respectively when the inter-terminal voltages of the plurality of energy storage means are uniformed into the same voltage. Therefore, the transformer can be manufactured inexpensively.

Also, according to the energy transfer unit according to the eighth aspect, the switching means are composed of the field effect transistor or the bipolar transistor. Therefore, the switching means can be constructed inexpensively and also the power loss in switching can be reduced.

Also, according to the charge unit according to the ninth aspect, since the inter-terminal voltages of the plurality of charged objects can be made equal by the energy transfer unit respectively, the energy can be stored effectively in the charged objects.

Also, according to the power supply unit according to the tenth aspect, since the storage energy in predetermined one energy storage means is distributed into other energy storage means, a plurality of power supply outputs having different voltage values and output current values can be easily generated. In addition, since the utilization factor of the windings is increased, the peak current value can be suppressed in the energy distribution. As a result, reduction in size of the circuit parts can be achieved and the output ripple voltages can be sufficiently reduced. Furthermore, as for the switching noise, since the switching of the first and second switching means is controlled synchronously, generation of beats between the noises can be reduced and also the EMI noise can be sufficiently reduced.

Also, according to the power supply unit according to the eleventh aspect, any one of inter-terminal voltages of the plurality of energy storage means is controlled to be stabilized into a predetermined voltage. Therefore, a plurality of stabilized power supply outputs having different voltage values and output current values can be easily generated.

As described above, according to the energy transfer unit according to the twelfth aspect, since at least a part of the plurality of switching means are series-connected to the windings via the intermediate taps of the transformer respectively, the number of connection cables to be connected to the energy storage means can be reduced. As a result, the wiring operation cost and the wiring material cost can be reduced and the space saving can be achieved correspondingly.

Also, according to the energy transfer unit according to the thirteenth aspect, the switching means are ON/OFF-controlled in response to the detected voltage of the voltage detecting means. Therefore, unnecessary switching of the switching means can be avoided, and thus the loss in switching by the switching means can be reduced.

Also, according to the energy transfer unit according to the fourteenth aspect, the switching means are caused to stop their switching when a detected current value of the current detecting means exceeds a predetermined value. Therefore, the current breakdown of the switching means and also the burnout of the wiring and the transformer can be prevented.

Also, according to the energy transfer unit according to the fifteenth aspect, since the overcurrent protecting means is provided, the current breakdown of the switching means and also the burnout of the wiring and the transformer can be prevented without fail.

Also, according to the energy transfer unit according to the sixteenth aspect, since the energy storage means is composed of either the capacitor or the secondary battery, the inter-terminal voltages of the secondary batteries or the capacitors employed in various batteries can be uniformed. Therefore, the battery can be charged and discharged with high efficiency.

Also, according to the energy transfer unit according to the seventeenth aspect, the switching means is composed of the field effect transistor or the bipolar transistor. Therefore, the switching means can be constructed inexpensively and the power loss in switching can be further more reduced.

Also, according to the energy transfer unit according to the eighteenth aspect, the separately excited oscillator circuit for controlling switching of the switching means is provided. Therefore, ON/OFF-switching of all the switching means can be controlled by inputting a switching synchronizing signal from the outside of the unit, while synchronizing such switching with the switching synchronizing signal surely.

As described above, according to the charge unit according to the nineteenth aspect, since currents generated based on an exciting energy of the transformer excited in an ON period of the switching means are output from the plurality of second windings to the plurality of corresponding storage elements in an OFF period of the switching means respectively, the inter-terminal voltages of the storage means in the storage means can be made equal. As a result, the enough energy can be stored in the storage means and the inter-terminal voltages of the storage elements can be made equal, and therefore the lifetime of the charge elements can be prolonged considerably in contrast to the charge method according to the charge unit 1041 in the conventional art.

Also, according to the charge unit according to the twentieth aspect, the first windings of a plurality of transformers are series or parallel-connected mutually. Therefore, even in the case where various storage means in which the number of the series-connected storage elements is different are employed as the charged object, the transformers can be commonly employed and the production cost of the transformers can be reduced.

Also, according to the charge unit according to the twenty-first aspect, the enough energy can be stored in the storage means which is constructed by the electric double layer capacitors, the ion batteries, etc., whose range or fluctuation in the inter-terminal voltage is large.

As described above, according to the energy transfer unit according to the twenty-second aspect, the first switching means in the N first current paths are switching-controlled in synchronous with each other respectively, and the second switching means in the N second current paths are switching-controlled into the ON state in synchronous with each other in the OFF period of the first switching means. Therefore, the inter-terminal voltages of the energy storage means can be made equal in a short time while suppressing the increase in cost.

Also, according to the energy transfer unit according to the twenty-third aspect, the N first windings and the N first switching means are wound on a same transformer respectively, and the N first current paths and the N second current paths are connected to N energy storage means respectively such that they can be excited by switching of the first switching means and switching of the second switching means to yield both polarities for the transformer. Therefore, even if a plurality of energy storage means are isolated mutually and the inter-terminal voltages are different, the energy transfer/distribution can be made equal among a plurality of energy storage means in a short time.

Also, according to the energy transfer unit according to the twenty-fourth aspect, the N windings connected to the first switching means in the first to N-th first current paths as the first windings and one winding connected to the second switching means in the N-th second current path as the second winding are wound on a same transformer to an equal number of turns mutually respectively. Therefore, when a plurality of energy storage means have the equal inter-terminal voltage mutually and are series-connected in the non-insulated state, the energy transfer/distribution can be made equal among a plurality of energy storage means in a short time while further reducing the cost.

Also, according to the energy transfer unit according to the twenty-fifth aspect, the switching pause period in which both switching means are OFFed is provided between an ON period of the first switching means and an ON period of the second switching means. Therefore, generation of the short-circuit current generated by the simultaneous ON states of the first switching means and the second switching means can be prevented without fail.

Also, according to the energy transfer unit according to the twenty-sixth aspect, the ON periods of the first switching means and the second switching means are set to a same time length mutually. Therefore, the numbers of turns of the first windings and the second windings connected to the same energy storage means can be set equally mutually and, as a result, the efficiency of the winding manufacturing operation can be improved and thus the winding manufacturing cost can be reduced.

Also, according to the energy transfer unit according to the twenty-seventh aspect, the energy storage means is composed of either the capacitor or the secondary battery. Therefore, for example, in the storage system, etc., the inter-terminal voltages of the capacitors or the secondary batteries can be uniformed and thus the charge and discharge can be performed effectively.

Also, according to the charge unit according to the twenty-eighth, the first current paths and the second current paths are parallel-connected to both ends of each of N charged objects as the energy storage means respectively. Therefore, for example, in the storage system, etc., the inter-terminal voltages of the charged objects such as the capacitors, the secondary batteries, or the like can be made equal and thus the energy can be stored effectively in the charged objects.

Also, according to the charge unit according to the twenty-ninth aspect, since the storage energy in predetermined one energy storage means is distributed into remaining energy storage means, a plurality of power supply outputs having different voltage values and output current values can be easily generated. In addition, since the utilization factor of the windings is increased, the peak current value can be suppressed in the energy distribution. As a result, reduction in size of the circuit parts can be achieved and the output ripple voltages can be sufficiently reduced. Furthermore, as for the switching noise, since the switching of the first and second switching means is controlled synchronously, generation of beats between the noises can be reduced and also the EMI noise can be sufficiently reduced.

Also, according to the power supply unit according to the thirtieth aspect, any one of inter-terminal voltages of the N energy storage means is controlled to be stabilized into a predetermined voltage. Therefore, a plurality of stabilized power supply outputs having different voltage values and output current values can be easily generated.

As described above, according to the voltage uniforming unit according to the thirty-first aspect, since the energy is supplied to the storage elements via the output windings of the transformer and the uni-directional elements in the switching-OFF period by switching one switching means, the inter-terminal voltages of the storage elements can be uniformed without fail and extremely easily. Also, the inter-terminal voltages of the storage elements can be uniformed without the short-circuit failure and with high reliability. In addition, since the voltage uniforming unit can be constructed by one switching means, the transformer having the windings which are identical in number to the storage elements, and the uni-directional elements which are identical in number to the storage elements, the number of circuit parts can be reduced and as a result reduction in size and reduction in cost of the unit can be attained. Further, since the voltage detecting means detects respective inter-terminal voltages of a plurality of storage elements, the voltage uniforming unit can control the switching means in response to states of the inter-terminal voltages, or control an overall operation of the unit from the outside of the unit.

Also, since the switching means starts switching based on a detected result of the voltage detecting means when variation in the inter-terminal voltages of the plurality of storage elements is out of a predetermined voltage range, and stops the switching when variation in the inter-terminal voltages is within the predetermined voltage range, small loss due to the voltage uniforming process can be prevented, and thus the inter-terminal voltages of the storage elements can be uniformed with extremely high efficiency.

Also, since the switching means stops the switching based on the detected result of the voltage detecting means when one or more of the inter-terminal voltages of the plurality of storage elements reach a predetermined voltage, the excessive charging of the storage elements can be avoided.

Also, according to the voltage uniforming unit of the present invention, the inter-terminal voltages of the storage elements can be uniformed without fail and extremely easily, and also the inter-terminal voltages of the storage elements can be uniformed without the short-circuit failure and with high reliability and in addition the reduction in size and the reduction in cost of the unit can be attained. Further, since the current detecting means detects respective currents supplied to a plurality of storage elements, the voltage uniforming unit can control the switching means in response to states of the detected currents, or control an overall operation of the voltage uniforming unit from the outside of the unit.

Also, since the switching means stops switching based on a detected result of the current detecting means when variation in the currents supplied to the storage elements is within the predetermined range, small loss due to the voltage uniforming process can be prevented, and thus the inter-terminal voltages of the storage elements can be uniformed with extremely high efficiency. Since the control circuit switches intermittently the switching means, it can be decided surely whether or not the uniforming process of the respective storage elements is needed.

Also, since the DC power supply is composed of the plurality of storage elements, the uniforming process can be performed without employment of other DC power supply. As a result, the size of the unit can be reduced and the cost can be reduced. Also, the voltage uniforming unit further comprises the charging function section for charging directly the plurality of series-connected storage elements, the storage means can be charged while uniforming the inter-terminal voltages of the storage elements and thus a largest amount of electrical energy can be stored effectively in the storage elements. Moreover, since the uni-directional elements are composed of the diode, its control is not needed and the unit can be constructed inexpensively in contrast to the case where the FET or the bipolar transistor is employed.

What is claimed is:

1. An energy transfer unit to be connected to a plurality of energy storage means, the energy transfer unit comprising:
   a plurality of series-connected circuits each comprising at least a winding and switching means connected in series to each other, the plurality of series-connected circuits connected in parallel to the plurality of energy storage means, respectively,
   wherein the plurality of windings are magnetically coupled to each other; and
   the plurality of switching means are switching-controlled in synchronous with each other.

2. The energy transfer unit according to claim 1, further comprising a transformer comprising the plurality of windings and a plurality of energy discharge windings for discharging storage energy of the transformer to the energy storage means when the switching means are controlled into an OFF state.

3. The energy transfer unit according to claim 2, wherein the plurality of energy discharge windings are connected in series to the plurality of windings respectively, and the plurality of energy discharge windings discharge the storage energy of the transformer to the energy storage means connected to the corresponding plurality of windings respectively.

4. The energy transfer unit according to claim 2, further comprising:
   first to N-th series-connected circuits where N is a natural number, the first to N-th series circuits each including the winding and the switch means and, first to N-th series-connected circuits being connected in series to each other, and
   an (N+1)-th winding being the energy discharging winding, the (N+1)-th winding connected in series to the first to N-th series-connected circuits,
   wherein the energy storage means connected to the (M−1)-th winding via the M-th winding and an uni-directional device where M is a natural number between from 2 to N+1, through which the storage energy of the transformer is discharged to the energy storage means.

5. The energy transfer unit according to claim 2, wherein the transformer is a leakage transformer.

6. The energy transfer unit according to claim 1, wherein the energy storage means is either a capacitor or a secondary battery.

7. The energy transfer unit according to claim 1, wherein the plurality of windings are wound to the same number of turns respectively.

8. The energy transfer unit according to claim 1, wherein each of the plurality of switching means is a field effect transistor or a bipolar transistor.

9. The charge unit for charging a plurality of objects to be charged comprising:
   an energy transfer unit to be connected to a plurality of energy storage means, the energy transfer unit comprising a plurality of series-connected circuits each including a winding and switching means connected in series to each other, the plurality of series-connected circuits connected in parallel to the plurality of energy storage means, respectively,
   wherein the plurality of windings are magnetically coupled to each other;
   the plurality of switching means are switching-controlled in synchronous with each other; and
   the plurality of series-circuits are connected in parallel to both ends of each of the plurality of objects to be charged respectively.

10. A power supply unit comprising:
    an energy transfer unit to be connected to a plurality of energy storage means, the energy transfer unit comprising a plurality of series-connected circuits each including a winding and switching means connected in series to each other, the plurality of series-connected circuits connected in parallel to the plurality of energy storage means, respectively, wherein the plurality of windings are magnetically coupled to each other;

the plurality of switching means are switching-controlled in synchronous with each other; and the plurality of energy storage means are composed of either a capacitor or a secondary battery respectively, and the storage energy in predetermined one of the energy storage means are distributed into other energy storage means.

11. The power supply unit according to claim 10, wherein any one of inter-terminal voltages of the plurality of energy storage means is controlled to be stabilized into a predetermined voltage.

12. The energy transfer unit according to the claim 1, the energy transfer unit further comprising:

a transformer formed by connecting in series a part or all of the plurality of windings, the transformer including a plurality of intermediate taps formed at connection points between the plurality of windings, wherein at least a part of the plurality of switching means are series-connected to the plurality of windings via the intermediate taps of the transformer respectively.

13. The energy transfer unit according to claim 12, further comprising voltage detecting means for detecting inter-terminal voltages of the plurality of energy storage means;

wherein the plurality of switching means are ON/OFF-controlled according to an output detected by the voltage detecting means.

14. The energy transfer unit according to claim 12, further comprising current detecting means for detecting currents flowing through the plurality of switching means;

wherein the plurality of switching means turn themselves off when a current value detected by the current detecting means exceeds a predetermined value.

15. The energy transfer unit according to claim 12, wherein an overcurrent protecting means is connected in series to the plurality of series circuits.

16. The energy transfer unit according to claim 12, wherein each of the plurality of energy storage means is either a capacitor or a secondary battery.

17. The energy transfer unit according to claim 12, wherein each of the plurality of switching means is a field effect transistor or a bipolar transistor.

18. The energy transfer unit according to claim 12, further comprising a separately excited oscillator circuit for controlling switching of the switching means.

19. A charge unit capable of charging storage means formed by connecting a plurality of storage elements in series, the charge unit comprising:

a transformer having a first winding and a plurality of second windings provided to correspond to the plurality of storage elements respectively, the first winding magnetically coupled to the plurality of second windings; and switching means connected in series to the first winding of the transformer and the storage means, the switching means for charging the storage means and exciting the transformer by supplying a current via the first winding of the transformer when the switching means as controlled into an ON state;

wherein a current generated based on an exciting energy of the transformer excited in an ON period of the switching means are output from the plurality of second windings to the plurality of corresponding storage elements in an OFF period of the switching means respectively.

20. The charge unit according to claim 19, wherein the transformer comprising a plurality of transformers each having the first winding, and wherein the first winding of each of the transformers is connected to each other in series or parallel.

21. The charge unit according to claim 19, wherein the plurality of storage elements are either an electric double layer capacitor or an ion battery respectively.

22. An energy transfer unit to be connected to first to N-th energy storage means, the energy transfer unit comprising:

N of first current paths, where N is a natural number, the N of first current paths each comprising at least a first winding and first switching means connected in series to each other, the first to N-th first current paths being connected in parallel to the first to N-th energy storage means respectively, the N of first windings being magnetically coupled to each other, and the N of first switching means being switching-controlled in synchronous with each other respectively; and N of second current paths each comprising at least a second winding and second switching means connected in series to each other, and the first to N-th second current paths being connected in parallel to the first to N-th energy storage means respectively, wherein the N of second windings in the first to N-th second current paths are magnetically coupled to each other, and turn ratios of the second windings to the corresponding first windings in the first to N-th first current paths are set equal mutually, and the N of second switching means are controlled synchronously and switched into an ON state in an OFF period of the first switching means.

23. The energy transfer unit according to claim 22, wherein the N of first windings and the N of first switching means are wound on the same transformer respectively, and the N of first current paths and the N of second current paths are connected to the N of energy storage means respectively to be excited by switching of the first switching means and switching of the second switching means to yield both polarities for the transformer.

24. The energy transfer unit according to claim 22, wherein the N of first windings connected to the first switching means in the first to N-th first current paths and one winding being the second winding connected to the second switching means in the N-th second current path are wound on the same transformer at an equal number of turns mutually respectively, and the second switching means in the N of second current paths are excited by switching of the second switching means and switching of the first switching means to yield both of the polarities for the transformer, the second switching means in the first to (N−1)-th second current paths are connected to the first windings in the second to N-th first current paths respectively, and the second switching means in the N-th second current path is connected to the one winding.

25. The energy transfer unit according to claim 22, wherein a switching pause period in which both switching means are OFFed is provided between an ON period of the first switching means and an ON period of the second switching means.

26. The energy transfer unit according to claim 22, wherein ON periods of the first switching means and the second switching means are set to the same period of time mutually.

27. The energy transfer unit according to claim 22, wherein the energy storage means is either a capacitor or a secondary battery.

28. The charge unit comprising:
an energy transfer unit to be connected to first to N-th energy storage means, the energy transfer unit comprising:
N of first current paths, where N is a natural number, the N of first current paths each comprising at least a first winding and first switching means connected in series to each other, the first to N-th first current paths being connected in parallel to the first to N-th energy storage means respectively, the N of first windings being magnetically coupled to each other, and the N of first switching means being switching-controlled in synchronous with each other respectively; and
N of second current paths each comprising at least a second winding and second switching means connected in series to each other, and the first to N-th second current paths being connected in parallel to the first to N-th energy storage means respectively,
wherein the N of second windings in the first to N-th second current paths are magnetically coupled to each other, and turn ratios of the second windings to the corresponding first windings in the first to N-th first current paths are set equal mutually;
the N of second switching means are controlled synchronously and switched into an ON state in an OFF period of the first switching means; and
the first current paths and the second current paths are connected in parallel to both ends of each of N of charged objects as the energy storage means respectively.

29. A power supply unit comprising:
an energy transfer unit to be connected to first to N-th energy storage means, the energy transfer unit comprising:
N of first current paths, where N is a natural number, the N of first current paths each comprising at least a first winding and first switching means connected in series to each other, the first to N-th first current paths being connected in parallel to the first to N-th energy storage means respectively, the N of first windings being magnetically coupled to each other, and the N of first switching means being switching-controlled in synchronous with each other respectively; and
N of second current paths each comprising at least a second winding and second switching means connected in series to each other, and the first to N-th second current paths being connected in parallel to the first to N-th energy storage means respectively,
wherein the N of second windings in the first to N-th second current paths are magnetically coupled to each other, and turn ratios of the second windings to the corresponding first windings in the first to N-th first current paths are set equal mutually;
the N of second switching means are controlled synchronously and switched into an ON state in an OFF period of the first switching means; and
wherein the energy storage means is either a capacitor or a secondary battery arranged on an output side, and storage energy in predetermined one or plural energy storage means are distributed into remaining energy storage means.

30. The power supply unit according to claim 29, wherein any one of inter-terminal voltages of the N of energy storage means is controlled to be stabilized into a predetermined voltage.

31. A voltage uniforming unit for uniforming inter-terminal voltages of a plurality of storage elements connected in series into a substantially equal voltage mutually by supplying an energy to the storage elements respectively, the series-connected unit comprising:
a transformer having an input winding connected to a DC power supply, the transformer having a plurality of output windings wound at substantially the same number of turns mutually;
a switching means series-connected to the input winding;
a plurality of uni-directional elements connected between the cutout windings and the storage elements respectively to supply storage energy of the transformer to the storage elements; and
a voltage detecting means for detecting respective inter-terminal voltages of the plurality of series-connected storage elements.

32. The voltage uniforming unit according to claim 31, wherein the switching means starts switching based on a detected result of the voltage detecting means when variation in the inter-terminal voltages of the plurality of storage elements is out of a predetermined voltage range, and stops the switching when variation in the inter-terminal voltages is within the predetermined voltage range.

33. The voltage uniforming unit according to claim 31, wherein the switching means stops the switching based on a detected result of the voltage detecting means when one or more of the inter-terminal voltages of the plurality of storage elements reach a predetermined voltage which is set based on an allowable maximum charging voltage of the storage elements.

34. A voltage uniforming unit for uniforming inter-terminal voltages of a plurality of series-connected storage elements into a substantially equal voltage mutually by supplying an energy to the storage elements respectively, the series-connected unit comprising:
a transformer having an input winding connected to a DC power supply, and the transformer having a plurality of output windings wound at substantially the same number of turns mutually;
a switching means series-connected to the input winding of the transformer;
a plurality of uni-directional elements connected between the output windings of the transformer and the storage elements respectively to supply storage energy of the transformer to the storage elements; and
a current detecting means for detecting currents supplied to the storage elements via the uni-directional elements.

35. The voltage uniforming unit according to claim 34, wherein the switching means stops switching based on a detected result of the current detecting means when variation in the currents supplied to the storage elements is within the predetermined range.

36. The voltage uniforming unit according to claim 35, further comprising:
a control circuit for switching intermittently the switching means, and controlling the switching means into an OFF state when it is decided based on the detected result of the current detecting means that variation is within the predetermined range, and continuing switching of the switching means when it is decided that the variation is out of the predetermined range.

37. The voltage uniforming unit according to claim 31, wherein the DC power supply is the plurality of storage elements.

38. The voltage uniforming unit according to claim 31, further comprising:

a charging function section for charging directly the plurality of series-connected storage elements.

39. The voltage uniforming unit according to claim 31, wherein the uni-directional elements are diodes.

40. The voltage uniforming unit according to claim 34, wherein the DC power supply is the plurality of storage elements.

41. The voltage uniforming unit according to claim 34, further comprising:

a charging function section for charging directly the plurality of series-connected storage elements.

42. The voltage uniforming unit according to claim 34, wherein the uni-directional elements are diodes.

* * * * *